United States Patent
Edwards et al.

(10) Patent No.: US 9,310,111 B2
(45) Date of Patent: Apr. 12, 2016

(54) SYSTEMS AND METHODS TO MITIGATE HEAT LEAK BACK IN A THERMOELECTRIC REFRIGERATION SYSTEM

(71) Applicant: Phononic Devices, Inc., Durham, NC (US)

(72) Inventors: Jesse W. Edwards, Cary, NC (US); M. Sean June, Raleigh, NC (US); Robert Joseph Therrien, Cary, NC (US); Abhishek Yadav, Raleigh, NC (US)

(73) Assignee: Phononic Devices, Inc., Durham, NC (US)

( * ) Notice: Subject to any disclaimer, the term of this patent is extended or adjusted under 35 U.S.C. 154(b) by 0 days.

(21) Appl. No.: 13/867,519

(22) Filed: Apr. 22, 2013

(65) Prior Publication Data
US 2013/0291556 A1 Nov. 7, 2013

Related U.S. Application Data

(63) Continuation of application No. 13/836,525, filed on Mar. 15, 2013, now abandoned.

(60) Provisional application No. 61/643,622, filed on May 7, 2012, provisional application No. 61/643,625, filed
(Continued)

(51) Int. Cl.
*F25B 21/04* (2006.01)
*F25B 21/02* (2006.01)

(52) U.S. Cl.
CPC .............. *F25B 21/02* (2013.01); *F25B 21/04* (2013.01); *F25B 2321/021* (2013.01); *F25B 2321/025* (2013.01); *F25B 2700/2104* (2013.01)

(58) Field of Classification Search
CPC ..................... F25B 21/02; F25B 2321/025
USPC ..................... 62/3.1, 3.2, 3.6, 3.7
See application file for complete search history.

(56) References Cited

U.S. PATENT DOCUMENTS

| 2,027,057 A | 1/1936 | Munters |
| 2,938,357 A | 5/1960 | Sheckler |

(Continued)

FOREIGN PATENT DOCUMENTS

| DE | 20105487 U1 | 10/2001 |
| EP | 0484034 A1 | 5/1992 |

(Continued)

OTHER PUBLICATIONS

Author Unknown, "Heat Pipe", Wikipedia—the free encyclopedia, Updated Jul. 9, 2013, Retrieved Jul. 19, 2013, http://en.wikipedia.org/wiki/Heat_Pipe, 10 pages.
(Continued)

*Primary Examiner* — Ljiljana Ciric
*Assistant Examiner* — Alexis Cox
(74) *Attorney, Agent, or Firm* — Withrow & Terranova, PLLC

(57) ABSTRACT

A thermoelectric refrigeration system includes a heat exchanger that includes a cold side heat sink and a hot side heat sink. The thermoelectric refrigeration system also includes a heat exchange loop coupled to one of the cold side heat sink and the hot side heat sink, the heat exchange loop operating according to thermosiphon principles to provide passive two-phase transport of a working fluid through the heat exchange loop. The thermoelectric refrigeration system also includes thermal insulation that thermally insulates the heat exchanger from a cooling chamber of the thermoelectric refrigeration system or an environment that is external to the thermoelectric refrigeration system.

15 Claims, 33 Drawing Sheets

Related U.S. Application Data on May 7, 2012, provisional application No. 61/643,628, filed on May 7, 2012, provisional application No. 61/643,631, filed on May 7, 2012, provisional application No. 61/643,635, filed on May 7, 2012, provisional application No. 61/643,640, filed on May 7, 2012, provisional application No. 61/643,644, filed on May 7, 2012, provisional application No. 61/643,646, filed on May 7, 2012, provisional application No. 61/643,649, filed on May 7, 2012, provisional application No. 61/716,882, filed on Oct. 22, 2012, provisional application No. 61/716,885, filed on Oct. 22, 2012, provisional application No. 61/739,239, filed on Dec. 19, 2012.

(56) References Cited

U.S. PATENT DOCUMENTS

| | | | |
|---|---|---|---|
| 2,947,150 A * | 8/1960 | Roeder, Jr. | 62/3.6 |
| 3,100,969 A * | 8/1963 | Elfving | 62/3.6 |
| 3,191,391 A * | 6/1965 | Muller | 62/3.3 |
| 3,196,620 A * | 7/1965 | Elfving et al. | 62/3.2 |
| 3,393,127 A | 7/1968 | Detman et al. | |
| 3,532,159 A | 10/1970 | Hammitt et al. | |
| 3,621,906 A | 11/1971 | Leffert | |
| 3,821,881 A | 7/1974 | Harkias | |
| 4,011,104 A * | 3/1977 | Basiulis | 136/205 |
| 4,213,448 A | 7/1980 | Hebert | |
| 4,278,906 A | 7/1981 | Kullmann | |
| 4,306,613 A | 12/1981 | Christopher | |
| 4,335,578 A | 6/1982 | Osborn et al. | |
| 4,357,932 A | 11/1982 | Stacy | |
| 4,366,857 A | 1/1983 | Mayer | |
| 4,382,466 A | 5/1983 | Shiraishi | |
| 4,383,414 A | 5/1983 | Beitner | |
| 4,393,663 A | 7/1983 | Grunes et al. | |
| 4,449,377 A | 5/1984 | Draper | |
| 4,474,228 A | 10/1984 | Rogalski et al. | |
| 4,476,922 A | 10/1984 | Heilig, Jr. et al. | |
| 4,498,306 A | 2/1985 | Tyree, Jr. | |
| 4,505,261 A | 3/1985 | Hunter | |
| 4,513,732 A | 4/1985 | Feldman, Jr. | |
| 4,545,364 A | 10/1985 | Maloney | |
| 4,546,608 A | 10/1985 | Shiina et al. | |
| 4,607,498 A | 8/1986 | Dinh | |
| 4,687,048 A | 8/1987 | Edelstein et al. | |
| 4,700,771 A | 10/1987 | Bennett et al. | |
| 4,796,439 A | 1/1989 | Yamada et al. | |
| 4,810,460 A | 3/1989 | Gluntz | |
| 4,833,567 A | 5/1989 | Saaski et al. | |
| 4,842,050 A | 6/1989 | Harper | |
| 4,848,445 A | 7/1989 | Harper | |
| 5,000,252 A | 3/1991 | Faghri | |
| 5,069,274 A | 12/1991 | Haslett et al. | |
| 5,161,090 A | 11/1992 | Crawford et al. | |
| 5,190,098 A | 3/1993 | Long | |
| 5,195,575 A | 3/1993 | Wylie | |
| 5,309,725 A | 5/1994 | Cayce | |
| 5,333,677 A | 8/1994 | Molivadas | |
| 5,355,678 A | 10/1994 | Beitner | |
| 5,384,051 A | 1/1995 | McGinness | |
| 5,385,203 A | 1/1995 | Mitsuhashi et al. | |
| 5,386,701 A | 2/1995 | Cao | |
| 5,400,607 A | 3/1995 | Cayce | |
| 5,406,805 A | 4/1995 | Radermacher et al. | |
| 5,408,847 A | 4/1995 | Erickson | |
| 5,411,077 A | 5/1995 | Tousignant | |
| 5,456,081 A | 10/1995 | Chrysler et al. | |
| 5,458,189 A | 10/1995 | Larson et al. | |
| 5,477,706 A | 12/1995 | Kirol et al. | |
| 5,551,244 A | 9/1996 | Bailey | |
| 5,558,783 A | 9/1996 | McGuinness | |
| 5,579,830 A | 12/1996 | Giammaruti | |
| 5,587,880 A | 12/1996 | Phillips et al. | |
| 5,596,981 A | 1/1997 | Soucy | |
| 5,598,721 A | 2/1997 | Rockenfeller et al. | |
| 5,622,057 A | 4/1997 | Bussjager et al. | |
| 5,628,205 A | 5/1997 | Rockenfeller et al. | |
| 5,647,429 A | 7/1997 | Oktay et al. | |
| 5,655,598 A | 8/1997 | Garriss et al. | |
| 5,695,007 A | 12/1997 | Fauconnier et al. | |
| 5,704,416 A | 1/1998 | Larson et al. | |
| 5,737,840 A | 4/1998 | Akachi | |
| 5,737,923 A | 4/1998 | Gilley et al. | |
| 5,770,903 A | 6/1998 | Bland et al. | |
| 5,864,466 A | 1/1999 | Remsburg | |
| 5,890,371 A | 4/1999 | Rajasubramanian et al. | |
| 5,931,156 A | 8/1999 | Wang et al. | |
| 5,966,939 A | 10/1999 | Tauchi | |
| 5,970,719 A | 10/1999 | Merritt | |
| 6,003,319 A | 12/1999 | Gilley et al. | |
| 6,006,998 A | 12/1999 | Rerolle | |
| 6,014,968 A | 1/2000 | Teoh | |
| 6,019,165 A | 2/2000 | Batchelder | |
| 6,021,844 A | 2/2000 | Batchelder | |
| 6,055,157 A | 4/2000 | Bartilson | |
| RE36,684 E | 5/2000 | Rockenfeller et al. | |
| 6,064,572 A | 5/2000 | Remsburg | |
| 6,073,888 A | 6/2000 | Gelon et al. | |
| 6,097,597 A | 8/2000 | Kobayashi | |
| 6,109,044 A | 8/2000 | Porter et al. | |
| 6,148,905 A | 11/2000 | Sehmbey | |
| 6,158,502 A | 12/2000 | Thomas | |
| 6,161,388 A | 12/2000 | Ghoshal | |
| 6,167,948 B1 | 1/2001 | Thomas | |
| 6,192,979 B1 | 2/2001 | Koch et al. | |
| 6,234,242 B1 | 5/2001 | Sehmbey et al. | |
| 6,237,223 B1 | 5/2001 | McCullough | |
| 6,237,682 B1 | 5/2001 | Bowers et al. | |
| 6,294,853 B1 | 9/2001 | Lin et al. | |
| 6,314,741 B1 * | 11/2001 | Hiraishi | 62/3.7 |
| 6,347,521 B1 | 2/2002 | Kadotani et al. | |
| 6,360,813 B1 | 3/2002 | Katoh et al. | |
| 6,382,309 B1 | 5/2002 | Kroliczek et al. | |
| 6,388,882 B1 | 5/2002 | Hoover et al. | |
| 6,410,982 B1 | 6/2002 | Brownell et al. | |
| 6,418,729 B1 * | 7/2002 | Dominguez-Alonso et al. | 62/3.6 |
| 6,463,743 B1 * | 10/2002 | Laliberte | 62/3.3 |
| 6,499,777 B1 | 12/2002 | Wang | |
| 6,533,029 B1 | 3/2003 | Phillips | |
| 6,536,510 B2 | 3/2003 | Khrustalev et al. | |
| 6,549,408 B2 | 4/2003 | Berchowitz | |
| 6,557,354 B1 | 5/2003 | Chu et al. | |
| 6,564,860 B1 | 5/2003 | Kroliczek et al. | |
| 6,568,857 B1 | 5/2003 | Richard et al. | |
| 6,585,039 B2 | 7/2003 | Sagal et al. | |
| 6,631,624 B1 | 10/2003 | Kirol et al. | |
| 6,631,755 B1 | 10/2003 | Kung et al. | |
| 6,642,485 B2 | 11/2003 | Goenka et al. | |
| 6,657,121 B2 | 12/2003 | Garner | |
| 6,658,857 B1 | 12/2003 | George | |
| 6,672,373 B2 | 1/2004 | Smyrnov | |
| 6,679,316 B1 | 1/2004 | Lin et al. | |
| 6,681,487 B2 | 1/2004 | Sagal et al. | |
| 6,698,502 B1 | 3/2004 | Lee | |
| 6,739,138 B2 | 5/2004 | Saunders et al. | |
| 6,745,830 B2 | 6/2004 | Dinh | |
| 6,771,498 B2 | 8/2004 | Wang et al. | |
| 6,789,610 B1 | 9/2004 | Hegde | |
| 6,804,117 B2 | 10/2004 | Phillips et al. | |
| 6,808,011 B2 | 10/2004 | Lindemuth et al. | |
| 6,828,675 B2 | 12/2004 | Memory et al. | |
| 6,866,092 B1 | 3/2005 | Molivadas | |
| 6,889,753 B2 | 5/2005 | Takamizawa et al. | |
| 6,889,754 B2 | 5/2005 | Kroliczek et al. | |
| 6,972,365 B2 | 12/2005 | Garner | |
| 6,994,151 B2 | 2/2006 | Zhou et al. | |
| 7,004,240 B1 | 2/2006 | Kroliczek et al. | |
| 7,013,955 B2 | 3/2006 | Phillips et al. | |
| 7,013,956 B2 | 3/2006 | Thayer et al. | |
| 7,032,389 B2 | 4/2006 | Cauchy | |
| 7,061,763 B2 | 6/2006 | Tsoi | |

(56) References Cited

U.S. PATENT DOCUMENTS

| | | |
|---|---|---|
| 7,069,975 B1 | 7/2006 | Haws et al. |
| 7,071,408 B2 | 7/2006 | Garner |
| 7,077,189 B1 | 7/2006 | Reyzin et al. |
| 7,096,928 B2 | 8/2006 | Phillips et al. |
| 7,102,267 B2 | 9/2006 | Gromoll et al. |
| 7,124,594 B2 | 10/2006 | McRell |
| 7,127,023 B2 | 10/2006 | Wieland |
| 7,131,484 B2 | 11/2006 | Gayrard et al. |
| 7,143,818 B2 | 12/2006 | Thayer et al. |
| 7,156,279 B2 | 1/2007 | Goenke et al. |
| 7,162,878 B2 | 1/2007 | Narayanamurthy et al. |
| 7,174,950 B2 | 2/2007 | Jacqué et al. |
| 7,185,512 B2 | 3/2007 | Badie et al. |
| 7,212,403 B2 | 5/2007 | Rockenfeller |
| 7,212,409 B1 | 5/2007 | Belady et al. |
| 7,215,541 B2 | 5/2007 | Nelson |
| 7,227,749 B2 | 6/2007 | Rockenfeller |
| 7,231,961 B2 | 6/2007 | Alex et al. |
| 7,251,889 B2 | 8/2007 | Kroliczek et al. |
| 7,266,969 B2 | 9/2007 | Hsu et al. |
| 7,266,976 B2 | 9/2007 | Eaton et al. |
| 7,282,678 B2 | 10/2007 | Tung et al. |
| 7,285,802 B2 | 10/2007 | Ouderkirk et al. |
| 7,304,842 B2 | 12/2007 | Yatskov |
| 7,310,971 B2 | 12/2007 | Eaton et al. |
| 7,325,590 B2 | 2/2008 | Kim et al. |
| 7,334,630 B2 | 2/2008 | Goodson et al. |
| 7,380,584 B2 | 6/2008 | Ippoushi et al. |
| 7,406,999 B2 | 8/2008 | Bhatti et al. |
| 7,416,017 B2 | 8/2008 | Haws et al. |
| 7,424,906 B2 | 9/2008 | Bhatti et al. |
| 7,448,222 B2 | 11/2008 | Bormann |
| 7,475,718 B2 | 1/2009 | Reyzin et al. |
| 7,477,516 B2 | 1/2009 | Joshi et al. |
| 7,487,643 B2 | 2/2009 | Chen et al. |
| 7,497,249 B2 | 3/2009 | Bhatti et al. |
| 7,505,268 B2 | 3/2009 | Schick |
| 7,506,682 B2 | 3/2009 | Bhatti et al. |
| 7,509,995 B2 | 3/2009 | Bhatti et al. |
| 7,512,206 B2 | 3/2009 | Wieland |
| 7,520,317 B2 | 4/2009 | Rusch et al. |
| 7,532,467 B2 | 5/2009 | Launay et al. |
| 7,556,086 B2 | 7/2009 | Joshi et al. |
| 7,556,088 B2 | 7/2009 | Joshi et al. |
| 7,556,089 B2 | 7/2009 | Bhatti et al. |
| 7,566,999 B2 | 7/2009 | Neal |
| 7,604,040 B2 | 10/2009 | Ghosh et al. |
| 7,623,350 B2 | 11/2009 | Tien et al. |
| 7,629,716 B2 | 12/2009 | Neal |
| 7,642,644 B2 | 1/2010 | Wilkins et al. |
| 7,644,753 B2 | 1/2010 | Ghosh et al. |
| 7,650,928 B2 | 1/2010 | Bhatti et al. |
| 7,665,511 B2 | 2/2010 | Bhatti et al. |
| 7,683,509 B2 | 3/2010 | Neal |
| 7,708,053 B2 | 5/2010 | Kroliczek et al. |
| 7,770,632 B2 | 8/2010 | Bhatti et al. |
| 7,841,305 B2 | 11/2010 | King et al. |
| 7,841,387 B2 | 11/2010 | Ippoushi et al. |
| 7,854,129 B2 | 12/2010 | Narayanamurthy |
| 7,928,348 B2 | 4/2011 | Neal |
| 7,954,331 B2 | 6/2011 | Ullman |
| 7,958,935 B2 | 6/2011 | Belits et al. |
| 8,016,024 B2 | 9/2011 | Kang et al. |
| 8,033,017 B2 | 10/2011 | Kim et al. |
| 8,066,055 B2 | 11/2011 | Kroliczek et al. |
| 8,109,325 B2 | 2/2012 | Kroliczek et al. |
| 8,136,580 B2 | 3/2012 | Kroliczek et al. |
| 8,213,471 B2 | 7/2012 | Schlie et al. |
| 8,216,871 B2 | 7/2012 | McCann |
| 8,217,557 B2 | 7/2012 | Sills et al. |
| 8,763,408 B2 | 7/2014 | Ma et al. |
| 8,893,513 B2 | 11/2014 | June et al. |
| 8,991,194 B2 | 3/2015 | Edwards et al. |
| 2001/0023762 A1 | 9/2001 | Sagal |
| 2002/0023456 A1 | 2/2002 | Sone |
| 2002/0038550 A1 | 4/2002 | Gillen |
| 2002/0070486 A1 | 6/2002 | Kim et al. |
| 2003/0029174 A1 | 2/2003 | Lee |
| 2003/0075306 A1 | 4/2003 | Zuo et al. |
| 2003/0111516 A1* | 6/2003 | Ghoshal ................ 228/134 |
| 2003/0121515 A1 | 7/2003 | Yu-Chu et al. |
| 2003/0159806 A1 | 8/2003 | Sehmbey et al. |
| 2004/0154312 A1* | 8/2004 | Abras ................ 62/3.7 |
| 2005/0011199 A1 | 1/2005 | Grisham et al. |
| 2005/0056403 A1 | 3/2005 | Norlin et al. |
| 2005/0061486 A1 | 3/2005 | Yang |
| 2005/0091989 A1* | 5/2005 | Leija et al. ................ 62/3.2 |
| 2005/0172644 A1 | 8/2005 | Zhang et al. |
| 2005/0257532 A1 | 11/2005 | Ikeda et al. |
| 2006/0088746 A1 | 4/2006 | Tuma et al. |
| 2006/0108097 A1 | 5/2006 | Hodes et al. |
| 2006/0162903 A1 | 7/2006 | Bhatti et al. |
| 2006/0254753 A1 | 11/2006 | Phillips et al. |
| 2007/0028626 A1 | 2/2007 | Chen |
| 2007/0028955 A1 | 2/2007 | Sogou et al. |
| 2007/0101730 A1 | 5/2007 | Chen et al. |
| 2007/0227701 A1 | 10/2007 | Bhatti et al. |
| 2007/0227703 A1 | 10/2007 | Bhatti et al. |
| 2007/0246193 A1 | 10/2007 | Bhatti et al. |
| 2007/0246195 A1 | 10/2007 | Bhatti et al. |
| 2007/0256427 A1 | 11/2007 | Tateyama et al. |
| 2007/0267180 A1 | 11/2007 | Asfia et al. |
| 2008/0012436 A1 | 1/2008 | Neal |
| 2008/0013283 A1 | 1/2008 | Gilbert et al. |
| 2008/0022696 A1* | 1/2008 | Welle et al. ................ 62/3.7 |
| 2008/0047692 A1 | 2/2008 | Weinstein |
| 2008/0049384 A1 | 2/2008 | Unternaehrer et al. |
| 2008/0098750 A1* | 5/2008 | Busier ................ 62/3.3 |
| 2008/0179047 A1 | 7/2008 | Yesin et al. |
| 2008/0202155 A1 | 8/2008 | Taras et al. |
| 2008/0209919 A1 | 9/2008 | Ackermann et al. |
| 2008/0236175 A1* | 10/2008 | Chaparro Monferrer et al. ................ 62/3.2 |
| 2009/0000310 A1 | 1/2009 | Bell et al. |
| 2009/0056916 A1 | 3/2009 | Yesin et al. |
| 2009/0064411 A1 | 3/2009 | Marquette et al. |
| 2009/0126905 A1 | 5/2009 | Dinh |
| 2009/0139263 A1 | 6/2009 | Brostow et al. |
| 2009/0229794 A1 | 9/2009 | Schon |
| 2009/0293500 A1 | 12/2009 | Chen et al. |
| 2009/0293504 A1 | 12/2009 | Oomen et al. |
| 2009/0308571 A1 | 12/2009 | Thompson et al. |
| 2009/0314472 A1 | 12/2009 | Kim et al. |
| 2010/0000233 A1 | 1/2010 | Groothuis et al. |
| 2010/0006265 A1 | 1/2010 | De Larminat et al. |
| 2010/0031991 A1 | 2/2010 | Mochizuki et al. |
| 2010/0043463 A1 | 2/2010 | Fleming et al. |
| 2010/0059880 A1 | 3/2010 | Baek |
| 2010/0078061 A1 | 4/2010 | Lu et al. |
| 2010/0154109 A1 | 6/2010 | Roseberry |
| 2010/0155034 A1 | 6/2010 | Müller et al. |
| 2010/0186820 A1 | 7/2010 | Schon |
| 2010/0248968 A1 | 9/2010 | Stautner |
| 2010/0288586 A1 | 11/2010 | Gorbounov et al. |
| 2010/0300654 A1 | 12/2010 | Edwards |
| 2010/0305918 A1 | 12/2010 | Udell |
| 2010/0326627 A1 | 12/2010 | Schon |
| 2010/0326632 A1 | 12/2010 | Nagai et al. |
| 2011/0016886 A1 | 1/2011 | Ghoshal et al. |
| 2011/0030400 A1 | 2/2011 | Agostini et al. |
| 2011/0043092 A1 | 2/2011 | Shuja et al. |
| 2011/0048676 A1 | 3/2011 | Toyoda et al. |
| 2011/0073284 A1 | 3/2011 | Yoo et al. |
| 2011/0083446 A1 | 4/2011 | Pinet |
| 2011/0120673 A1 | 5/2011 | Xiang et al. |
| 2011/0162829 A1 | 7/2011 | Xiang |
| 2011/0174003 A1 | 7/2011 | Wenger |
| 2011/0203777 A1 | 8/2011 | Zhao et al. |
| 2011/0206965 A1 | 8/2011 | Han et al. |
| 2011/0259041 A1 | 10/2011 | Kuehl et al. |
| 2011/0272319 A1 | 11/2011 | Koivuluoma et al. |
| 2011/0277967 A1 | 11/2011 | Fried et al. |
| 2011/0284189 A1 | 11/2011 | Sinha et al. |
| 2011/0289953 A1 | 12/2011 | Alston |

(56) References Cited

U.S. PATENT DOCUMENTS

| | | |
|---|---|---|
| 2011/0308709 A1 | 12/2011 | Ouellette |
| 2012/0017625 A1 | 1/2012 | Kroliczek et al. |
| 2012/0019098 A1 | 1/2012 | Erbil et al. |
| 2012/0024497 A1 | 2/2012 | Kroliczek et al. |
| 2012/0047911 A1 | 3/2012 | Bhavsar et al. |
| 2012/0047917 A1 | 3/2012 | Rafalovich |
| 2012/0067558 A1 | 3/2012 | Phan et al. |
| 2012/0087090 A1 | 4/2012 | Feng et al. |
| 2012/0090343 A1 | 4/2012 | Couto et al. |
| 2012/0111553 A1 | 5/2012 | Tsoi et al. |
| 2012/0131932 A1 | 5/2012 | Kroliczek et al. |
| 2012/0140403 A1 | 6/2012 | Lau et al. |
| 2012/0175087 A1 | 7/2012 | Kroliczek et al. |
| 2012/0176794 A1 | 7/2012 | Joung et al. |
| 2013/0025295 A1 | 1/2013 | Brehm et al. |
| 2013/0291555 A1 | 11/2013 | Edwards et al. |
| 2013/0291557 A1 | 11/2013 | Edwards et al. |
| 2013/0291558 A1 | 11/2013 | Edwards et al. |
| 2013/0291559 A1 | 11/2013 | June et al. |
| 2013/0291560 A1 | 11/2013 | Therrien et al. |
| 2013/0291561 A1 | 11/2013 | Edwards et al. |
| 2013/0291562 A1 | 11/2013 | Edwards et al. |
| 2013/0291563 A1 | 11/2013 | Edwards et al. |
| 2013/0291564 A1 | 11/2013 | Ghoshal et al. |
| 2015/0116943 A1* | 4/2015 | Olsson .................... H01L 35/32 361/708 |

FOREIGN PATENT DOCUMENTS

| | | |
|---|---|---|
| EP | 0910535 A1 | 4/1999 |
| EP | 0697085 B1 | 9/1999 |
| EP | 1003006 A1 | 5/2000 |
| EP | 1505662 A2 | 2/2005 |
| EP | 1388444 B1 | 2/2006 |
| EP | 1553841 B1 | 5/2006 |
| EP | 1909053 A2 | 4/2008 |
| EP | 1639060 B1 | 5/2008 |
| EP | 1967808 A1 | 9/2008 |
| EP | 2276046 A1 | 1/2011 |
| EP | 2330067 A1 | 6/2011 |
| EP | 2463870 A1 | 6/2012 |
| GB | 2404086 A | 1/2005 |
| JP | 54048350 A | 4/1979 |
| JP | 56012997 A | 2/1981 |
| JP | 57196089 A | 12/1982 |
| JP | 57202494 A | 12/1982 |
| JP | 58123091 A | 7/1983 |
| JP | 58174109 A | 10/1983 |
| JP | 58178191 A | 10/1983 |
| JP | 58198648 A | 11/1983 |
| JP | 60253791 A | 12/1985 |
| JP | 61142635 A | 6/1986 |
| JP | 61228292 A | 10/1986 |
| JP | 62041531 A | 2/1987 |
| JP | 62284147 A | 12/1987 |
| JP | 62294897 A | 12/1987 |
| JP | 1222825 A | 9/1989 |
| JP | 2238117 A | 9/1990 |
| JP | 04174269 A | 6/1992 |
| JP | 9164316 A | 6/1997 |
| JP | 9222286 A | 8/1997 |
| JP | H09207997 A | 8/1997 |
| JP | 9273877 A | 10/1997 |
| JP | 11063862 A | 3/1999 |
| JP | 3054098 B2 | 6/2000 |
| JP | 2001330339 A | 11/2001 |
| JP | 3273669 B2 | 4/2002 |
| JP | 2003244968 A | 8/2003 |
| JP | 2003343985 A | 12/2003 |
| JP | 2004140429 A | 5/2004 |
| JP | 2004278968 A | 10/2004 |
| JP | 2005315462 A | 11/2005 |
| JP | 2007093112 A | 4/2007 |
| JP | 4039380 B2 | 1/2008 |
| JP | 2008311399 A | 12/2008 |
| JP | 2009115396 A | 5/2009 |
| JP | 2009206113 A | 9/2009 |
| KR | 2004067701 A | 7/2004 |
| KR | 2005017631 A | 2/2005 |
| KR | 2005017738 A | 2/2005 |
| KR | 2005112427 A | 11/2005 |
| KR | 539044 B1 | 12/2005 |
| KR | 2005121128 A | 12/2005 |
| KR | 2006005748 A | 1/2006 |
| KR | 2006033321 A | 4/2006 |
| KR | 2006108680 A | 10/2006 |
| KR | 757614 B1 | 9/2007 |
| KR | 2007102889 A | 10/2007 |
| KR | 820448 B1 | 4/2008 |
| KR | 870985 B1 | 12/2008 |
| WO | 2010088433 A1 | 8/2010 |
| WO | 2011127416 A2 | 10/2011 |
| WO | 2012033476 A1 | 3/2012 |
| WO | 2012113890 A1 | 8/2012 |
| WO | 2012169989 A1 | 12/2012 |
| WO | 2013074057 A1 | 5/2013 |
| WO | 2013169874 A1 | 11/2013 |

OTHER PUBLICATIONS

Invitation to Pay Additional Fees for PCT/US2013/039943, mailed Aug. 19, 2013, 6 pages.

International Search Report and Written Opinion for PCT/US2013/039943, mailed Oct. 28, 2013, 14 pages.

Habte, Melaku, "Thermal Hydraulic Analysis of Two-Phase Closed Thermosyphon Cooling System for New Cold Neutron Source Moderator of Breazeale Research Reactor at Penn State," Dissertation for Pennsylvania State University Graduate School, Aug. 2008, 218 pages.

Kambe, Mitsuru et al., "Encapsulated Thermoelectric Modules and Compliant Pads for Advanced Thermoelectric Systems," Manuscript for Central Research Institute of Electric Power Industry (CRIEPI), Copyright: 2009, 8 pages.

Non-Final Office Action for U.S. Appl. No. 13/888,833, mailed Oct. 2, 2013, 11 pages.

Non-Final Office Action for U.S. Appl. No. 13/888,847, mailed Sep. 11, 2013, 31 pages.

Non-Final Office Action for U.S. Appl. No. 13/867,567, mailed Oct. 2, 2013, 9 pages.

Non-Final Office Action for U.S. Appl. No. 13/867,589, mailed Oct. 3, 2013, 9 pages.

Non-Final Office Action for U.S. Appl. No. 13/888,799, mailed Sep. 4, 2013, 19 pages.

Non-Final Office Action for U.S. Appl. No. 13/888,820, mailed Oct. 9, 2013, 10 pages.

Non-Final Office Action for U.S. Appl. No. 13/888,791, mailed Nov. 22, 2013, 17 pages.

Non-Final Office Action for U.S. Appl. No. 13/836,525, mailed Nov. 25, 2013, 21 pages.

Final Office Action for U.S. Appl. No. 13/888,799, mailed Dec. 24, 2013, 18 pages.

Final Office Action for U.S. Appl. No. 13/888,847, mailed Feb. 3, 2014, 24 pages.

International Search Report and Written Opinion for PCT/US2013/039945, mailed Dec. 9, 2013, 9 pages.

International Preliminary Report on Patentability for PCT/US2013/039943, mailed Apr. 28, 2014, 9 pages.

Final Office Action for U.S. Appl. No. 13/867,567, mailed May 1, 2014, 11 pages.

Final Office Action for U.S. Appl. No. 13/867,589, mailed Apr. 24, 2014, 12 pages.

Advisory Action for U.S. Appl. No. 13/888,799, mailed Mar. 6, 2014, 4 pages.

Non-Final Office Action for U.S. Appl. No. 13/888,799, mailed Apr. 29, 2014, 18 pages.

Final Office Action for U.S. Appl. No. 13/888,820, mailed Apr. 24, 2014, 13 pages.

Final Office Action for U.S. Appl. No. 13/888,833, mailed May 1, 2014, 11 pages.

(56) References Cited

OTHER PUBLICATIONS

Advisory Action and Examiner-Initiated Interview Summary for U.S. Appl. No. 13/888,847, mailed May 29, 2014, 5 pages
Final Office Action for U.S. Appl. No. 13/888,791, mailed Jun. 4, 2014, 20 pages.
Non-Final Office Action for U.S. Appl. No. 13/867,567, mailed Oct. 9, 2014, 13 pages.
Notice of Allowance and Examiner-Initiated Interview Summary for U.S. Appl. No. 13/867,589, mailed Oct. 8, 2014, 10 pages.
Advisory Action for U.S. Appl. No. 13/888,799, mailed Nov. 12, 2014, 3 pages.
Non-Final Office Action for U.S. Appl. No. 13/888,820, mailed Oct. 7, 2014, 12 pages.
Advisory Action and Examiner-Initiated Interview Summary for U.S. Appl. No. 13/888,833, mailed Oct. 9, 2014, 4 pages.
Advisory Action and Examiner-Initiated Interview Summary for U.S. Appl. No. 13/888,791, mailed Oct. 9, 2014, 5 pages.
Non-Final Office Action for U.S. Appl. No. 13/888,791, mailed Oct. 24, 2014, 20 pages.
Non-Final Office Action for U.S. Appl. No. 13/888,833, mailed Jan. 6, 2015, 15 pages.
Author Unknown, "Thermoelectric Technical Reference—Heat Sink Considerations," Ferrotec's Thermoelectric Technical Reference Guide, https://www.thermal.ferrotec.com/technology/thermo-electric/thermalRef05, accessed Aug. 11, 2014, Ferrotec (USA) Corporation, 2 pages.
Dousti, Mohammad Javad et al., "Power-Aware Deployment and Control of Forced-Convection and Thermoelectric Coolers," Proceedings of the 51st Annual Design Automation Conference, Jun. 1-5, 2014, San Francisco, CA, Association for Computing Machinery, pp. 1-6.
Ghoshal, U. et al., "Efficient Switched Thermoelectric Refrigerators for Cold Storage Applications," Journal of Electronic Materials, vol. 38, Issue 7, Jul. 1, 2009, Springer US, pp. 1148-1153.
Advisory Action and Examiner-Initiated Interview Summary for U.S. Appl. No. 13/867,567, mailed Sep. 11, 2014, 5 pages.
Advisory Action and Examiner-Initiated Interview Summary for U.S. Appl. No. 13/867,589, mailed Aug. 7, 2014, 5 pages.
Advisory Action for U.S. Appl. No. 13/867,589, mailed Aug. 19, 2014, 3 pages.
Final Office Action for U.S. Appl. No. 13/888,799, mailed Aug. 15, 2014, 17 pages.
Advisory Action and Examiner-Initiated Interview Summary for U.S. Appl. No. 13/888,820 mailed Aug. 25, 2014, 5 pages.
Advisory Action and Examiner-Initiated Interview Summary for U.S. Appl. No. 13/888,833, mailed Sep. 3, 2014, 4 pages.
Notice of Allowance and Examiner-Initiated Interview Summary for U.S. Appl. No. 13/888,847, mailed Jun. 30, 2014, 8 pages.
Advisory Action and Examiner-Initiated Interview Summary for U.S. Appl. No. 13/888,791, mailed Sep. 3, 2014, 5 pages.
International Preliminary Report on Patentability for PCT/US2013/039945, mailed Jul. 28, 2014, 8 pages.
Final Office Action for U.S. Appl. No. 13/867,567, mailed Mar. 27, 2015, 14 pages.
Non-Final Office Action for U.S. Appl. No. 13/888,799, mailed Apr. 10, 2015, 13 pages.
Notice of Allowance for U.S. Appl. No. 13/888,820, mailed Apr. 2, 2015, 8 pages.
Final Office Action for U.S. Appl. No. 13/888,791, mailed Apr. 1, 2015, 21 pages.
Final Office Action and Examiner-Initiated Interview Summary for U.S. Appl. No. 13/888,833, mailed May 7, 2015, 23 pages.
Final Office Action for U.S. Appl. No. 13/888,799, mailed Sep. 16, 2015, 14 pages.
Notice of Allowance, Applicant-Initiated Interview Summary, and AFCP 2.0 Decision for U.S. Appl. No. 13/888,833, mailed Sep. 1, 2015, 17 pages.
Notice of Allowance and Examiner-Initiated Interview Summary for U.S. Appl. No. 13/888,799, mailed Jan. 5, 2016, 9 pages.
Non-Final Office Action for U.S. Appl. No. 14/849,177, mailed Dec. 14, 2015, 8 pages.
International Search Report and Written Opinion for International Patent Application No. PCT/US2015/041383, mailed Nov. 10, 2015, 11 pages.
International Search Report and Written Opinion for International Patent Application No. PCT/US2015/041388, mailed Oct. 28, 2015, 9 pages.

* cited by examiner

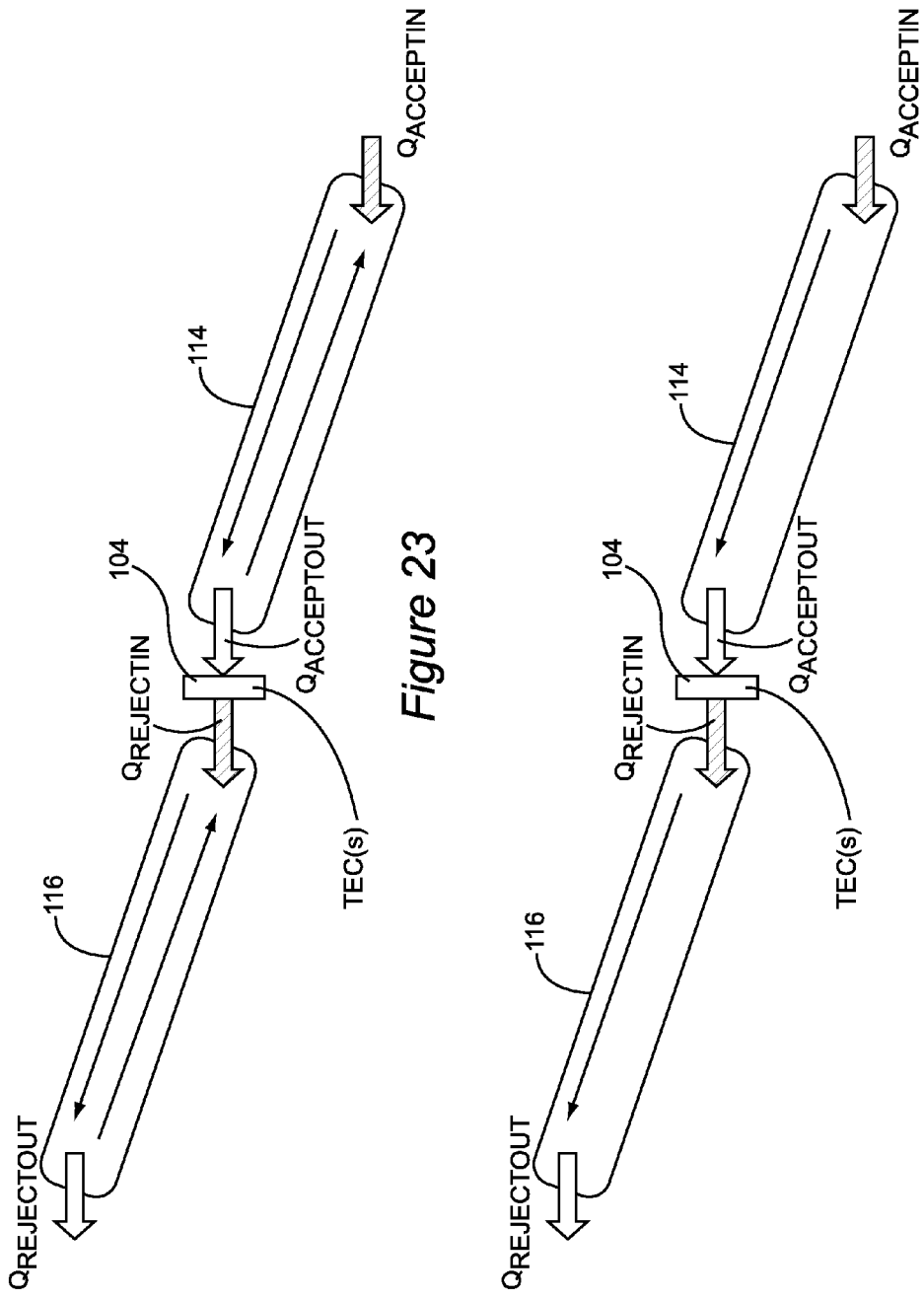

SYSTEMS AND METHODS TO MITIGATE HEAT LEAK BACK IN A THERMOELECTRIC REFRIGERATION SYSTEM

RELATED APPLICATIONS

This application is a Continuation of U.S. application Ser. No. 13/836,525 entitled THERMOELECTRIC REFRIGERATION SYSTEM CONTROL SCHEME FOR HIGH EFFICIENCY PERFORMANCE, filed Mar. 15, 2013, the disclosure of which is hereby incorporated herein by reference in its entirety. This application also claims the benefit of:

Provisional Application Ser. No. 61/643,622, filed May 7, 2012;
Provisional Application Ser. No. 61/643,625, filed May 7, 2012;
Provisional Application Ser. No. 61/643,628, filed May 7, 2012;
Provisional Application Ser. No. 61/643,631, filed May 7, 2012;
Provisional Application Ser. No. 61/643,635, filed May 7, 2012;
Provisional Application Ser. No. 61/643,640, filed May 7, 2012;
Provisional Application Ser. No. 61/643,644, filed May 7, 2012;
Provisional Application Ser. No. 61/643,646, filed May 7, 2012;
Provisional Application Ser. No. 61/643,649, filed May 7, 2012;
Provisional Application Ser. No. 61/716,882, filed Oct. 22, 2012;
Provisional Application Ser. No. 61/716,885, filed Oct. 22, 2012; and
Provisional Application Ser. No. 61/739,239, filed Dec. 19, 2012;

the disclosures of which are hereby incorporated herein by reference in their entireties.

FIELD OF THE DISCLOSURE

The present disclosure relates to a thermoelectric refrigeration system and more particularly relates to controlling thermoelectric devices to efficiently maintain a desired set point temperature in a thermoelectric refrigeration system.

BACKGROUND

Today, many refrigeration systems are vapor compression based and utilize a thermostatically regulated duty cycle control. However, typical vapor compression based refrigeration systems are not dynamic enough to meet both the steady state and transient demand, such as during pull down or recovery. Thus, vapor compression based refrigeration systems tend to have excess cooling capabilities that far exceed heat extraction demands required during steady state operation. While the extra capacity provided by the excess cooling capabilities allows improved pull down performance, large current surges prevalent during start-up requires higher capacity and consequently more expensive components to handle the loads. Moreover, the large current surges and loads incurred by duty cycle control excessively wear the components, thereby potentially causing premature failure. Further, by the very nature of their control, thermodynamic limits, and product performance demands, vapor compression based refrigeration systems are less efficient than optimum.

The sub-optimum efficiency disadvantage of vapor compression based refrigeration systems relates to precisely controlling the temperature within a cooling chamber. Typically, when a temperature within a cooling chamber exceeds a certain value, the vapor compression based refrigeration system activates and continues to run until the temperature in the cooling chamber is below the certain value. Once the cooling chamber reaches a temperature below the certain value, the vapor compression based refrigeration system shuts off. Nonetheless, in addition to excessive wear as noted above, this type of control scheme will typically have a relatively large control band and a relatively large internal temperature stratification in an effort to minimize energy consumption and allow for operation in varied ambient conditions. This regime is most often utilized because throttling or capacity variation is difficult and expensive to implement into the vapor compression cycle and provides limited efficacy as volumetric efficiency falls.

Accordingly, what is needed is a system and method for precisely controlling the temperature within a cooling chamber where the efficiency of the components used to extract heat from the cooling chamber is maximized. Furthermore, what is needed is a system and method that allow for individually selecting components, and thereby capacity, within a refrigeration system based on the cooling demands of a cooling chamber.

SUMMARY

Embodiments of the present disclosure relate to controlling multiple Thermoelectric Coolers (TECs) to maintain a set point temperature of a chamber. In one embodiment, a controller receives temperature data corresponding to a temperature of the chamber. Based on the temperature data, the controller selectively controls two or more subsets of the TECs to maintain the temperature of the chamber at a desired set point temperature. Each subset includes one or more different TECs. In one embodiment, the controller selectively controls the two or more subsets of the TECs by, for each subset of the TECs, independently activating or deactivating the subset of the TECs, independently controlling a current supplied to the subset of the TECs, and/or independently controlling a duty cycle of the subset of the TECs. In this manner, the controller is enabled to control the TECs such that the TECs operate to efficiently maintain the temperature of the chamber at the set point temperature.

In another embodiment, a thermoelectric refrigeration system includes one or more subsets of TECs and a controller configured to selectively control the one or more subsets of TECs. In order to selectively control the one or more subsets of TECs, the controller is configured to select one or more control schemes based on temperature data and a desired performance profile and control the one or more subsets of TECs according to the one or more control schemes. The one or more control schemes are selected by the controller from a set of control schemes of the controller, where the set of control schemes of the controller includes two or more of a group consisting of: independently controlling an activation and deactivation of each subset of TECs in the one or more subsets of TECs, independently controlling a current provided to each subset of TECs in the one or more subset of TECs, and independently controlling a duty cycle of each subset of TECs in the one or more subsets of TECs. Each subset of TECs includes one or more different TECs.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates a thermoelectric refrigeration system having a cooling chamber, a heat exchanger including a cartridge that includes multiple Thermoelectric Coolers (TECs) disposed between a cold side heat sink and a hot side heat sink, and a controller that controls the TECs to maintain a set point temperature within the cooling chamber in accordance with one embodiment of the present disclosure;

Figure 1:
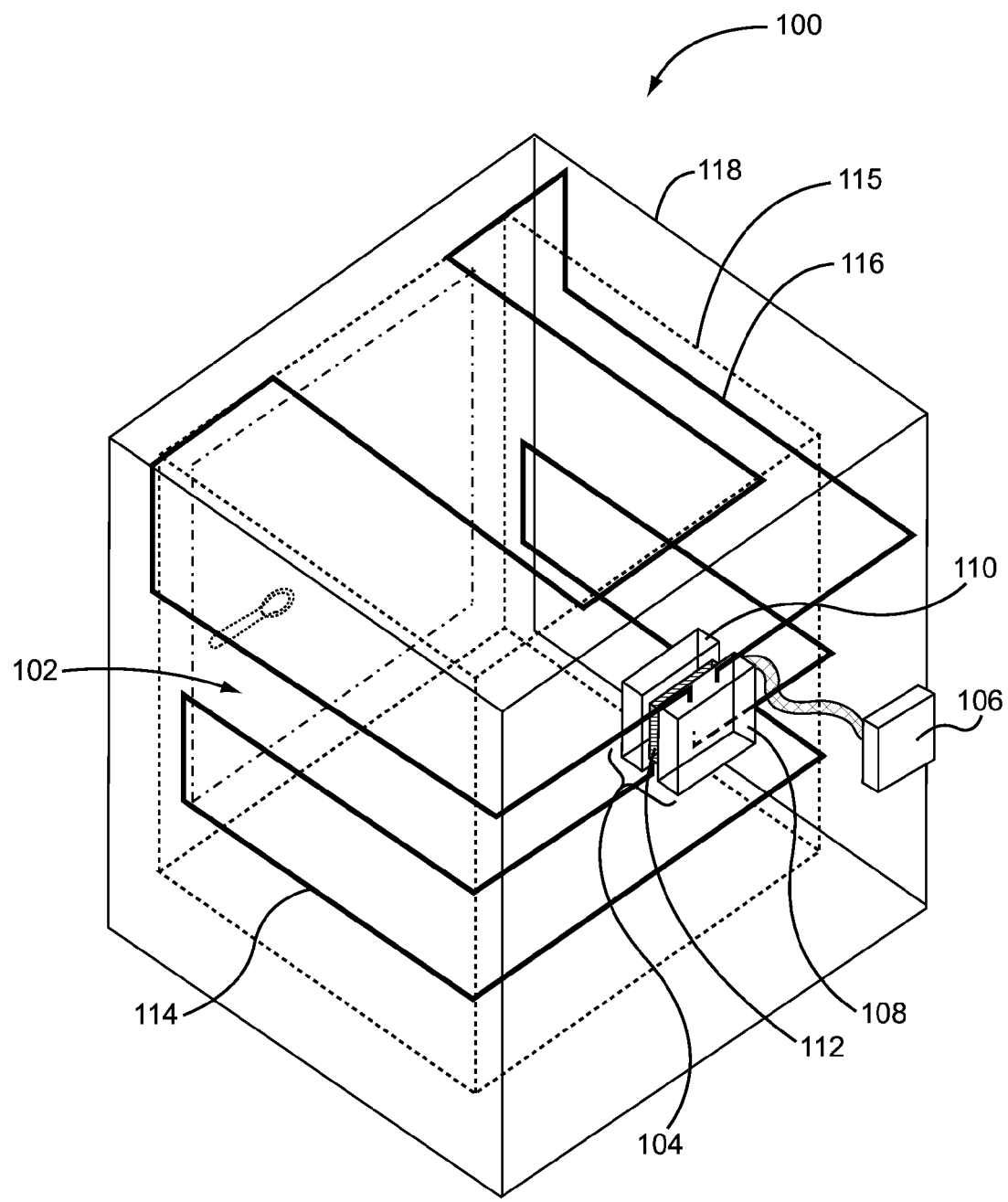
Figure 21:
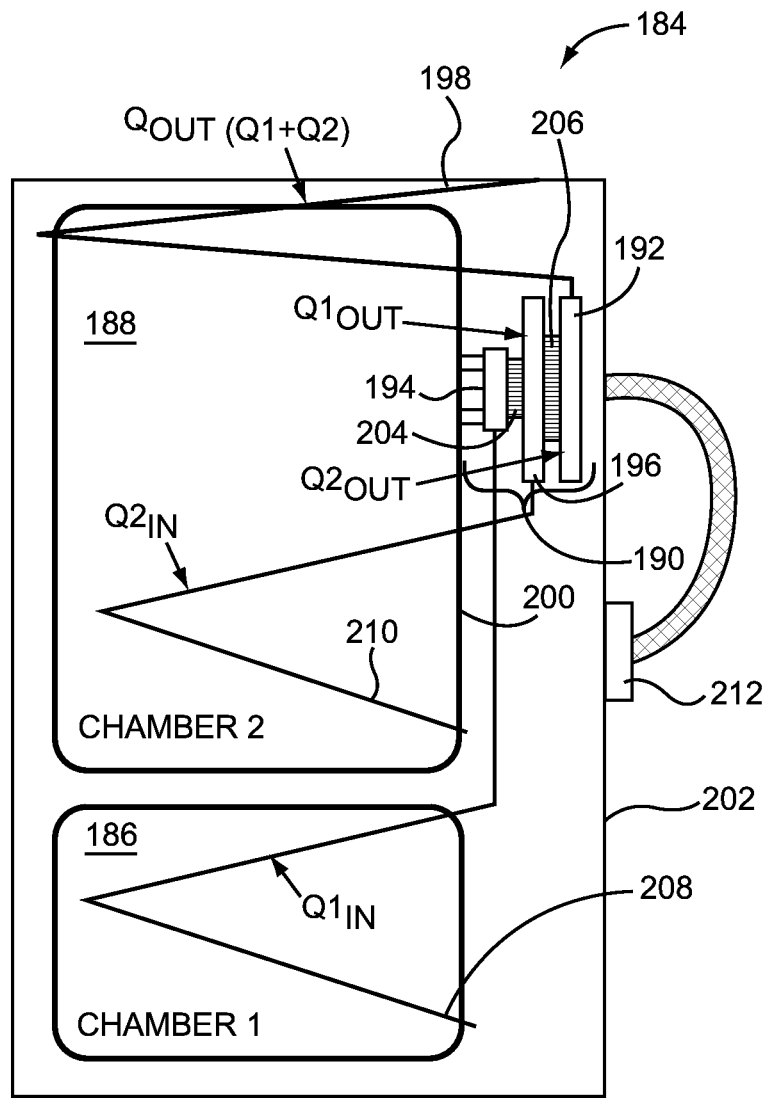
FIG. 21 illustrates a thermoelectric refrigeration system that includes two cooling chambers each having separate, thermally-coupled heat sinks in accordance with another embodiment of the present disclosure.
Figure 22:
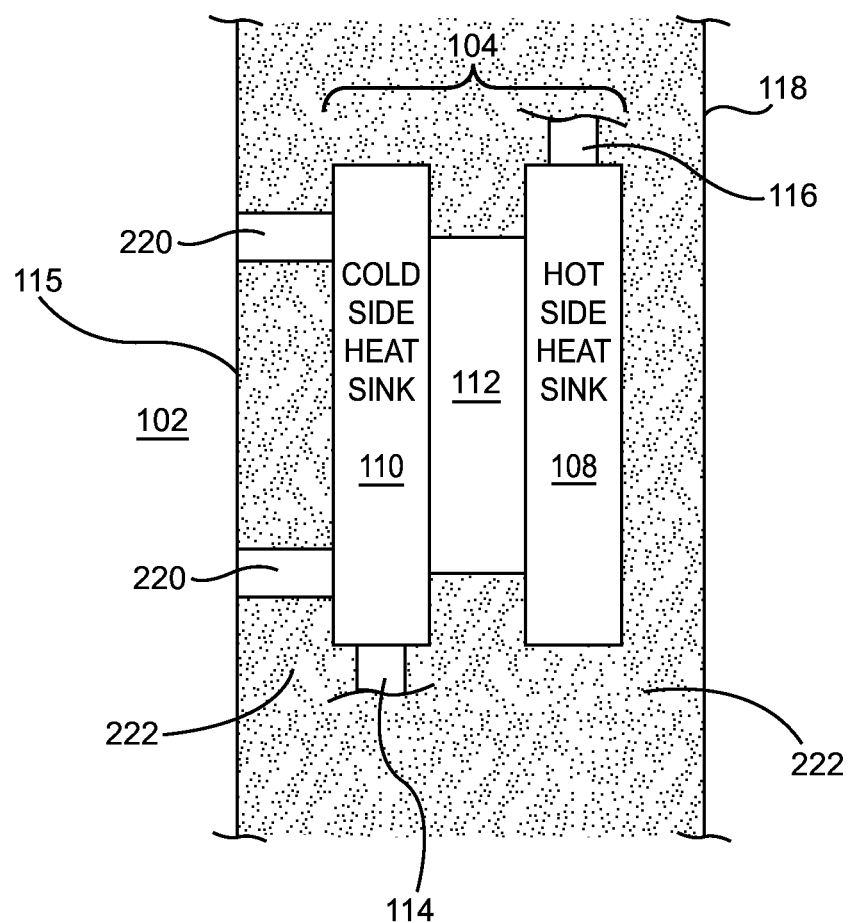
FIG. 22 is a more detailed illustration of the heat exchanger of FIG. 1 in accordance with one embodiment of the present disclosure.
Figure 25:
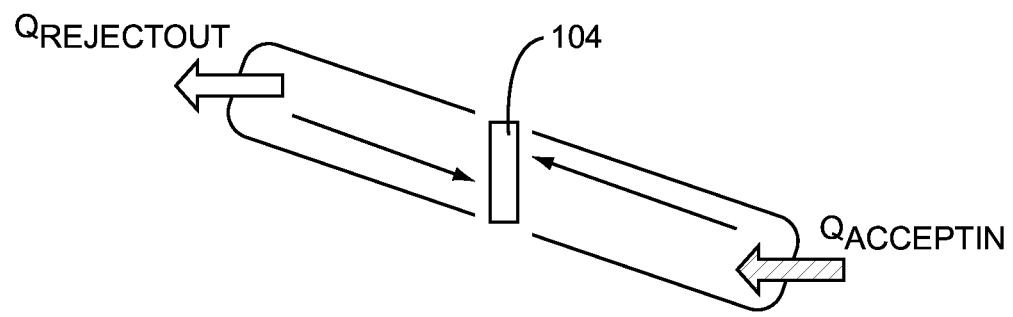
Figure 30:
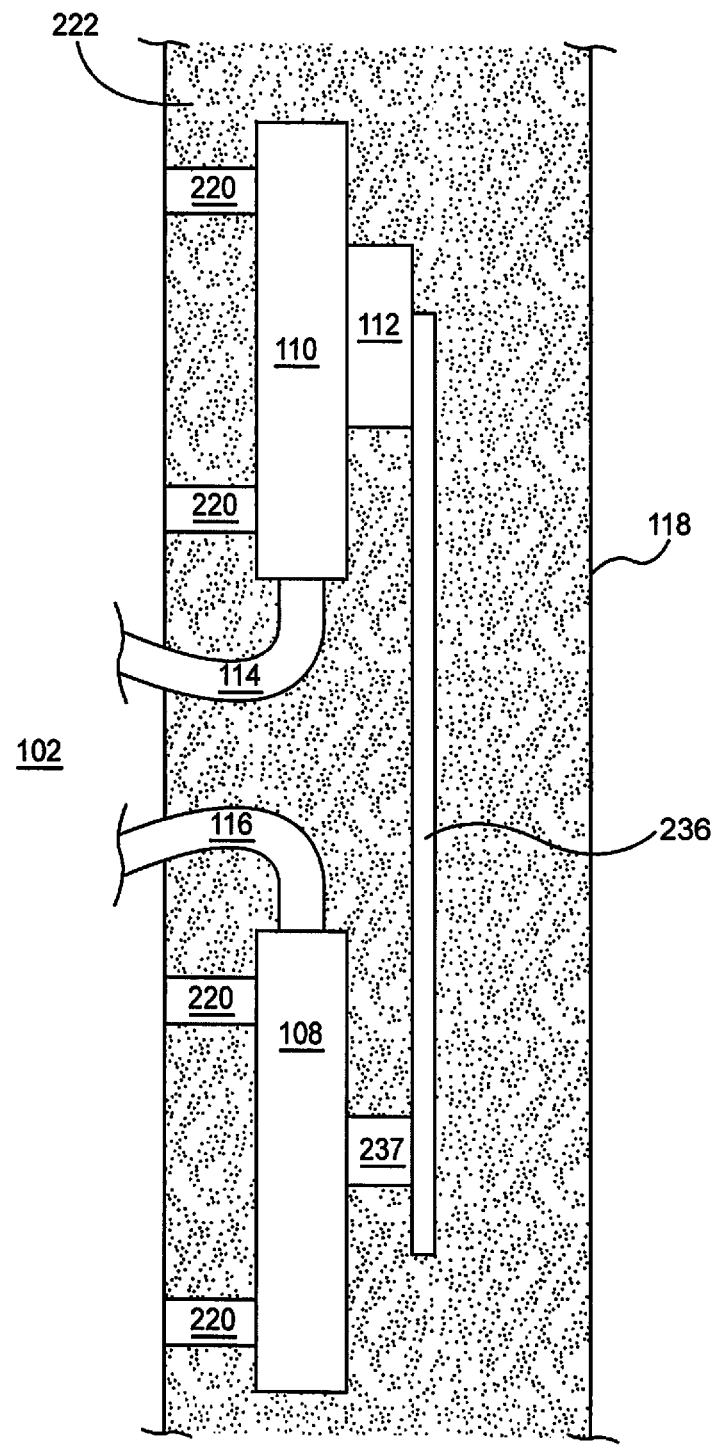
Figure 31:
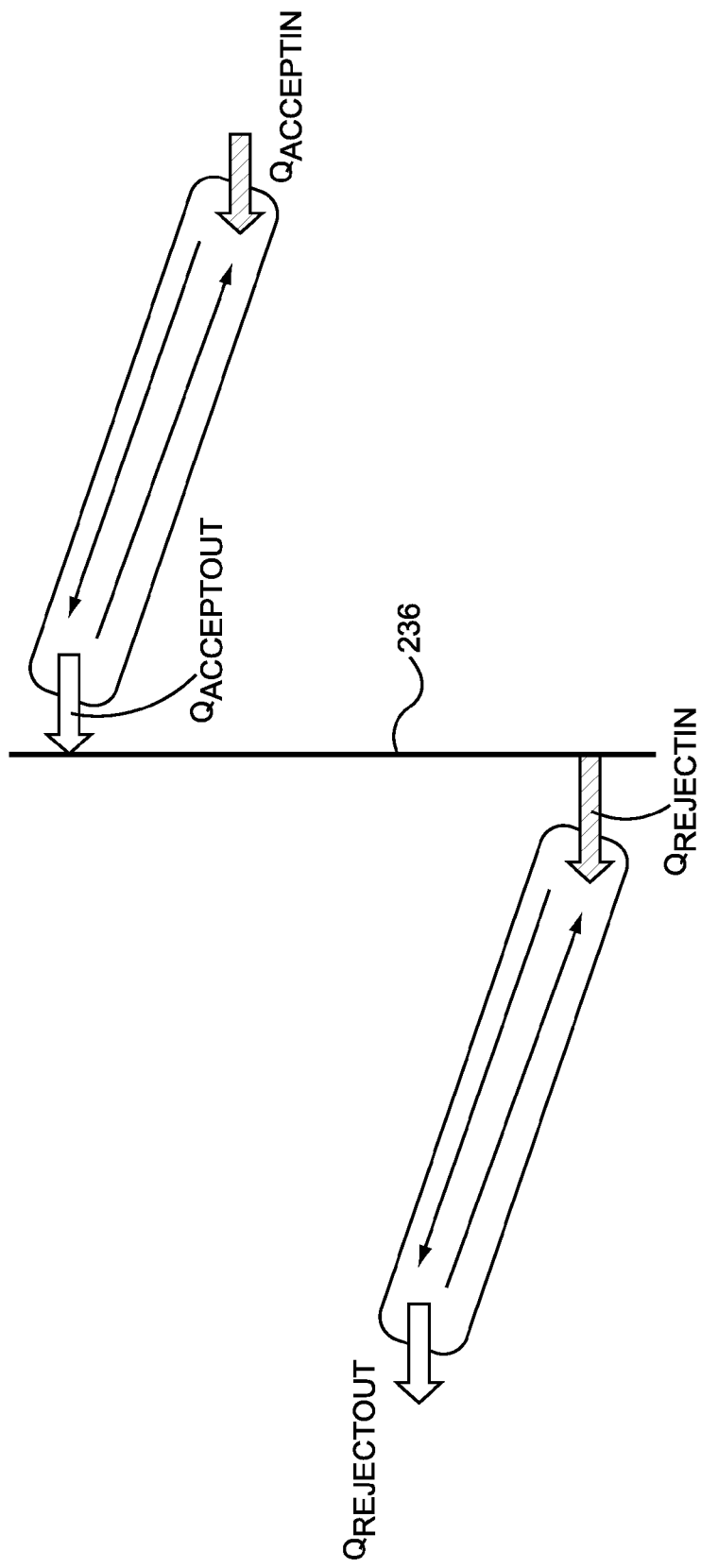
Figure 32:
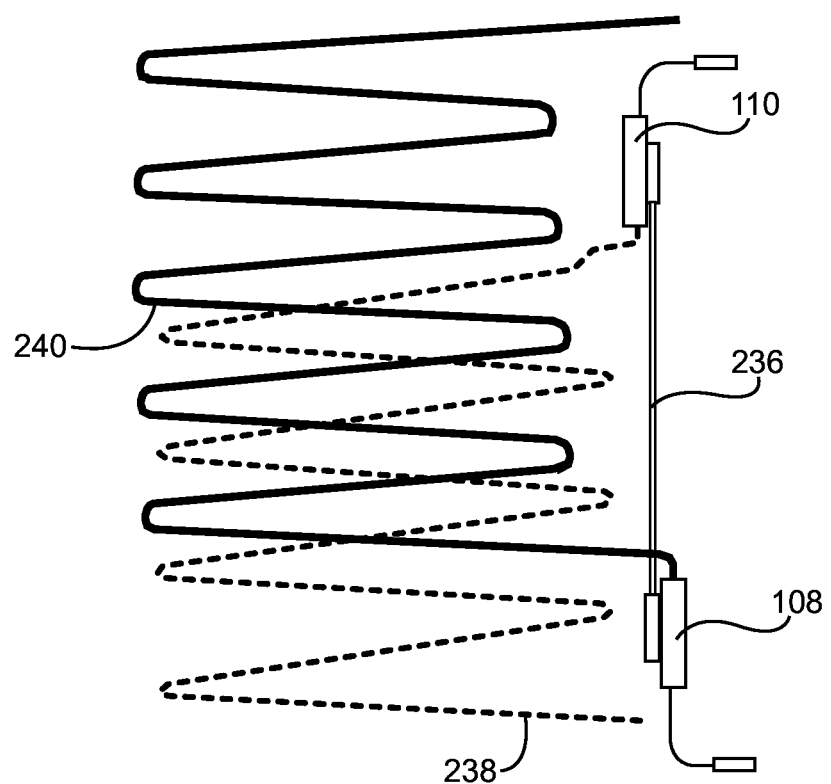
Figure 33:
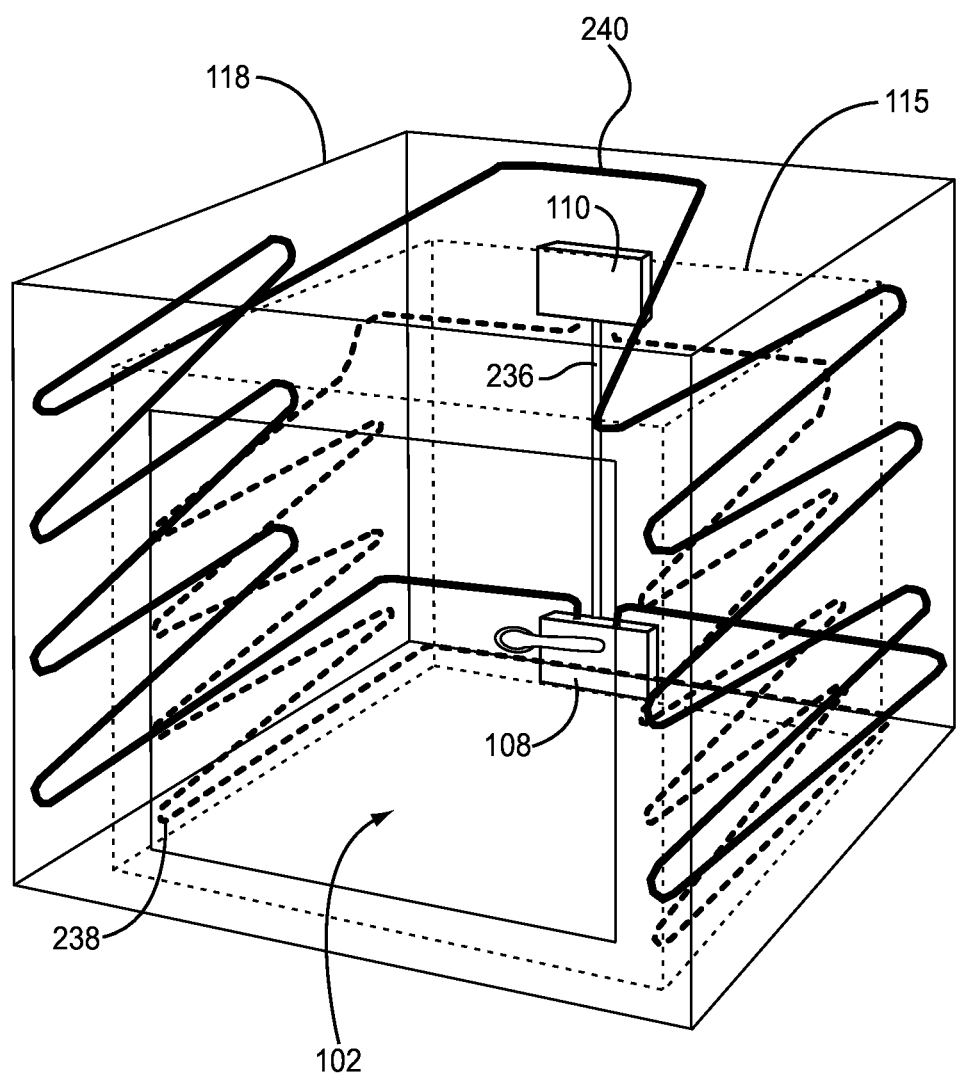
Figure 34:
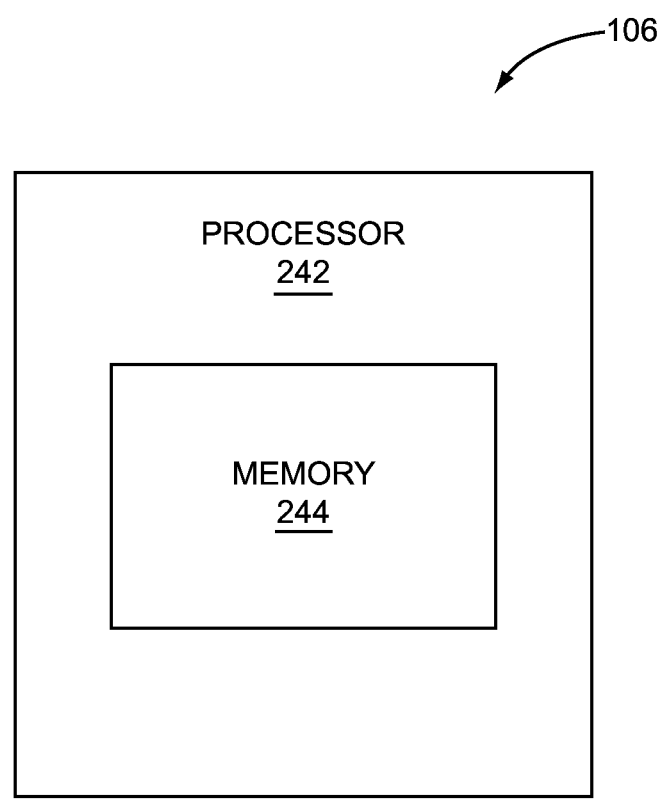

FIGS. 23 and 24 graphically illustrate a thermal diode effect of the accept loop and the reject loop coupled to the heat exchanger of FIG. 22 according to one embodiment of the present disclosure;

FIG. 25 illustrates a thermal diode effect of a hybrid heat exchanger in accordance with one embodiment of the present disclosure;

FIGS. 26 through 29 are schematics illustrating a configuration of a cold side heat sink of the heat exchangers of FIGS. 1 and 21 in accordance with one embodiment of the present disclosure;

FIG. 30 illustrates a heat exchanger having physically separated hot side and cold side heat sinks that are thermally coupled via a heat conduit according to one embodiment of the present disclosure;

FIG. 31 is a schematic illustrating heat flow in the heat exchanger of FIG. 30 according to one embodiment of the present disclosure;

FIGS. 32 and 33 illustrate embodiments of a thermoelectric refrigeration system that utilizes the heat exchanger of FIG. 30; and FIG. 34 is a block diagram for the controller of FIG. 1 in accordance with one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 illustrates a thermoelectric refrigeration system 100 according to one embodiment of the present disclosure. As illustrated, the thermoelectric refrigeration system 100 includes a cooling chamber 102, a heat exchanger 104, and a controller 106 that controls cooling within the cooling chamber 102. The heat exchanger 104 includes a hot side heat sink 108, a cold side heat sink 110, and a cartridge 112 including multiple Thermoelectric Coolers (TECs), where each TEC has a cold side that is thermally coupled with the cold side heat sink 110 and a hot side that is thermally coupled with the hot side heat sink 108. The TECs are preferably thin film devices. When one or more of the TECs are activated by the controller 106, the activated TEC(s) operates to heat the hot side heat sink 108 and cool the cold side heat sink 110 to thereby facilitate heat transfer to extract heat from the cooling chamber 102. More specifically, when one or more of the TECs are activated, the hot side heat sink 108 is heated to thereby create an evaporator and the cold side heat sink 110 is cooled to thereby create a condenser.

Acting as a condenser, the cold side heat sink 110 facilitates heat extraction from the cooling chamber 102 via an accept loop 114 coupled with the cold side heat sink 110. The accept loop 114 is thermally coupled to an interior wall 115 of the thermoelectric refrigeration system 100. The interior wall 115 defines the cooling chamber 102. In one embodiment, the accept loop 114 is either integrated into the interior wall 115 or integrated directly onto the surface of the interior wall 115. The accept loop 114 is formed by any type of plumbing that allows for a cooling medium (e.g., a two-phase coolant) to flow or pass through the accept loop 114. Due to the thermal coupling of the accept loop 114 and the interior wall 115, the cooling medium extracts heat from the cooling chamber 102 as the cooling medium flows through the accept loop 114. The accept loop 114 may be formed of, for example, copper tubing, plastic tubing, stainless steel tubing, aluminum tubing, or the like.

The condenser formed by the cold side heat sink 110 and the accept loop 114 operates according to any suitable heat exchange technique. In one preferred embodiment, the accept loop 114 operates in accordance with thermosiphon principles (i.e., acts as a thermosiphon) such that the cooling medium travels from the cold side heat sink 110 through the accept loop 114 and back to the cold side heat sink 110 to thereby cool the cooling chamber 102 using two-phase, passive heat transport. In particular, passive heat exchange occurs through natural convection between the cooling medium in the accept loop 114 and the cooling chamber 102. In one embodiment, the cooling medium is in liquid form when the cooling medium comes into thermal contact with the cooling chamber 102. Specifically, passive heat exchange occurs between the environment in the cooling chamber 102 and the cooling medium within the accept loop 114 such that the temperature in the cooling chamber 102 decreases and the temperature of the cooling medium increases and/or undergoes a phase change. When the temperature of the cooling medium increases, the density of the cooling medium decreases, such as through evaporation. As a result, the cooling medium moves in an upward direction via buoyancy forces in the accept loop 114 towards the heat exchanger 104 and specifically towards the cold side heat sink 110. The cooling medium comes into thermal contact with the cold side heat sink 110, where heat exchange occurs between the cooling medium and the cold side heat sink 110. When heat exchange occurs between the cooling medium and the cold side heat sink 110, the cooling medium condenses and again flows through the accept loop 114 via gravity in order to extract additional heat from the cooling chamber 102. Thus, in some embodiments, the accept loop 114 functions as an evaporator when cooling the cooling chamber 102.

As noted above, the heat exchanger 104 includes the cartridge 112 disposed between the hot side heat sink 108 and the cold side heat sink 110. The TECs in the cartridge 112 have hot sides (i.e., sides that are hot during operation of the TECs) that are thermally coupled with the hot side heat sink 108 and cold sides (i.e., sides that are cold during operation of the TECs) that are thermally coupled with the cold side heat sink 110. The TECs within the cartridge 112 effectively facilitate heat transfer between the cold side heat sink 110 and the hot side heat sink 108. More specifically, when heat transfer occurs between the cooling medium in the accept loop 114 and the cold side heat sink 110, the active TECs transfer heat between the cold side heat sink 110 and the hot side heat sink 108.

Acting as an evaporator, the hot side heat sink 108 facilitates rejection of heat to an environment external to the cooling chamber 102 via a reject loop 116 coupled to the hot side heat sink 108. The reject loop 116 is thermally coupled to an outer wall 118, or outer skin, of the thermoelectric refrigeration system 100. The outer wall 118 is in direct thermal contact with the environment external to the cooling chamber 102. Further, the outer wall 118 is thermally isolated from the accept loop 114 and the interior wall 115 (and thus the cooling chamber 102) by, for example, appropriate insulation. In one embodiment, the reject loop 116 is integrated into the outer wall 118 or integrated onto the surface of the outer wall 118.

The reject loop 116 is formed of any type of plumbing that allows a heat transfer medium (e.g., a two-phase coolant) to flow or pass through the reject loop 116. Due to the thermal coupling of the reject loop 116 and the external environment, the heat transfer medium rejects heat to the external environment as the heat transfer medium flows through the reject loop 116. The reject loop 116 may be formed of, for example, copper tubing, plastic tubing, stainless steel tubing, aluminum tubing, or the like.

The evaporator formed by the hot side heat sink 108 and the reject loop 116 operates according to any suitable heat exchange technique. In one preferred embodiment, the reject loop 116 operates in accordance with thermosiphon principles (i.e., acts as a thermosiphon) such that the heat transfer medium travels from the hot side heat sink 108 through the reject loop 116 and back to the hot side heat sink 108 to thereby reject heat using two-phase, passive heat transport. In particular, the hot side heat sink 108 transfers the heat received from the cold side heat sink 110 to the heat transfer medium within the reject loop 116. Once heat is transferred to the heat transfer medium, the heat transfer medium changes phase and travels through the reject loop 116 and comes into thermal contact with the outer wall 118 such that heat is expelled to the environment external to the cooling chamber 102. When the heat transfer medium within the reject loop 116 is in direct thermal contact with the outer wall 118, passive heat exchange occurs between the heat transfer medium in the reject loop 116 and the external environment. As is well known, the passive heat exchange causes condensation of the heat transfer medium within the reject loop 116, such that the heat transfer medium travels back to the heat exchanger 104 by force of gravity. Thus, the reject loop 116 functions as a condenser when rejecting heat to the environment external to the cooling chamber 102.

As discussed below in detail, in one preferred embodiment, the heat exchanger 104 is not in direct thermal contact with the cooling chamber 102 and is instead thermally isolated from the cooling chamber 102. Likewise, the heat exchanger 104 is not in direct thermal contact with the outer wall 118 and is instead thermally isolated from the outer wall 118. Accordingly, as will be detailed below, the heat exchanger 104 is thermally isolated from both the cooling chamber 102 and the outer wall 118 of the thermoelectric refrigeration system 100. Importantly, this provides a thermal diode effect by which heat is prevented from leaking back into the cooling chamber 102 when the TECs are deactivated.

The controller 106 operates to control the TECs within the cartridge 112 in order to maintain a desired set point temperature within the cooling chamber 102. In general, the controller 106 operates to selectively activate/deactivate the TECs, selectively control an input current of the TECs, and/or selectively control a duty cycle of the TECs to maintain the desired set point temperature. Further, in preferred embodiments, the controller 106 is enabled to separately, or independently, control one or more and, in some embodiments, two or more subsets of the TECs, where each subset includes one or more different TECs. Thus, as an example, if there are four TECs in the cartridge 112, the controller 106 may be enabled to separately control a first individual TEC, a second individual TEC, and a group of two TECs (i.e., a first and a second individual TEC and a group of two TECs). By this method, the controller 106 can, for example, selectively activate one, two, three, or four TECs independently, at maximized efficiency, as demand dictates.

Continuing this example, the controller 106 may be enabled to separately and selectively control: (1) activation/deactivation of the first individual TEC, an input current of the first individual TEC, and/or a duty cycle of the first individual TEC; (2) activation/deactivation of the second individual TEC, an input current of the second individual TEC, and/or a duty cycle of the second individual TEC; and (3) activation/deactivation of the group of two TECs, an input current of the group of two TECs, and/or a duty cycle of the group of two TECs. Using this separate selective control of the different subsets of the TECs, the controller 106 preferably controls the TECs to enhance an efficiency of the thermoelectric refrigeration system 100. For example, the controller 106 may control the TECs to maximize efficiency when operating in a steady state mode, such as when the cooling chamber 102 is at the set point temperature or within a predefined steady state temperature range. However, during pull down or recovery, the controller 106 may control the TECs to achieve a desired performance such as, for example, maximizing heat extraction from the cooling chamber 102, providing a tradeoff between pull down/recovery times and efficiency, or the like.

Figure 2:
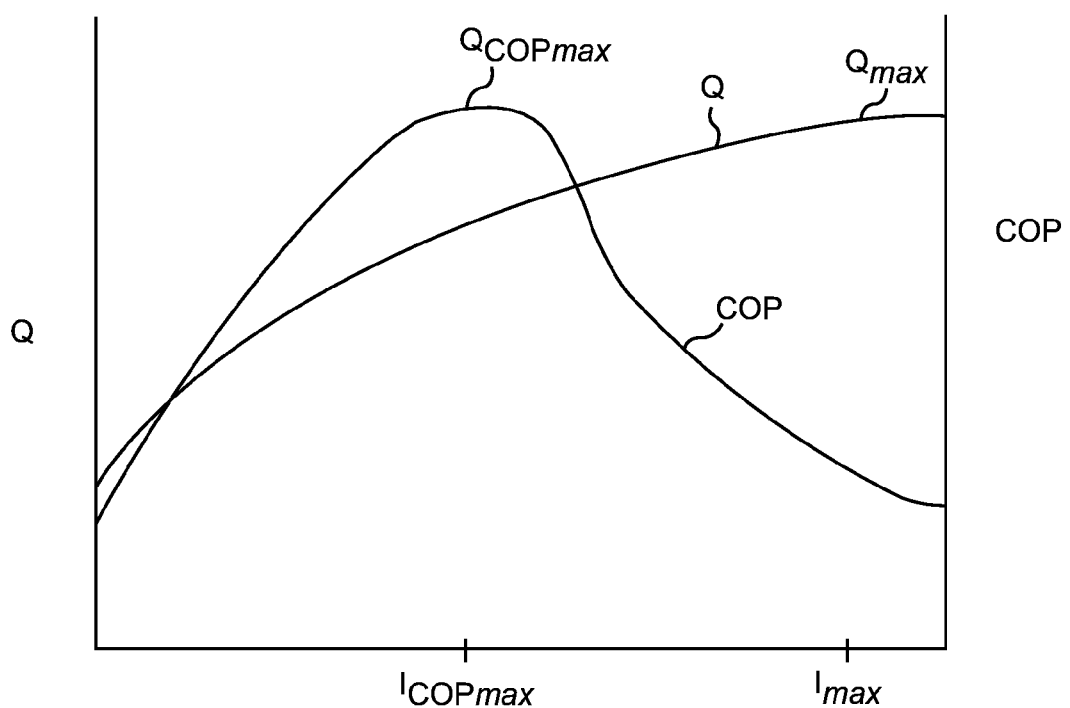
FIG. 2 is a graph that illustrates a cooling capacity and cooling efficiency of a TEC to an input current of the TEC.

Before proceeding, a brief discussion of a cooling capacity versus an input current characteristic and efficiency versus an input current characteristic of a TEC is beneficial. In this regard, FIG. 2 is a graph that illustrates cooling capacity (Q) and cooling efficiency (COP) of a TEC versus an input current of a TEC. The cooling efficiency is more specifically represented by a Coefficient of Performance (COP). As illustrated in FIG. 2, as the input current (I) of the TEC increases, the cooling capacity of the TEC also increases. The point on the cooling capacity (Q) curve that represents where a maximum amount of heat is being removed by the TEC is denoted as $Q_{max}$. Thus, when the TEC is operating at $Q_{max}$, the TEC is removing the greatest amount of heat possible. The TEC operates at $Q_{max}$ when a corresponding maximum current $I_{max}$ is provided to the TEC. FIG. 2 also illustrates the COP of the TEC as a function of current. For cooling applications, the COP of a TEC is a ratio of heat removed over an amount of work input to the TEC to remove the heat. The amount of heat, or capacity, (Q) at which the COP of the TEC is maximized is denoted as $Q_{COPmax}$. The TEC operates at $Q_{COPmax}$ when a current $I_{COPmax}$ is provided to the TEC. Thus, the efficiency, or COP, of the TEC is maximized when the current $I_{COPmax}$ is provided to the TEC such that the TEC operates at $Q_{COPmax}$.

As discussed below in detail, in preferred embodiments, the controller 106 controls the TECs within the cartridge 112 such that, during steady state operation, one or more of the TECs are activated and operated at $Q_{COPmax}$ and the remaining TECs are deactivated to thereby maximize efficiency. The number of TECs activated, and conversely the number of TECs deactivated, is dictated by demand. Conversely, during pull down or recovery, one or more and possibly all of the TECs within the cartridge 112 are activated and operated according to a desired performance profile. One example of the desired performance profile is that all of the TECs are activated and operated at $Q_{max}$ in order to minimize pull down or recovery time. However, the desired performance profile may alternatively provide a tradeoff between pull down or recovery time and efficiency where, for example, all of the TECs are activated and are operated at a point between $Q_{COPmax}$ and $Q_{max}$. Note that, as discussed below, control of the TECs is not limited to these examples.

As noted above, FIG. 2 illustrates the cooling capacity and cooling efficiency of a single TEC. Increasing the number of TECs linearly increases the heat removal capacity without affecting the operating COP of the thermoelectric refrigeration system 100 employing the TECs. Thus, if the thermoelectric refrigeration system 100 includes four TECs, then the heat removal capacity of the thermoelectric refrigeration system 100 is increased fourfold in comparison to an embodiment of the thermoelectric refrigeration system 100 that includes a single TEC while allowing the entire system to, in some preferred embodiments, operate between off, $Q_{COPmax}$, and $Q_{max}$.

It should be noted that while the application of electrical current to a TEC and FIG. 2 are discussed in the context of cooling, the same principles apply in the context of heat recovery/power generation, where the TECs are used to generate power, or current, in response to heat.

TEC Cartridge

Before discussing the details of the operation of the controller 106 to separately and selectively control the TECs, it is beneficial to discuss embodiments of the cartridge 112 of FIG. 1 that enable separate and selective control of the TECs. Note that while the following discussion of the cartridge 112 is with respect to the thermoelectric refrigeration system 100 of FIG. 1, the cartridge 112 is not limited to use in the thermoelectric refrigeration system 100 of FIG. 1 nor thermoelectric refrigeration in general. For instance, the cartridge 112 may be utilized in heat recovery or power generation applications.

As noted above, the TECs in the cartridge 112 are used to regulate the temperature of the cooling chamber 102. In order to meet desired cooling capacity for many refrigeration applications, the thermoelectric refrigeration system 100 utilizes multiple TECs. The use of multiple TECs is beneficial over the use of a single large TEC because the multiple TECs can be separately controlled to provide the desired performance under varying conditions. In contrast, a single over-sized TEC that is designed to provide a maximum desired capacity for pull down or recovery does not provide this flexibility. For example, during steady state conditions, the single over-sized TEC would typically operate at a low capacity point that corresponds to a low COP value. In other words, the over-sized TEC would operate inefficiently. In contrast, the controller 106 is enabled to separately control subsets of the TECs in the cartridge 112 in order to maximize efficiency during steady state conditions.

Figure 3:
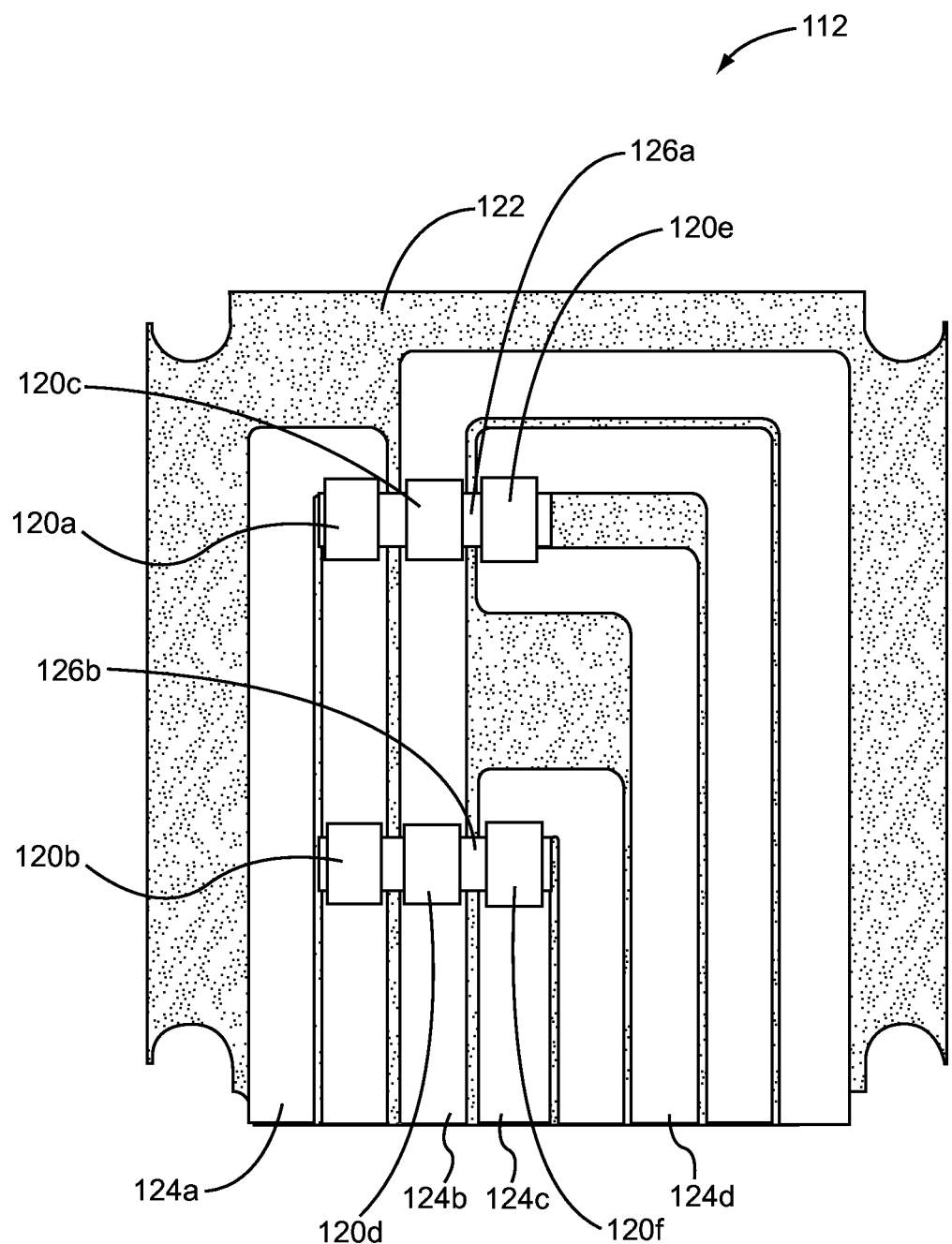
FIG. 3 is a more detailed illustration of the cartridge of FIG. 1 in which the cartridge includes the TECs disposed on an interconnect board that enables selective control of multiple different subsets of the TECs in the array of TECs in accordance with one embodiment of the present disclosure.
Figure 4:
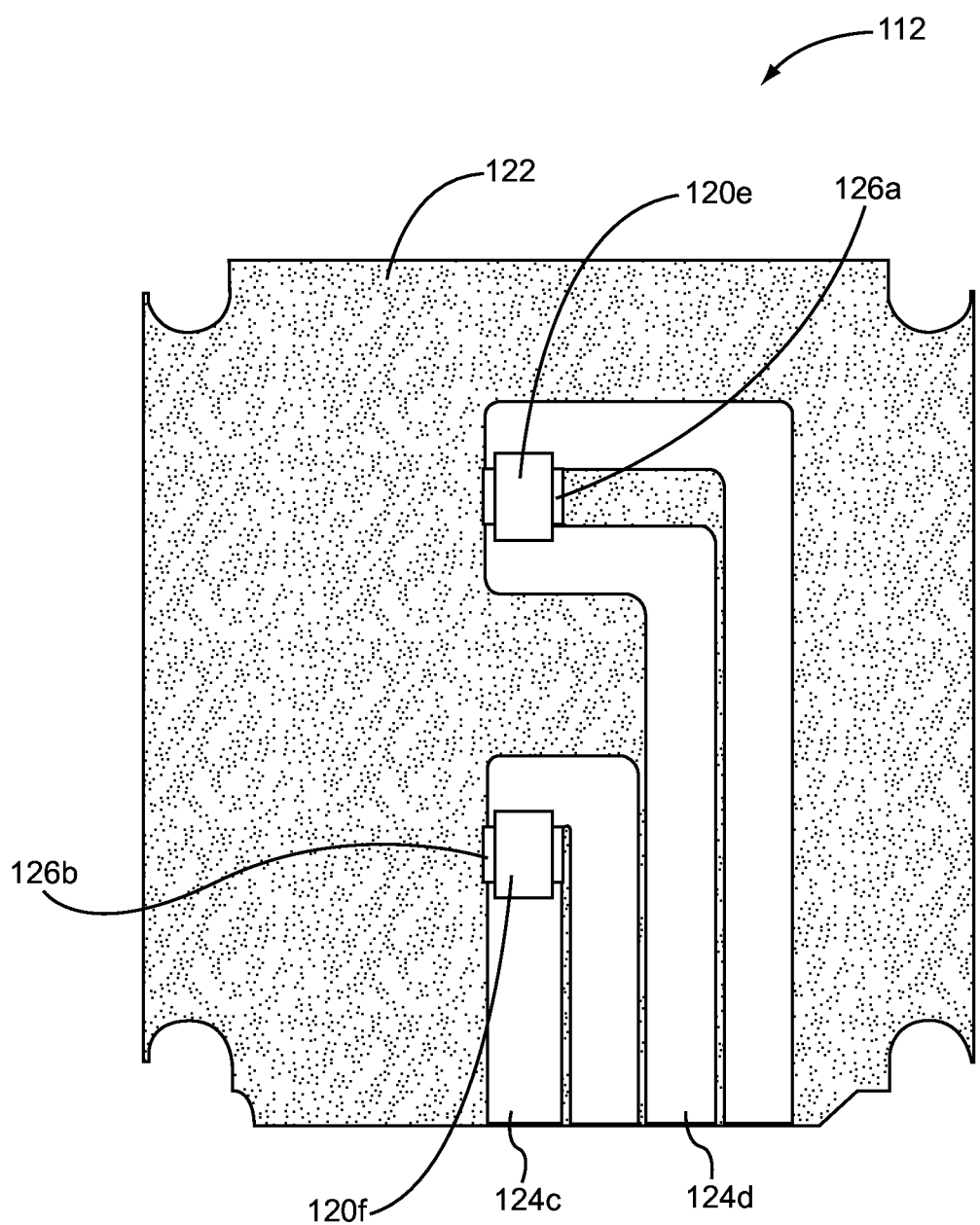
FIG. 4 is a more detailed illustration of the cartridge of FIG. 1 in which the cartridge includes the TECs disposed on an interconnect board that enables selective control of multiple different subsets of the TECs in the array of TECs in accordance with another embodiment of the present disclosure.
Figure 5:
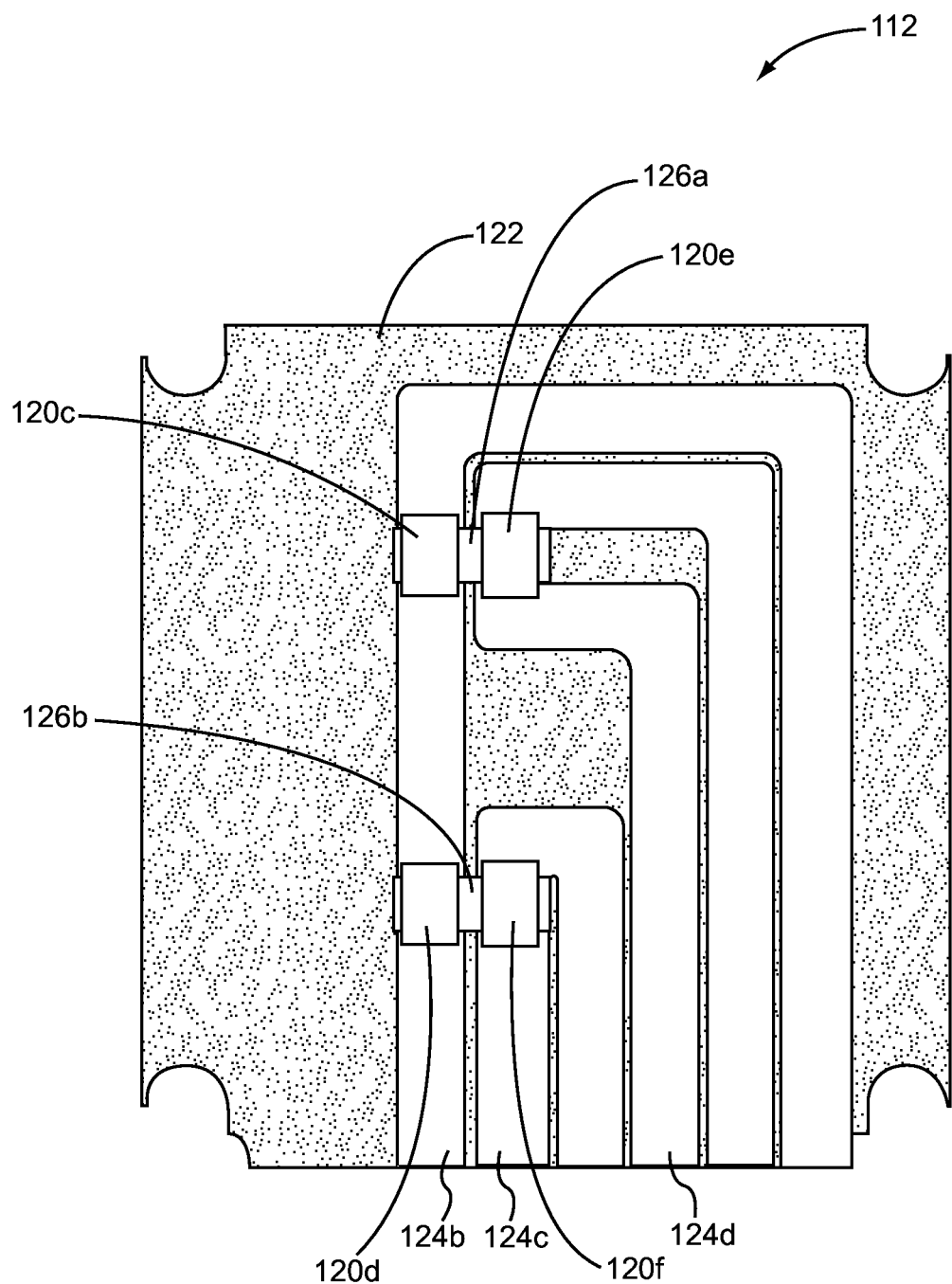
FIG. 5 is a more detailed illustration of the cartridge of FIG. 1 in which the cartridge includes the TECs disposed on an interconnect board that enables selective control of multiple different subsets of the TECs in accordance with another embodiment of the present disclosure.

FIGS. 3 through 5 illustrate embodiments of the cartridge 112 that enable the controller 106 to separately and selectively control different subsets of the TECs according to a desired control scheme. Note, however, that the embodiments of FIGS. 3 through 5 are only examples. The cartridge 112 may be configured to hold any number of TECs and to allow any number of subsets of the TECs to be separately controlled. Each subset generally includes one or more TECs. Further, the different subsets may include the same number or different numbers of TECs.

In the embodiment of FIG. 3, the cartridge 112 includes TECs 120a through 120f (more generally referred to herein collectively as TECs 120 and individually as TEC 120) disposed on an interconnect board 122. The TECs 120 are thin film devices. Some non-limiting examples of thin film TECs are disclosed in U.S. Pat. No. 8,216,871, entitled METHOD FOR THIN FILM THERMOELECTRIC MODULE FABRICATION, which is hereby incorporated herein by reference in its entirety. The interconnect board 122 includes electrically conductive traces 124a through 124d (more generally referred to herein collectively as traces 124 and individually as trace 124) that define four subsets of the TECs 120a through 120f. In particular, the TECs 120a and 120b are electrically connected in series with one another via the trace 124a and, as such, form a first subset of the TECs 120. Likewise, the TECs 120c and 120d are electrically connected in series with one another via the trace 124b and, as such, form a second subset of the TECs 120. The TEC 120e is connected to the trace 124d and, as such, forms a third subset of the TECs 120, and the TEC 120f is connected to the trace 124c and, as such, forms a fourth subset of the TECs 120. The controller 106 (FIG. 1) can, in no particular order, selectively control the first subset of TECs 120 (i.e., the TECs 120a and 120b) by controlling a current applied to the trace 124a, selectively control the second subset of the TECs 120 (i.e., the TECs 120c and 120d) by controlling a current applied to the trace 124b, selectively control the third subset of the TECs 120 (i.e., the TEC 120e) by controlling a current applied to the trace 124d, and selectively control the fourth subset of the TECs 120 (i.e., the TEC 120f) by controlling a current applied to the trace 124c. Thus, using the TECs 120a and 120b as an example, the controller 106 can selectively activate/deactivate the TECs 120a and 120b by either removing current from the trace 124a (deactivate) or by applying a current to the trace 124a (activate), selectively increase or decrease the current applied to the trace 124a while the TECs 120a and 120b are activated, and/or control the current applied to the trace 124a in such a manner as to control a duty cycle of the TECs 120a and 120b while the TECs 120a and 120b are activated (e.g., Pulse Width Modulation of the current).

The interconnect board 122 includes openings 126a and 126b (more generally referred to herein collectively as openings 126 and individually as opening 126) that expose bottom surfaces of the TECs 120a through 120f. When disposed between the hot side heat sink 108 (FIG. 1) and the cold side heat sink 110 (FIG. 1), the openings 126a and 126b enable the bottom surfaces of the TECs 120a through 120f to be thermally coupled to the appropriate heat sink 108 or 110.

In accordance with embodiments of the present disclosure, during operation, the controller 106 can selectively activate or deactivate any combination of the subsets of the TECs 120 by applying or removing current from the corresponding traces 124a through 124d. Further, the controller 106 can control the operating points of the active TECs 120 by controlling the amount of current provided to the corresponding traces 124a through 124d. For example, if only the first subset of the TECs 120 is to be activated and operated at $Q_{COPmax}$ during steady state operation, then the controller 106 provides the current $I_{COPmax}$ to the trace 124a to thereby activate the TECs 120a and 120b and operate the TECs 120a and 120b at $Q_{COPmax}$ and removes current from the other traces 124b through 124d to thereby deactivate the other TECs 120c through 120f.

In the embodiment shown with reference to FIG. 3, the cartridge 112 includes the TECs 120a through 120f. In accordance with embodiments of the present disclosure, the cartridge 112 may include any number of TECs 120. For example, in the embodiment shown with reference to FIG. 4, the cartridge 112 includes the interconnect board 122 having only two TECs 120, the TECs 120e and 120f. In this embodiment, the controller 106 (FIG. 1) can individually control the TECs 120e and 120f by controlling the currents provided to the corresponding traces 124d and 124c, respectively. As another example, the cartridge 112 can include only four TECs 120, such as the TECs 120c through 120f, as shown with reference to FIG. 5. In this embodiment, the interconnect board 122 includes the traces 124b through 124d, which provide current to the TECs 120c through 120f, respectively. Moreover, the corresponding subsets of the TECs 120 can be controlled by the controller 106 by providing the appropriate currents to the traces 124b through 124d.

Figure 6:
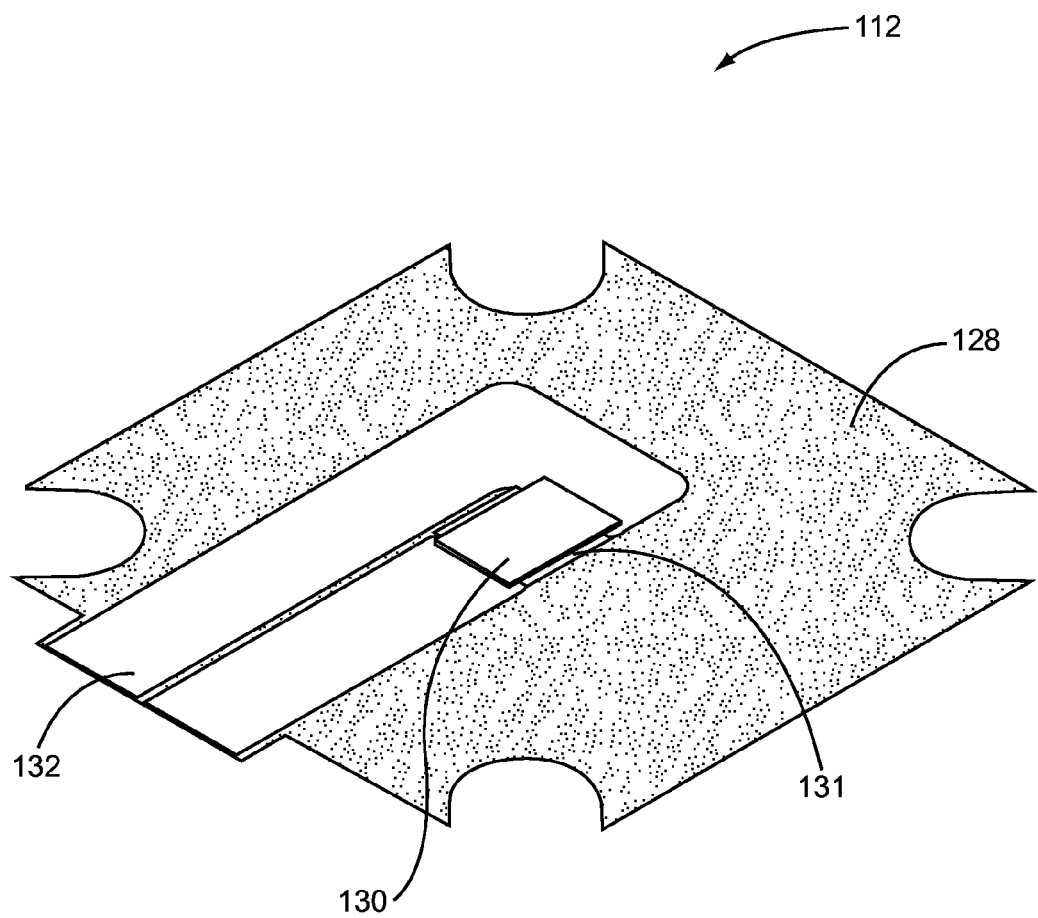
FIG. 6 is a more detailed illustration of the cartridge of FIG. 1 in which the cartridge includes a single TEC disposed on an interconnect board in accordance with another embodiment of the present disclosure.
Figure 7:
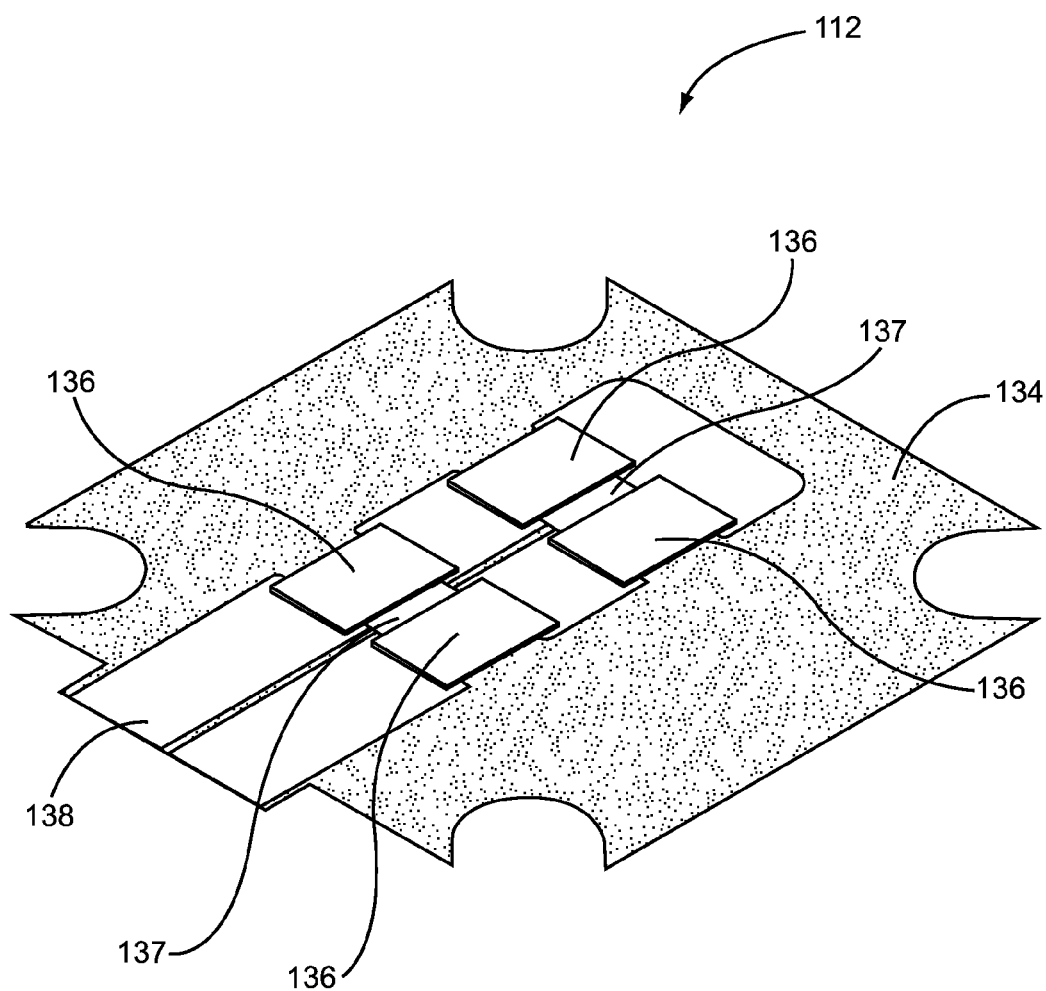
FIG. 7 is a more detailed illustration of the cartridge of FIG. 1 in which the cartridge includes four TECs disposed on an interconnect board in accordance with another embodiment of the present disclosure.
Figure 8:
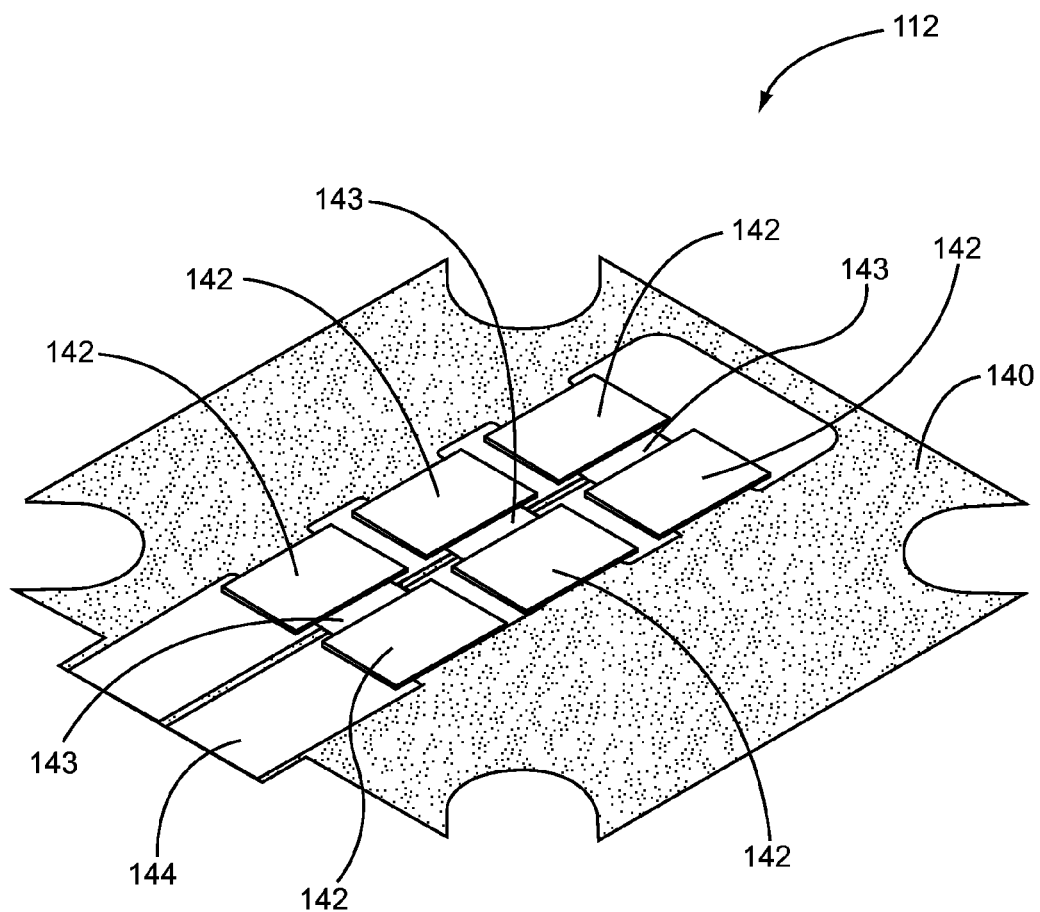
FIG. 8 is a more detailed illustration of the cartridge of FIG. 1 in which the cartridge includes six TECs disposed on an interconnect board in accordance with another embodiment of the present disclosure.
Figure 9:
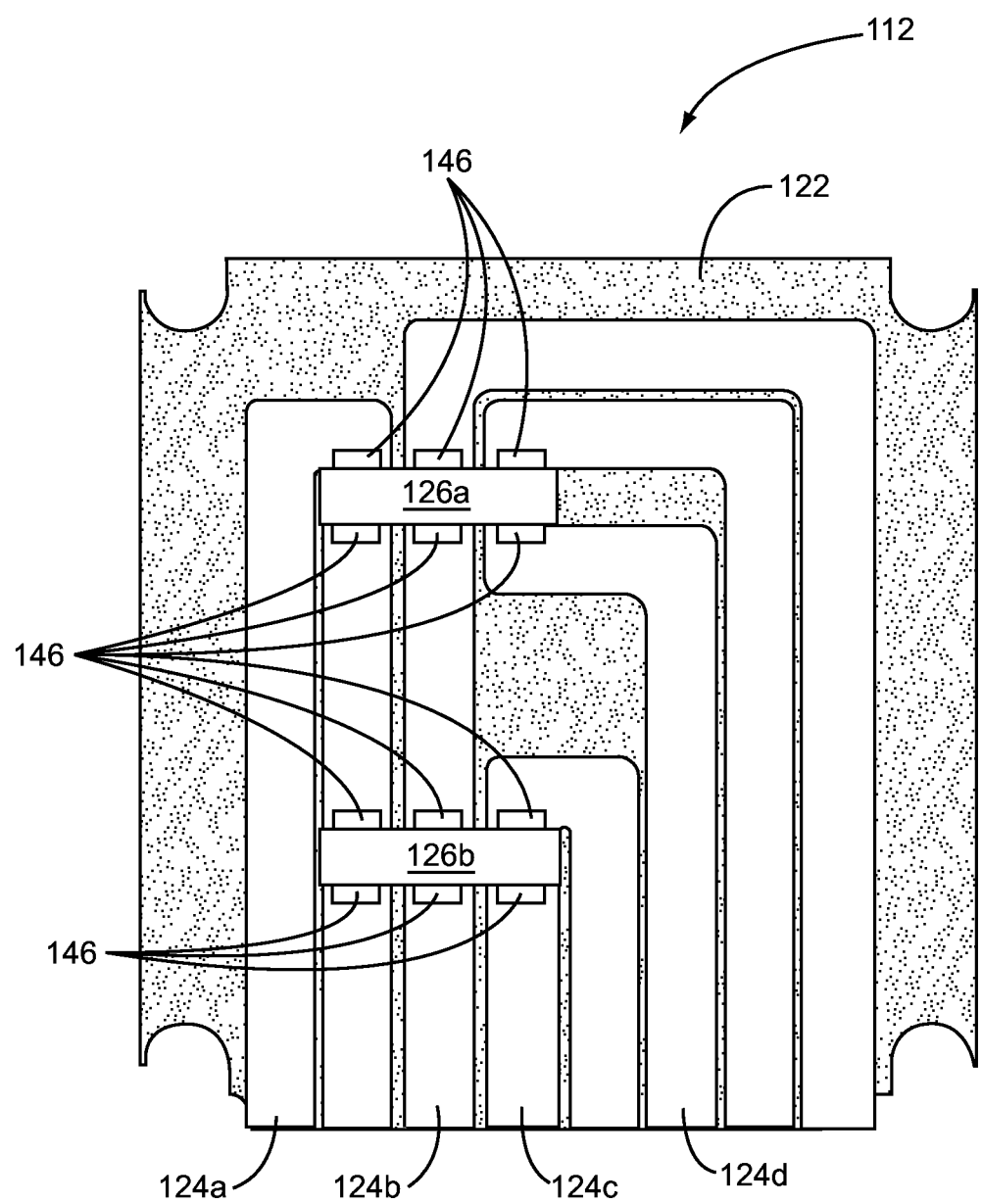
FIG. 9 shows the interconnect board of FIG. 3 without the TECs in accordance with one embodiment of the present disclosure.
Figure 10:
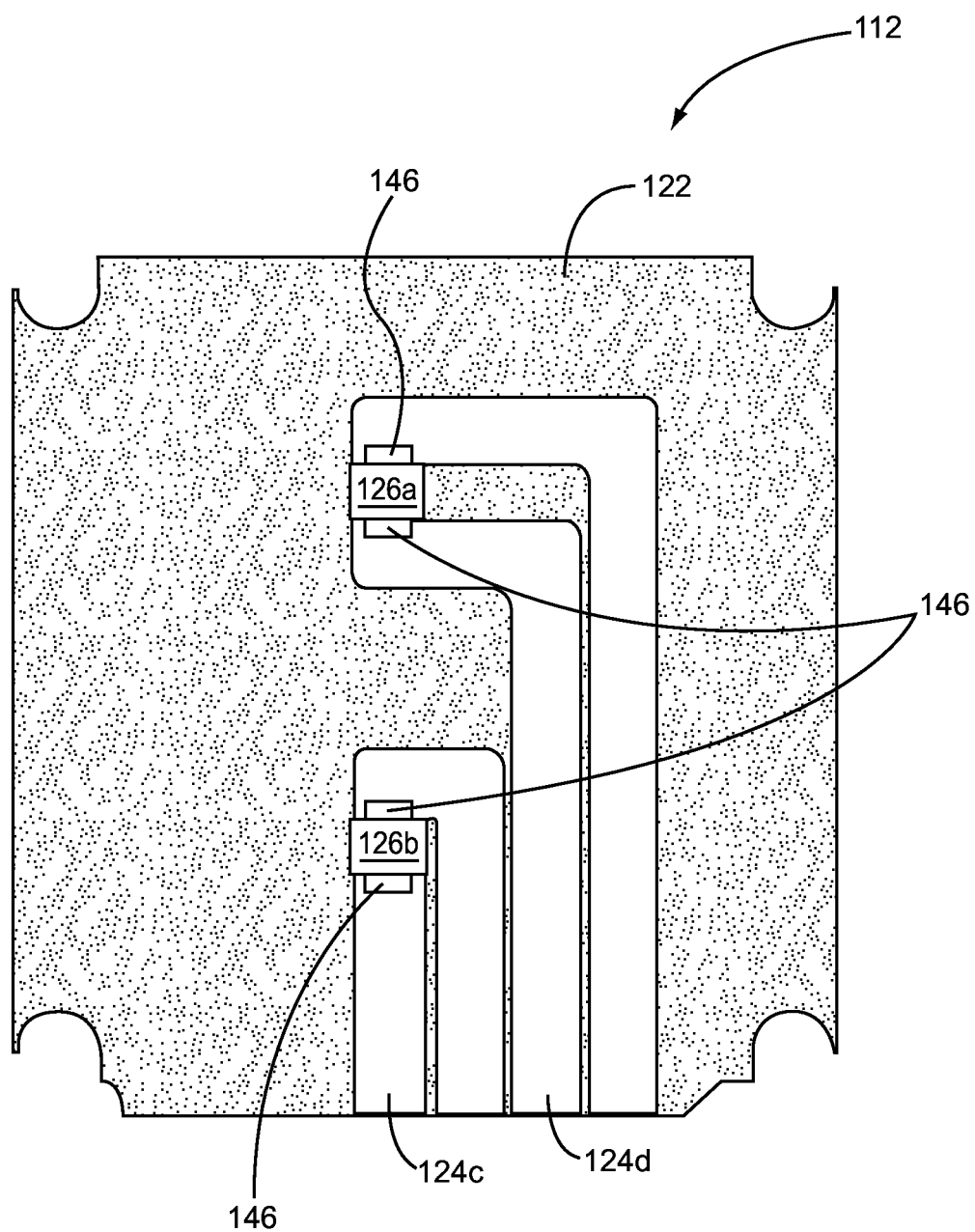
FIG. 10 illustrates the interconnect board of FIG. 4 without the TECs in accordance with another embodiment of the present disclosure.
Figure 11:
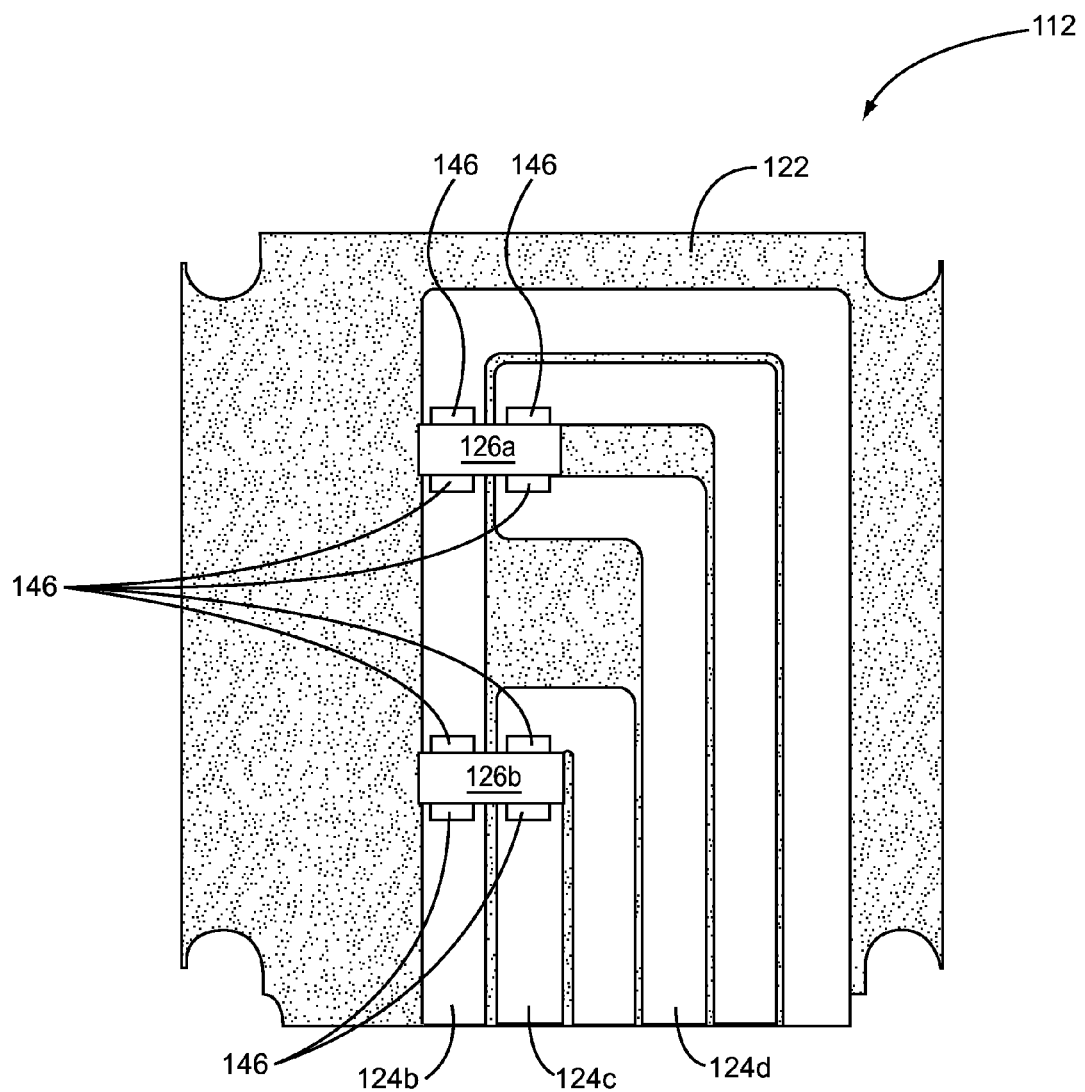
FIG. 11 shows the interconnect board of FIG. 5 without the TECs in accordance with another embodiment of the present disclosure.
Figure 12:
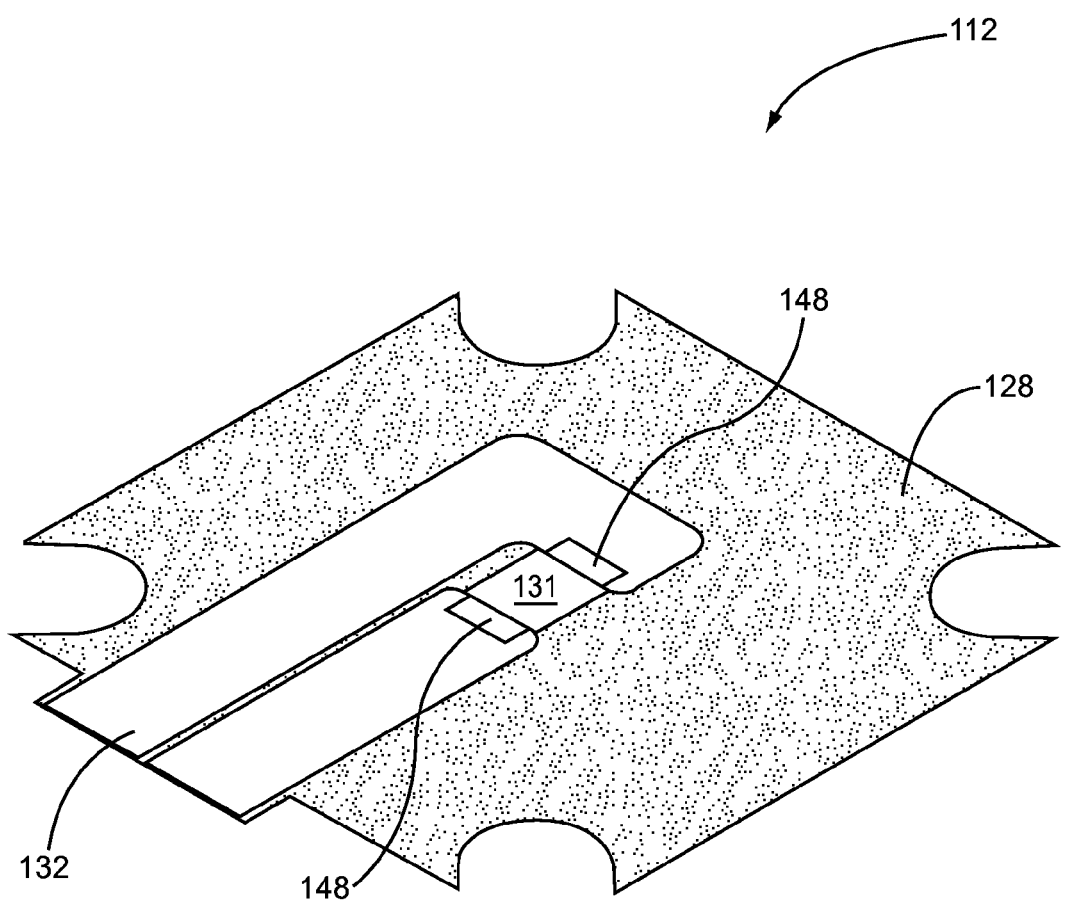
FIG. 12 illustrates the interconnect board of FIG. 6 without the TEC in accordance with another embodiment of the present disclosure.
Figure 13:
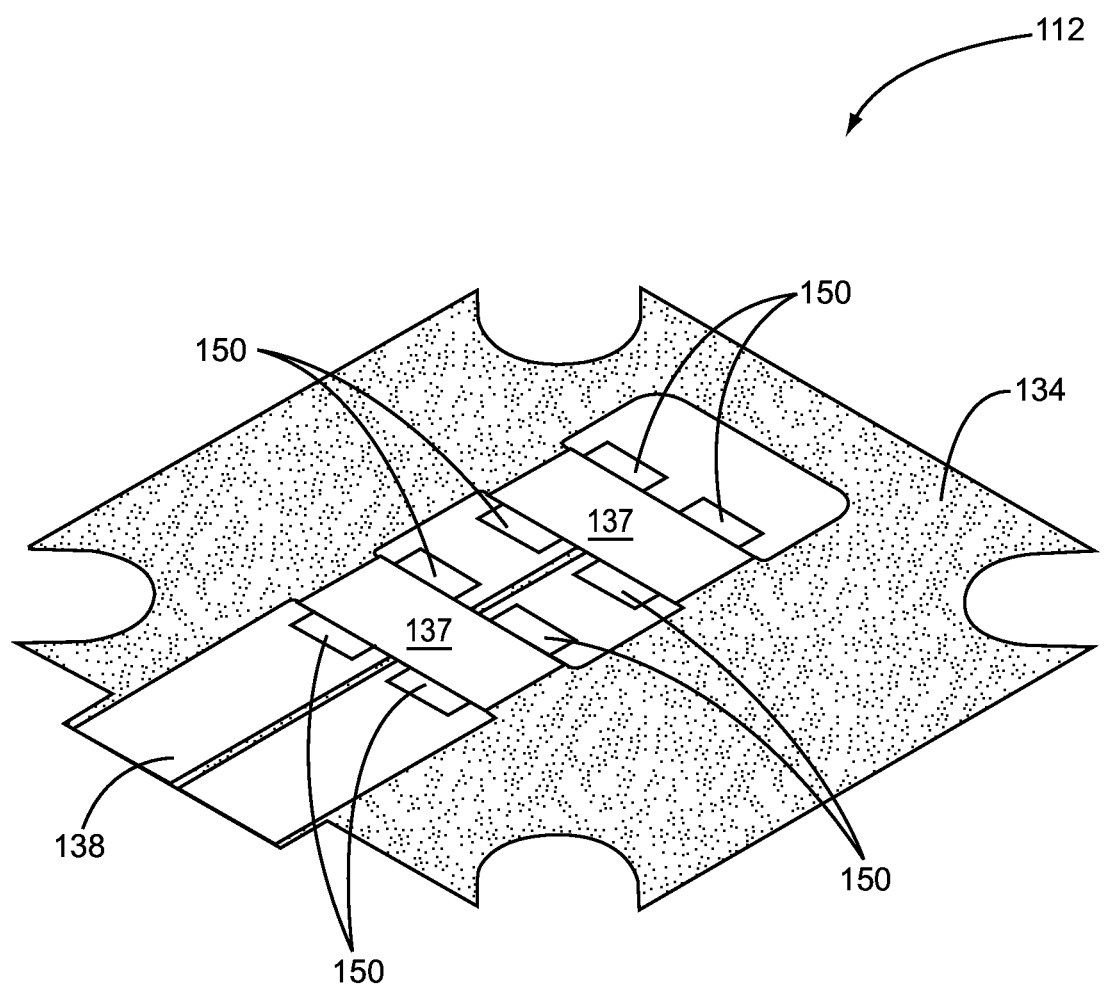
FIG. 13 illustrates the interconnect board of FIG. 7 without the TECs in accordance with another embodiment of the present disclosure.
Figure 14:
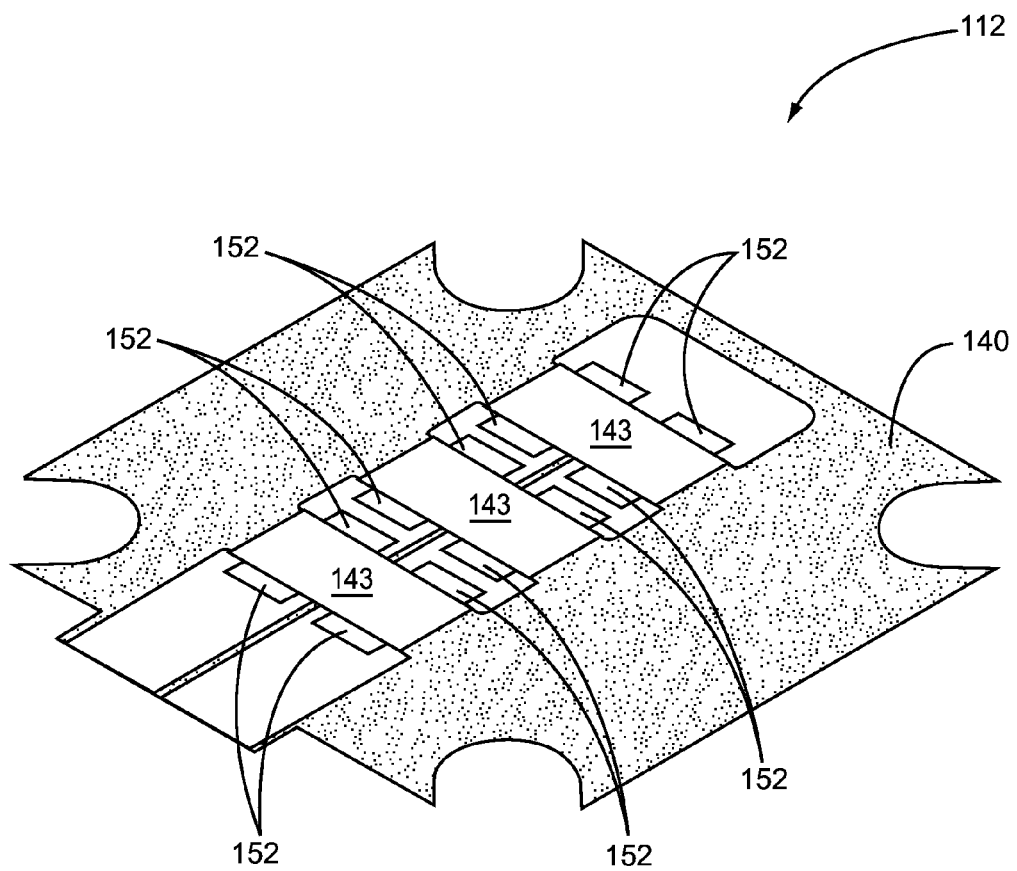
FIG. 14 shows the interconnect board of FIG. 8 without the TECs according to another embodiment of the present disclosure.

While FIGS. 3 through 5 illustrate embodiments of the cartridge 112 that enable selective control of different TECs on the cartridge 112, FIGS. 6 through 8 illustrate embodiments of the cartridge 112 that may be utilized if selective control is not needed. In these embodiments, the input current of the TECs and/or a duty cycle of the TECs may be varied to provide a desired capacity, a desired efficiency, or some tradeoff between capacity and efficiency. In particular, FIG. 6 illustrates an embodiment of the cartridge 112 that includes an interconnect board 128 and a single TEC 130 disposed on the interconnect board 128. An opening 131 in the interconnect board 128 exposes a bottom surface of the TEC 130. The controller 106 (FIG. 1) can control the capacity and efficiency of the TEC 130 by controlling a current input to the TEC 130 via an electrically conductive trace 132 on the interconnect board 128.

FIG. 7 illustrates an embodiment of the cartridge 112 that is similar to that of FIG. 6 but where the cartridge 112 includes four TECs. More specifically, the cartridge 112 includes an interconnect board 134 and four TECs 136 disposed on the interconnect board 134. There are openings 137 in the interconnect board 134 to expose bottom surfaces of the TECs 136. Again, the controller 112 can control a capacity and efficiency of the TECs 136 by controlling a current input to the TECs 136 and/or a duty cycle of the TECs 136 via an electrically conductive trace 138 on the interconnect board 134.

FIG. 8 illustrates yet another example of the cartridge 112 that is similar to that of FIGS. 6 and 7 but where the cartridge 112 includes six TECs. More specifically, the cartridge 112 includes an interconnect board 140 and six TECs 142 disposed on the interconnect board 140. There are openings 143 in the interconnect board 140 to expose bottom surfaces of the TECs 142. Again, the controller 112 can control a capacity and efficiency of the TECs 142 by controlling a current input to the TECs 142 and/or a duty cycle of the TECs 142 via an electrically conductive trace 144 on the interconnect board 140. Note that the embodiments of FIGS. 6 through 8 are only examples. The cartridge 112 may be configured to include any number of TECs or conductive traces in series or parallel configuration.

FIGS. 9 through 14 illustrate the interconnect boards 122, 128, 134, and 140 of FIGS. 3 through 8, respectively, but without TECs attached to the interconnect boards. FIGS. 9 through 14 more clearly illustrate the openings 126, 131, 137, and 143 in the interconnect boards that expose the bottom surfaces of the TECs or, in other words, enable thermal coupling between the bottom surfaces of the TECs and the appropriate heat sink 108 or 110. FIGS. 9 through 14 also illustrate contacts 146, 148, 150, and 152 that enable electrical and mechanical connection between the interconnect boards 122, 128, 134, and 140 and corresponding TECs.

Selectively Controlling the TECs

The following is a detailed discussion of embodiments of the operation of the controller 106 of FIG. 1. For this discussion, it is assumed that the cartridge 112 is the cartridge 112 of FIG. 3, which enables selective control of multiple different subsets of the TECs 120. Note, however, that the use of the cartridge 112 of FIG. 3 is only an example.

Figure 15:
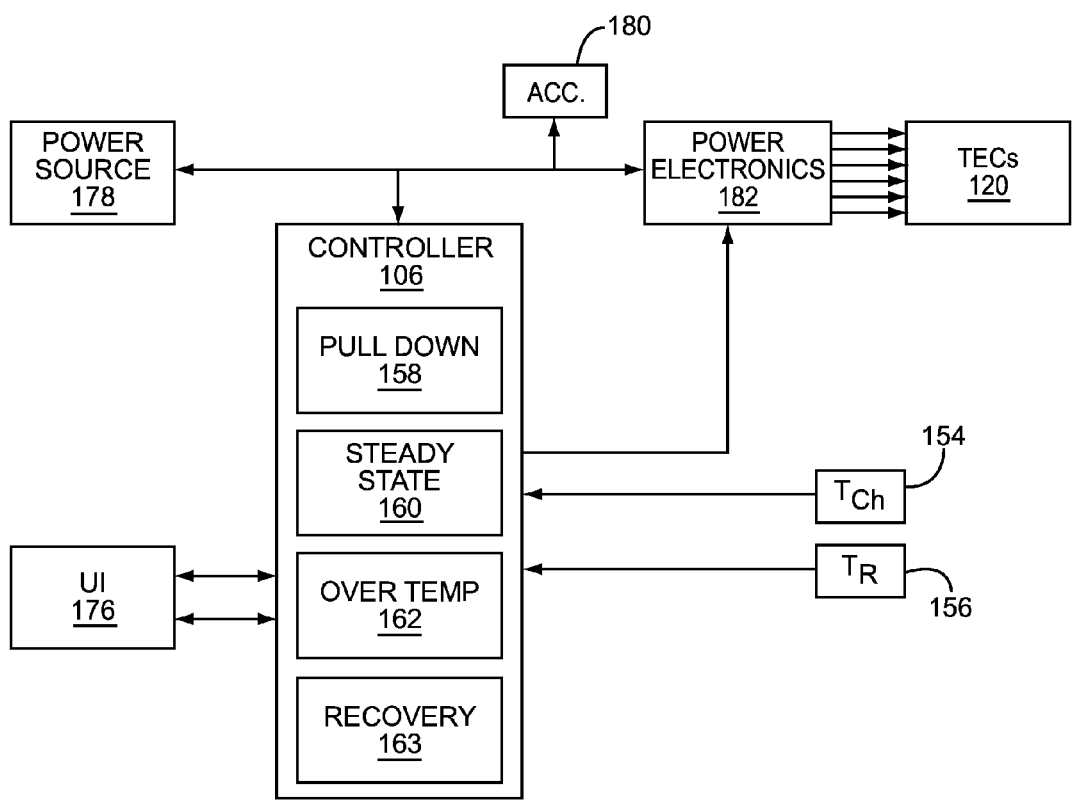
FIG. 15 illustrates an example of one system component layout detailing various operating states, inputs, and outputs of the controller of FIG. 1 according to one embodiment of the present disclosure.

FIG. 15 illustrates the operation of the controller 106 according to one embodiment of the present disclosure. As illustrated, the controller 106 receives temperature data from temperature inputs 154 and 156. The temperature inputs 154 and 156 can be any type of temperature sensors. The temperature data includes a temperature ($T_{CH}$) of the cooling chamber 102 and a temperature ($T_R$) on the reject side, or hot side, of the heat exchanger 104. The reject side of the heat exchanger 104 is the hot side of the heat exchanger 104. Thus, for example, the temperature ($T_R$) may be a temperature of the hot side heat sink 108. Based on the temperature data, the controller 106 determines a current mode of operation of the thermoelectric refrigeration system 100. In this embodiment, the current mode of operation is one of a pull down mode 158,
a steady state mode 160, an over temperature mode 162, and a recovery mode 163. The pull down mode 158 generally occurs when the thermoelectric refrigeration system 100 is first powered on. The steady state mode 160 occurs when the temperature of the cooling chamber 102 is at or near the desired set point temperature. In particular, the temperature of the cooling chamber 102 is at or near the desired set point temperature when the temperature of the cooling chamber 102 is within a predefined steady state range that includes the set point temperature (e.g., the set point temperature of the cooling chamber 102±2 degrees). The over temperature mode 162 is when the temperature on the reject side of the heat exchanger 104 is above a predefined maximum allowable temperature. The over temperature mode 162 is a safety mode during which the temperature of the reject side of the heat exchanger 104, and thus the hot side temperature of the TECs 120, is reduced in order to protect the TECs 120 from damage. Lastly, the recovery mode 163 is when the temperature of the cooling chamber 102 increases outside of the steady state range due to, for example, heat leak into the cooling chamber 102, opening of the door of the cooling chamber 102, or the like.

Figure 16:
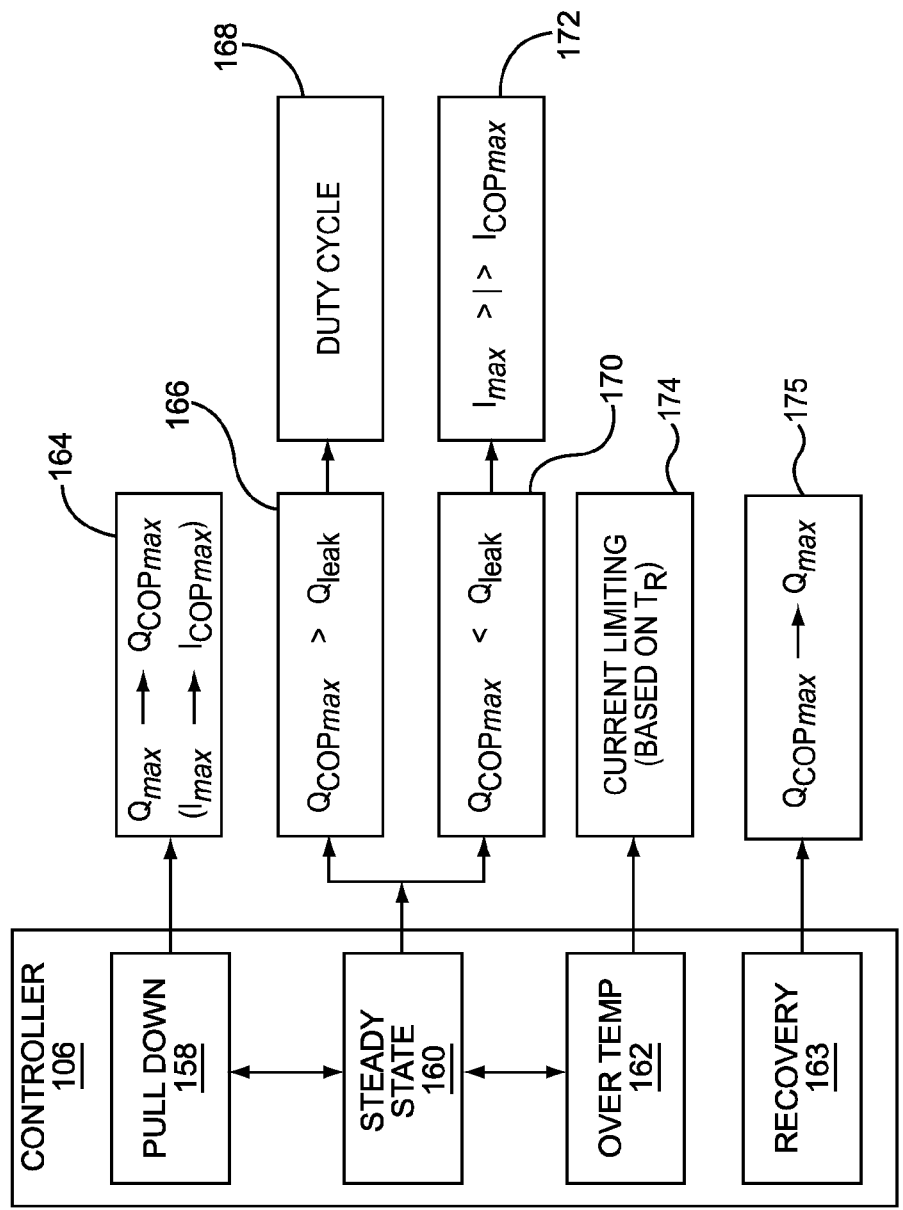
FIG. 16 is a more detailed illustration of the operation of the controller of FIG. 1 when operating in the various operating states of FIG. 15 according to one embodiment of the present disclosure.

The operation of the controller 106 in the different modes 158, 160, 162, and 163 in one embodiment of the present disclosure is illustrated in FIG. 16. As illustrated in FIG. 16, when operating in the pull down mode 158, the controller 106 controls the currents to all of the TECs 120 such that all of the TECs 120 operate at a power level between $Q_{COPmax}$ and $Q_{max}$ as the desired performance profile dictates. In other words, the controller 106 causes a current between $I_{COPmax}$ and $I_{max}$ to be provided to all of the TECs 120. The controller 106 determines when the thermoelectric refrigeration system 100 is in the pull down mode 158 based on, for example, being initially powered on, such as when the thermoelectric refrigeration system 100 is first purchased or after the thermoelectric refrigeration system 100 is powered on after becoming disconnected from a power source. The controller 106 maintains all of the TECs 120 at a power level between $Q_{COPmax}$ and $Q_{max}$ until the temperature of the cooling chamber 102 is pulled down to the set point temperature or within an acceptable range of the set point temperature, as shown with reference to 164. Once the cooling chamber 102 is pulled down to the set point temperature, the controller 106 controls the operation of the TECs 120 such that all of the TECs 120 operate at $Q_{COPmax}$ by causing the current $I_{COPmax}$ to be provided to all of the TECs 120. Moreover, the controller 106 may reduce the number of TECs 120 that are activated once the cooling chamber 102 is pulled down to the set point temperature.

As noted above, based on the temperature data, the controller 106 also determines when the thermoelectric refrigeration system 100 is in the steady state mode 160. The thermoelectric refrigeration system 100 is in the steady state mode 160 if the temperature of the cooling chamber 102 is equal to the set point temperature or within a predetermined range of the set point temperature. When in the steady state mode 160, the controller 106 sets the required number of the TECs 120 to $Q_{COPmax}$ as required by demand. In this example, all of the TECs 120 are operated at $Q_{COPmax}$ in the steady state mode 160. During the steady state mode 160, if $Q_{COPmax} > Q_{leak}$ as shown with reference to 166, the temperature of the cooling chamber 102 will continue to decrease. In this case, the controller 106 reduces the duty cycle of the activated TECs 120 as shown with reference to 168. Conversely, if $Q_{COPmax} < Q_{leak}$ as shown with reference to 170, the temperature of the cooling chamber 102 will increase. In this case, the controller 106 increases the number of active TECs 120 as available and then the current provided to the active TECs 120 to a value between $I_{COPmax}$ and $I_{max}$ as shown with reference to 172. Notably, $Q_{leak}$ refers to the amount of heat leaking into the cooling chamber 102, such as heat passing through a seal of a door of the cooling chamber 102, natural heat conduction through the cooling chamber 102, or the like.

As mentioned above, the controller 106 also determines if the cooling chamber 102 is in the over temperature mode 162 based on the temperature data from the temperature input 156. During operation of the thermoelectric refrigeration system 100, the temperature at the reject side of the heat exchanger 104 is monitored to ensure that the temperature at the reject side of the heat exchanger 104 does not exceed the predetermined maximum allowable temperature. The temperature of the reject side of the heat exchanger 104 may exceed the predetermined maximum allowable temperature when, for example, the cooling chamber 102 does not cool down, such as if the door to the cooling chamber 102 is not properly closed, or the like.

If the controller 106 determines that the temperature at the reject side of the heat exchanger 104 exceeds the predetermined maximum allowable temperature, in an operation 174, the controller 106 decreases the temperature at the reject side of the heat exchanger 104 by deactivating some or all of the TECs 120 that are facilitating cooling or by reducing the current being provided to the TECs 120. For example, if all of the TECs 120 are operating, either at $Q_{COPmax}$ or $Q_{max}$, the controller 106 may deactivate one or more of the TECs 120 or preferably all of the TECs 120. In another example, if the TECs 120a, 120b, 120e, and 120f are operating at $Q_{max}$, the controller 106 may deactivate the TECs 120e and 120f such that only the TECs 120a and 120b are operating at $Q_{max}$ and facilitating heat extraction from the cooling chamber 102. In another example, if the TECs 120a through 120d are operating at $Q_{COPmax}$, the controller 106 may deactivate the TECs 120c and 120d and then also activate the TEC 120e in order to maintain the temperature of the cooling chamber 102 as close as to the set point temperature as possible without harming the cartridge 112. It should be noted that the controller 106 may deactivate any number of active TECs 120 and activate any number of the inactive TECs 120 in response to determining that the temperature of the heat exchanger 104 exceeds the maximum allowable temperature.

As noted above, if the controller 106 determines that the temperature of the heat exchanger 104 exceeds the predetermined maximum allowable temperature, the controller 106 may reduce the current being provided to the TECs 120 in addition to or as an alternative to deactivating some or all of the TECs 120. To further illustrate this functionality, if all of the TECs 120 are operating, either at $Q_{COPmax}$ or $Q_{max}$, the controller 106 may decrease the amount of current being provided to each of the TECs 120. For example, if all of the TECs 120 are operating at $Q_{max}$, the controller 106 may reduce the current from $I_{max}$ to a value that is between $I_{COPmax}$ and $I_{max}$. In addition, if all of the TECs 120 are operating at $Q_{COPmax}$ or $Q_{max}$, the controller 106 may only reduce the current provided to some of the TECs 120 in order to reduce the temperature of the heat exchanger 104. In a further embodiment, the controller 106 may also deactivate some of the TECs 120 and simultaneously decrease the current to some or all of the TECs 120 that are still activated if the temperature of the heat exchanger 104 exceeds the predetermined maximum allowable temperature.

When in the recovery mode 163, the controller 106 switches the active TECs 120 from operating at $Q_{COPmax}$ to operating at $Q_{max}$ as shown at operation 175. The recovery mode 163 occurs when, during steady state operation, the controller 106 receives temperature data from the temperature input 154 indicating that the temperature within the cooling chamber 102 has significantly increased above the set point temperature within a short period of time. Specifically, the thermoelectric refrigeration system 100 may enter the recovery mode 163 when the temperature within the cooling chamber 102 increases above an upper threshold of the steady state range of temperatures (e.g., increases above the set point temperature plus some predefined value that defines the upper threshold of the desired steady state range).

It should be noted that the controls 164, 166, 168, 170, 172, 174, and 175 illustrated in FIG. 16 for the different modes 158, 160, 162, and 163 are only examples. The manner in which the controller 106 controls the TECs 120 in each of the modes 158, 160, 162, and 163 may vary depending on the particular implementation. In general, as discussed above, the controller 106 controls the TECs 120 to reduce the temperature of the cooling chamber 102 when in either the pull down mode 158 or the recovery mode 163. The exact manner in which this is done may vary. For example, if the performance profile is that a minimum pull down or recovery time is desired, the controller 106 can activate all of the TECs 120 at $Q_{max}$ with a 100% duty cycle (always on). Conversely, if a trade-off between pull down or recovery time and efficiency is desired, the controller 106 can, for example, activate all of the TECs 120 at $Q_{COPmax}$ with a 100% duty cycle (always on) or at anywhere in between $Q_{COPmax}$ and $Q_{max}$. When in the steady state mode 160, the controller 106 generally operates to maintain the set point temperature in an efficient manner. For example, the controller 106 can operate the required number of the TECs 120 (e.g., all of the TECs 120 or less than all of the TECs 120) at $Q_{COPmax}$ based on load. This predetermined number of the TECs 120 is a number of the TECs 120 that is required to maintain the set point temperature by operating at or near $Q_{COPmax}$. If not all of the TECs 120 are needed during the steady state mode 160, then the unneeded TECs 120 are deactivated. The controller 106 can fine tune the operation of the activated TECs 120 to precisely maintain the set point temperature by, for example, slightly increasing or decreasing the input current of the activated TECs 120 such that the activated TECs 120 operate slightly above $Q_{COPmax}$ or by increasing or decreasing the duty cycle of the activated TECs 120 to compensate for $Q_{leak}$.

Returning to FIG. 15, the thermoelectric refrigeration system 100 also includes a user interface (UI) 176, a power source 178, an accessory (acc) 180, and power electronics 182. The user interface 176 allows a user to input various control parameters associated with the thermoelectric refrigeration system 100. These control parameters include the set point temperature of the cooling chamber 102. In some embodiments, the control parameters may additionally include values for the steady state range of temperatures. Note that, in some embodiments, the user interface 176 may additionally allow the user or a manufacturer of the thermoelectric refrigeration system 100 to define the maximum allowable temperature for the reject side of the heat exchanger 104, the current values associated with $I_{COPmax}$ and $I_{max}$, and/or the like. However, it should be noted that some or all of the control parameters may be programmed or hard-coded into the controller 106.

The power source 178 provides power to the controller 106, the accessory 180, and the power electronics 182. The accessory 180 may be a chamber light or a communication module for expanded capabilities. In an embodiment where the accessory 180 is a communication module, the accessory 180 may communicate with remote devices, such as, but not limited to: a cellular telephone, a remotely located computing device, or even other appliances and thermoelectric refrigeration systems. In an embodiment where the accessory 180 communicates with a cellular telephone or a remotely located computing device, the accessory 180 can provide operational parameters (e.g., the temperature data) of the thermoelectric refrigeration system 100 and the cooling chamber 102 to a remote device or entity. In an embodiment where the accessory 180 communicates with other thermoelectric refrigeration systems, the accessory 180 may communicate operational parameters of the thermoelectric refrigeration system 100 to the other thermoelectric refrigeration systems, such as the set point temperature, upper and lower thresholds of the set point temperature, a maximum allowable temperature of the cooling chamber 102, the maximum allowable temperature of the reject side of the heat exchanger 104, or the like.

The power electronics 182 generally operate to provide current to the TECs 120 in response to control inputs from the controller 106. More specifically, the power electronics 182 independently provide current to each of the subsets of the TECs 120. In one embodiment, the duty cycles of the different subsets of the TECs 120 are also controlled. In this case, the power electronics 182 may provide a pulse width modulation function by which the duty cycles of the different subsets of the TECs 120 are controlled.

Figure 17:
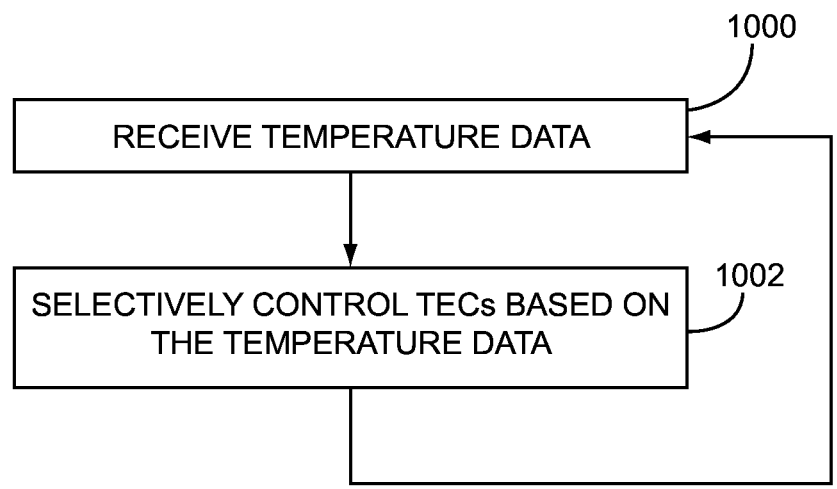
FIG. 17 illustrates a method of operating the controller of FIG. 1 to maintain the temperature of the cooling chamber at a set point temperature in accordance with one embodiment of the present disclosure.

With reference to FIG. 17, a method of operation of the controller 106 to maintain the cooling chamber 102 at the set point temperature is illustrated in accordance with one embodiment of the present disclosure. Initially, the temperature data corresponding to the temperature within the cooling chamber 102 and the temperature at the reject side of the heat exchanger 104 is received (step 1000). For example, a thermocouple, or any other type of temperature sensor, may be used to determine the temperature of the cooling chamber 102 and provide the temperature as temperature data to the controller 106 in step 1000 via the temperature input 154. Furthermore, a thermocouple, or any other type of temperature sensor, may be used to determine the temperature of the reject side of the heat exchanger 104 and provide the temperature as temperature data to the controller 106 in step 1000 via the temperature input 156.

In response to receiving the temperature data, the controller 106 selectively controls the TECs based on the temperature data (step 1002). In general, the controller 106 selectively controls one or more and, in some preferred embodiments, two or more different subsets of the TECs based on the temperature data and the set point temperature for the cooling chamber 102. Using the TECs 120 in the cartridge 112 of FIG. 3 as an example, the controller 106 selectively, or separately, controls the different subsets of the TECs 120. More specifically, as discussed above, the controller 106 determines whether the thermoelectric refrigeration system 100 is in the pull down mode 158, the steady state mode 160, or the recovery mode 163 based on the temperature data and the set point temperature for the cooling chamber 102. If the controller 106 determines that the thermoelectric refrigeration system 100 is in either the pull down mode 158 or the recovery mode 163, the controller 106 controls the TECs 120 to decrease the temperature of the cooling chamber 102 by either activating TECs 120 that are currently deactivated, increasing the current provided to the activated TECs 120, and/or increasing the duty cycle of the activated TECs 120. If the controller 106 determines that the thermoelectric refrigeration system 100 is in the steady state mode 160, the controller 106 controls the TECs 120 to maintain the set point temperature. In the steady state mode 160, the controller 106 may, for example, activate or deactivate the different subsets of the TECs 120, increase or decrease the current provided to the different subsets of the activated TECs 120, and/or increase or decrease the duty cycle of the different subsets of the activated TECs 120 as needed to maintain the set point temperature.

As an example, if the temperature data indicates that the thermoelectric refrigeration system 100 is in the recovery mode 163 while the TECs 120a, 120b, and 120e operate at $Q_{COPmax}$ during steady state operation, the controller 106 may activate additional subsets of the inactive TECs 120c, 120d, and 120f and operate the newly activated TECs 120 at $Q_{COPmax}$. If further cooling capacity is needed, the controller 106 may then increase the current provided to the active TECs 120a, 120b, 120c, 120d, 120e, and 120f up to $I_{max}$ in order to pull the temperature of the cooling chamber 102 down to the set point temperature as soon as possible. After the controller 106 selectively controls the TECs 120 to operate at $Q_{max}$, the method returns to step 1000 and the controller 106 once again receives the temperature data. Returning to the example, if the temperature data received in step 1000 indicates that the cooling chamber 102 has been cooled to the set point temperature, the controller 106 decreases the current provided to the TECs 120a, 120b, and 120e from $I_{max}$ to $I_{COPmax}$ such that the TECs 120a, 120b, and 120e operate at $Q_{COPmax}$ for the steady state mode 160 in step 1002. In addition, the controller 120 deactivates the TECs 120c, 120d, and 120f, which in this example are unused in the steady state mode 160. The controller 106 continually repeats this process to maintain the set point temperature in the cooling chamber 102.

In other words, in one embodiment, the controller 106 is configured or enabled to control the TECs 120 according multiple control schemes. The control schemes include independently controlling activation and deactivation of the different subsets of the TECs 120, independently controlling a current provided to each subset of the TECs 120, and/or independently controlling a duty cycle of each subset of the TECs 120. In operation, the controller 106 selects one or more control schemes based on the temperature of the cooling chamber 102 and, in some embodiments, the temperature at the reject side of the heat exchanger 104, as well as a desired performance profile. The desired performance profile may be programmable or hard-coded into the controller 106. The desired performance profile dictates how the TECs 120 are controlled (e.g., maximum efficiency, maximum capacity, or somewhere between maximum efficiency and maximum capacity) for the different modes of operation. Once the control scheme(s) are selected, the controller 106 controls the different subsets of the TECs 120 according to the selected control scheme(s). Thus, the controller 106 can control any combination of activation/deactivation, current, and duty cycle for each mode of operation.

For example, for the steady state mode 160, the controller 106 may select the control scheme of activation/deactivation of the TECs 120 based on the temperature of the cooling chamber 102 and a desired performance profile of maximizing efficiency during the steady state mode 160. In this case, the controller 106 then activates one or more of the subsets of TECs 120 and, in some embodiments, deactivates one or more other subsets of the TECs 120. In addition, the controller 106 may choose to control the current and/or duty cycle of the activated TECs 120 during the steady state mode 160, in which case the controller 106 independently controls the current provided to each of the activated subsets of TECs 120 and/or the duty cycle of each of the activated subsets of TECs 120. Continuing this example, for the recovery mode 163 or the pull down mode 158, the controller 106 may select the control scheme of activation/deactivation of the TECs 120 based on the temperature of the cooling chamber 102 and a desired performance profile (e.g., minimizing pull down or recovery time). In this case, the controller 106 activates additional subsets of the TECs 120 not activated during the steady state mode 160. In addition, the controller 106 may choose to control the current and/or duty cycle of the activated subsets of TECs 120 for the pull down mode 158 or the recovery mode 163, in which case the controller 106 independently controls the current of each of the activated subsets of TECs 120 and/or the duty cycle of each of the activated subsets of TECs 120.

Figure 18:
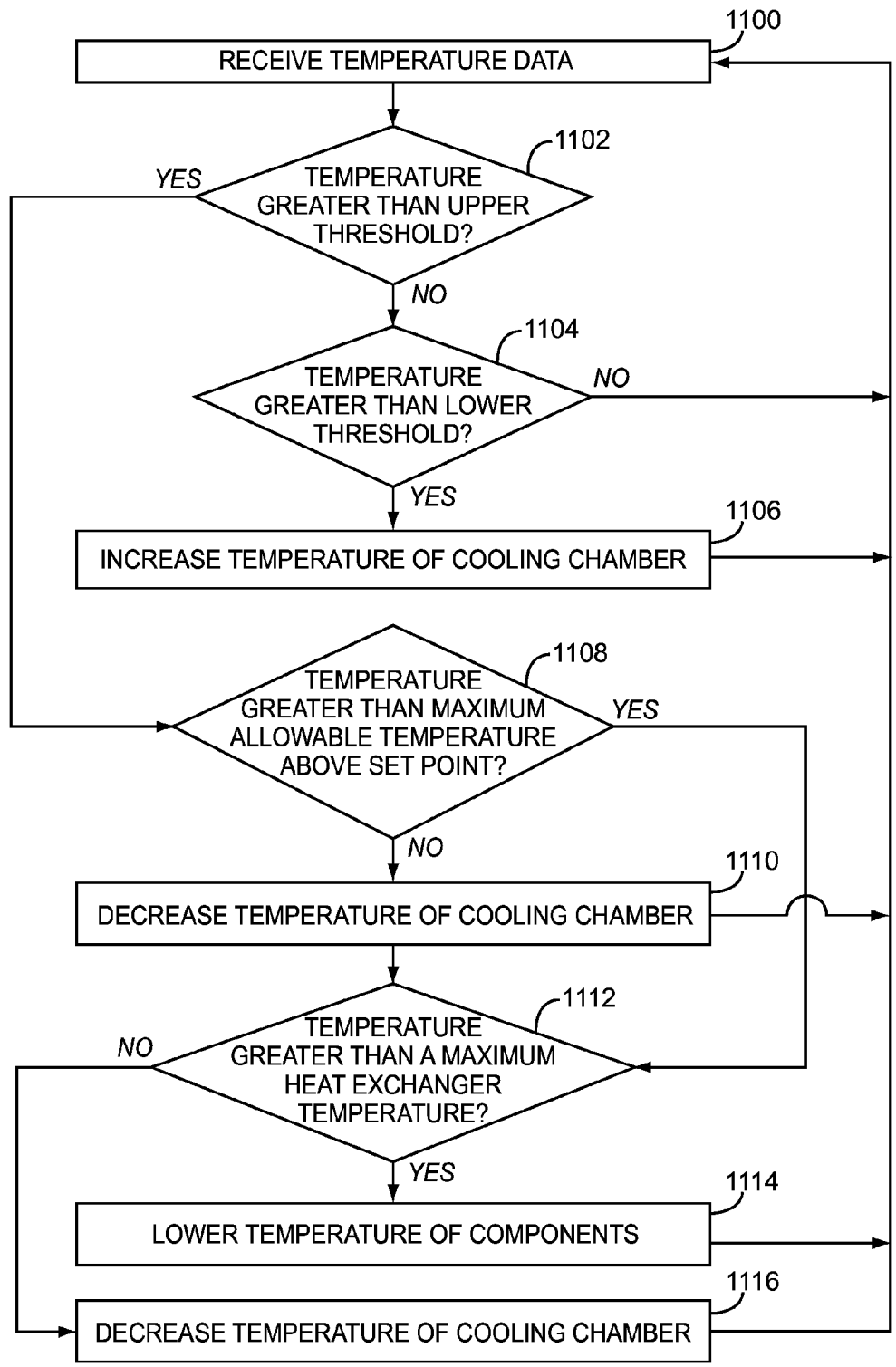
FIG. 18 illustrates a method of operating the controller of FIG. 1 to maintain the temperature of the cooling chamber at a set point temperature in accordance with another embodiment of the present disclosure.

FIG. 18 is a flow chart that illustrates a method of operation of the controller 106 to maintain the cooling chamber 102 at the set point temperature according to another embodiment of the present disclosure. Initially, the temperature data for the cooling chamber 102 and the reject side of the heat exchanger 104 is received (step 1100). After the temperature data is received, the controller 106 determines whether the temperature of the cooling chamber 102 is greater than an upper threshold of the steady state range for the temperature of the cooling chamber 102 (step 1102). The steady state range is an acceptable temperature range for the cooling chamber 102 that includes the set point temperature. As an example, the steady state range may be the set point temperature plus or minus a predefined offset (e.g., 2 degrees). If the temperature of the cooling chamber 102 is not greater than the upper threshold of the steady state range, the controller 106 determines whether the temperature of the cooling chamber 102 is greater than a lower threshold of the steady state range (step 1104).

If the temperature of the cooling chamber 102 is not greater than the lower threshold of the steady state range, the process returns to step 1100. However, if the temperature of the cooling chamber 102 is below the lower threshold of the steady state range, the controller 106 controls the TECs 120 to increase the temperature of the cooling chamber 102 (step 1106). Depending on the particular embodiment, the controller 106 increases the temperature of the cooling chamber 102 by deactivating one or more of the TECs, decreasing the current input to one or more of the TECs 120, and/or decreasing the duty cycle of one or more of the TECs 120. Since the controller 106 can selectively control the different subsets of the TECs 120, the controller 106 has substantial flexibility in how the temperature of the cooling chamber 102 is increased. After controlling the TECs 120 to increase the temperature of the cooling chamber 102, the process returns to step 1100 and is repeated.

Returning to step 1102, if the temperature of the cooling chamber 102 is greater than the upper threshold of the steady state range, the controller 106 then determines whether the temperature of the cooling chamber 102 is greater than a predetermined maximum allowable temperature for the cooling chamber 102 (step 1108). If so, the process proceeds to step 1112. If not, the controller 106 controls the TECs 120 to decrease the temperature of the cooling chamber 102 (step 1110). The controller 106 controls the TECs 120 to decrease the temperature of the cooling chamber 102 by activating one or more previously deactivated TECs 120, increasing the current input to one or more of the activated TECs 120 from $I_{COPmax}$ to a value that is greater than $I_{COPmax}$ (e.g., $I_{max}$), and/or increasing the duty cycle of one or more of the activated TECs 120. Using the TECs 120 in the embodiment of the cartridge 112 of FIG. 3 as an example, the controller 106 independently controls the different subsets of the TECs 120. So, for example, if prior to step 1110 the first subset of the TECs (i.e., the TECs 120a and 120b) are activated and operating at $Q_{COPmax}$ but the remaining TECs 120 are deactivated, the controller 106 can decrease the temperature of the cooling chamber 102 by increasing the current input to the first subset of the TECs 120 from $I_{COPmax}$ to a value greater than $I_{COPmax}$ (e.g., $I_{max}$), increasing a duty cycle of the first subset of the TECs 120, activating the second subset of the TECs 120 to operate at $Q_{COPmax}$ or a capacity greater than $Q_{COPmax}$ with a desired duty cycle (e.g., always on), activating the third subset of the TECs 120 to operate at $Q_{COPmax}$ or a capacity greater than $Q_{COPmax}$ with a desired duty cycle (e.g., always on), and/or activating the fourth subset of the TECs 120 to operate at $Q_{COPmax}$ or a capacity greater than $Q_{COPmax}$ with a desired duty cycle (e.g., always on).

Next, whether proceeding from the "yes" branch of step 1108 or step 1110, the controller 106 determines whether the temperature at the reject side of the heat exchanger 104 is greater than the predetermined maximum allowable temperature for the reject side of the heat exchanger 104 (step 1112). If so, the controller 106 controls the TECs 120 to lower the temperature of the heat exchanger components (step 1114). Specifically, the controller 106 controls the TECs 120 to lower the temperature of the components of the heat exchanger 104 at the reject side (e.g., the hot side heat sink 108). Lowering the temperature of the components of the heat exchanger 104 may be accomplished by deactivating some or all of the TECs 120, reducing the current provided to some or all of the TECs 120, or a combination thereof. The process then returns to step 1100 and is repeated.

However, if the temperature at the reject side of the heat exchanger 104 is not greater than the predetermined maximum allowable temperature, the controller 106 controls the TECs to decrease the temperature of the cooling chamber 102 (step 1116). As discussed above, the controller 106 controls the TECs 120 to decrease the temperature of the cooling chamber 102 by activating one or more previously deactivated TECs 120, increasing the current input to one or more of the activated TECs 120 from $I_{COPmax}$ to a value that is greater than $I_{COPmax}$ (e.g., $I_{max}$), and/or increasing the duty cycle of one or more of the activated TECs 120. For example, if prior to step 1116 the first subset of the TECs (i.e., the TECs 120a and 120b) are activated and operating at $Q_{COPmax}$ but the remaining TECs 120 are deactivated, the controller 106 can decrease the temperature of the cooling chamber 102 by increasing the current input to the first subset of the TECs 120 from $I_{COPmax}$ to a value greater than $I_{COPmax}$ (e.g., $I_{max}$), increasing a duty cycle of the first subset of the TECs 120, activating the second subset of the TECs 120 to operate at $Q_{COPmax}$ or a capacity greater than $Q_{COPmax}$ with a desired duty cycle (e.g., always on), activating the third subset of the TECs 120 to operate at $Q_{COPmax}$ or a capacity greater than $Q_{COPmax}$ with a desired duty cycle (e.g., always on), and/or activating the fourth subset of the TECs 120 to operate at $Q_{COPmax}$ or a capacity greater than $Q_{COPmax}$ with a desired duty cycle (e.g., always on). After decreasing the temperature of the cooling chamber 102 in step 1116, the process returns to step 1100 and is repeated.

As an example, assume that the temperature data indicates that the cooling chamber 102 is at 0.9° C. and the reject side of the heat exchanger 104 is at 19° C. In addition, for this example, the set point temperature for the cooling chamber 102 is 2.2° C., the upper threshold of the steady state range is 5.0° C., the lower threshold of the steady state range is 1.0° C., the maximum allowable temperature in the cooling chamber 102 is 15° C., and the maximum allowable temperature at the reject side of the heat exchanger 104 is 20° C. Using this example, the controller 106 first determines that the temperature of the cooling chamber 102 (0.9° C.) does not exceed the upper threshold value of the steady state range (5.0° C.). Thus, the controller 106 performs step 1104 where the controller 106 determines that the temperature of the cooling chamber 102 (0.9° C.) is less than the lower threshold of the steady state range (1.0° C.). Therefore, the controller 106 performs step 1106 to increase the temperature of the cooling chamber 102. After performing step 1106, the controller 106 returns to step 1100 to thereby receive updated temperature data and continue the process.

As another example, assume that the temperature data indicates that the temperature of the cooling chamber 102 is 14° C. and the temperature at the reject side of the heat exchanger 104 is 18° C. In addition, for this example, the set point temperature for the cooling chamber 102 is 2.2° C., the upper threshold of the steady state range is 5.0° C., the lower threshold of the steady state range is 1.0° C., the maximum allowable temperature in the cooling chamber 102 is 15° C., and the maximum allowable temperature at the reject side of the heat exchanger 104 is 20° C. Using this example, the controller 106 determines that the temperature of the cooling chamber 102 (14° C.) is greater than the upper threshold of the steady state range (5.0° C.). Therefore, the controller 106 performs step 1108, where the controller 106 determines that the temperature of the cooling chamber 102 (14° C.) is less than the maximum allowable temperature of the cooling chamber 102 (15° C.). Accordingly, the controller 106 performs step 1110 to thereby decrease the temperature of the cooling chamber 102.

In a third example, the temperature data indicates that the temperature of the cooling chamber 102 is 17° C. and the temperature of the heat exchanger 104 is 22° C. In addition, for this example, the set point temperature for the cooling chamber 102 is 2.2° C., the upper threshold of the steady state range is 5.0° C., the lower threshold of the steady state range is 1.0° C., the maximum allowable temperature in the cooling chamber 102 is 15° C., and the maximum allowable temperature at the reject side of the heat exchanger 104 is 20° C. In step 1102, the controller 106 determines that the temperature of the cooling chamber 102 is greater than the upper threshold of the steady state range. Therefore, the controller 106 performs step 1108, where the controller 106 determines that the temperature of the cooling chamber 102 (17° C.) exceeds the maximum allowable temperature within the cooling chamber 102 (15° C.). Accordingly, the controller 106 performs step 1112, where the controller 106 determines whether the temperature at the reject side of the heat exchanger 104 exceeds the maximum allowable temperature at the reject side of the heat exchanger 104. In accordance with an embodiment of the present disclosure, the maximum allowable temperature at the reject side of the heat exchanger 104 is a temperature beyond which components of the heat exchanger 104 may overheat and become damaged. An example of when the temperature at the reject side of the heat exchanger 104 exceeds the maximum allowable temperature at the reject side of the heat exchanger 104 is when there is great amount of heat leak through the cooling chamber 102, such as when a door of the cooling chamber 102 is left open. In the scenario where the door of the cooling chamber 102 is left open, the thermoelectric refrigeration system 100 is trying to pull down the temperature of the cooling chamber 102 to the set point temperature. Here, as there is a great amount of heat leak, the components of the heat exchanger 104 may not be able to pull down the temperature of the cooling chamber 102 and instead become overworked, thereby overheating (i.e., exceeding the maximum allowable temperature at the reject side of the heat exchanger 104). Another example of when the temperature at the reject side of the heat exchanger 104 exceeds the maximum allowable temperature at the reject side of the heat exchanger 104 is when proper heat transfer is not occurring between the accept loop 114 and the cooling chamber 102, such as if there is a clog in the accept loop 114, if there is an issue with the cooling medium within the accept loop 114, or the like. In the third example, the temperature at the reject side of the heat exchanger 104 (22° C.) exceeds the maximum allowable temperature at the reject side of the heat exchanger 104 (20° C.). Accordingly, the controller 106 performs step 1114, where the controller 106 cools the temperature of the components of the heat exchanger 104.

Figure 19:
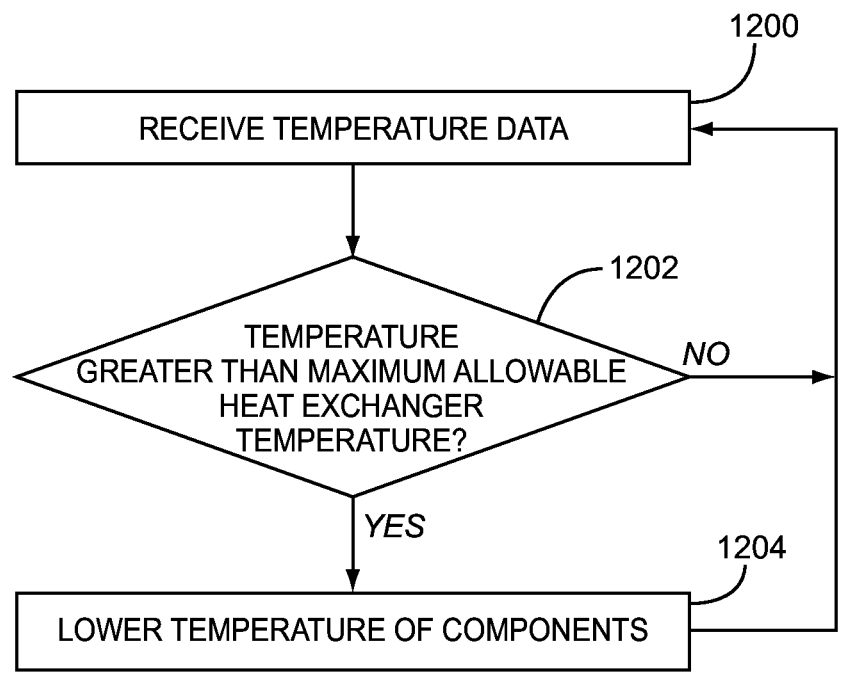
FIG. 19 illustrates a method of operating the controller of FIG. 1 to monitor a temperature of one or more components of the heat exchanger of FIG. 1 to detect an over-temperature condition and, in response, take action to lower the temperature of the one or more components of the heat exchanger in accordance with one embodiment of the present disclosure.

FIG. 19 is a flow chart that illustrates a method of operation of the controller 106 to monitor the temperature at the reject side of heat exchanger 104 in accordance with one embodiment of the present disclosure. Initially, the controller 106 receives temperature data (step 1200). In one embodiment, the temperature data corresponds to the temperature at the reject side of the heat exchanger 104. After receiving the temperature data, the controller 106 determines whether the temperature at the reject side of the heat exchanger 104 exceeds the maximum allowable temperature at the reject side of the heat exchanger 104, as described above with reference to step 1112 of FIG. 18 (step 1202). If the temperature at the reject side of the heat exchanger 104 does not exceed the maximum allowable temperature, the process returns to step 1200 and is repeated. However, if the temperature at the reject side of the heat exchanger 104 exceeds the maximum allowable temperature at the reject side of the heat exchanger 104, the controller 106 controls the TECs 120 to thereby reduce the temperature at the reject side of the heat exchanger 104 (step 1204).

Multi Parallel Heat Exchange Systems

Figure 20A:
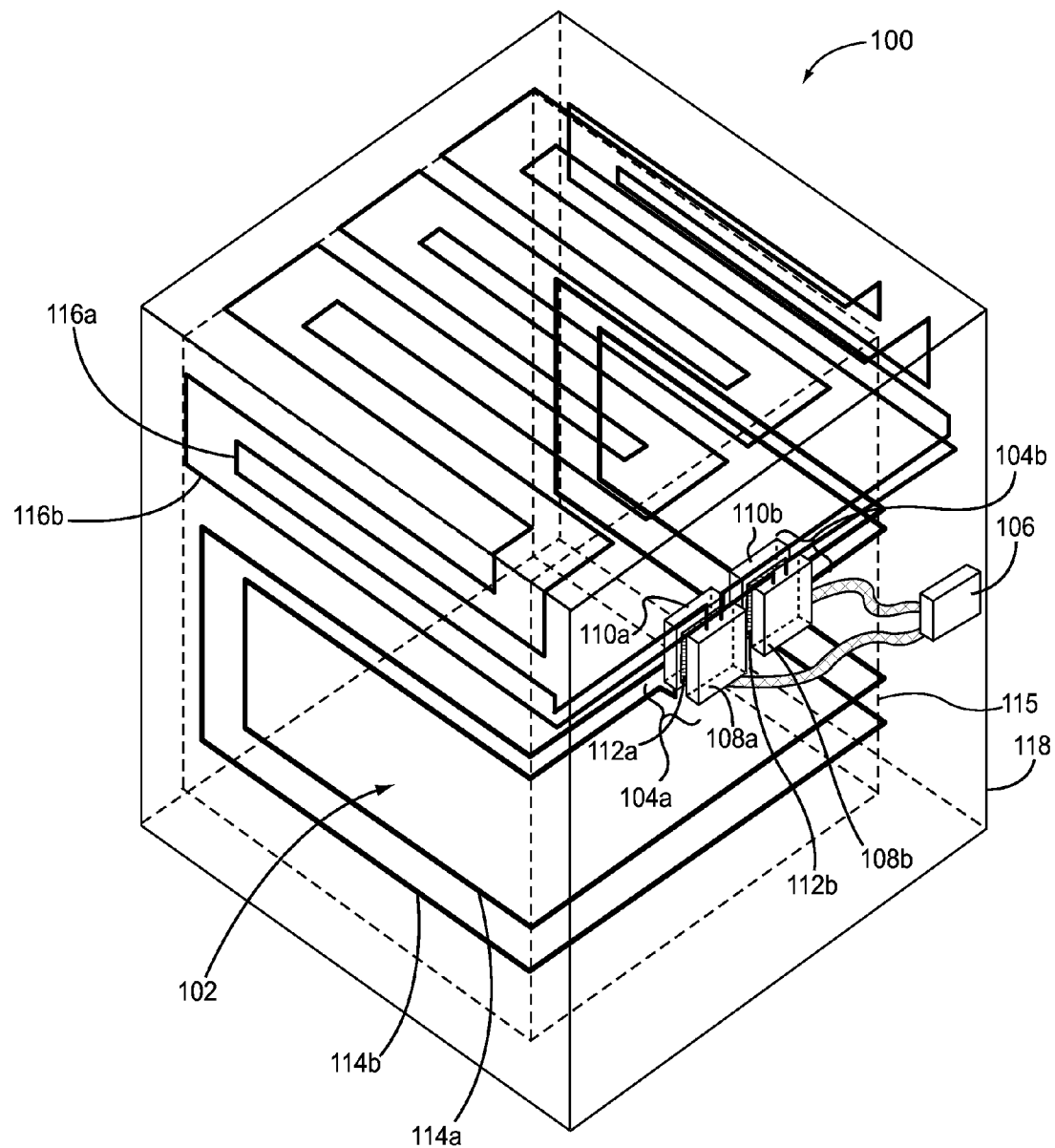
FIGS. 20A through 20C illustrate a thermoelectric refrigeration system having multiple parallel heat exchangers in accordance with another embodiment of the present disclosure.
Figure 20B:
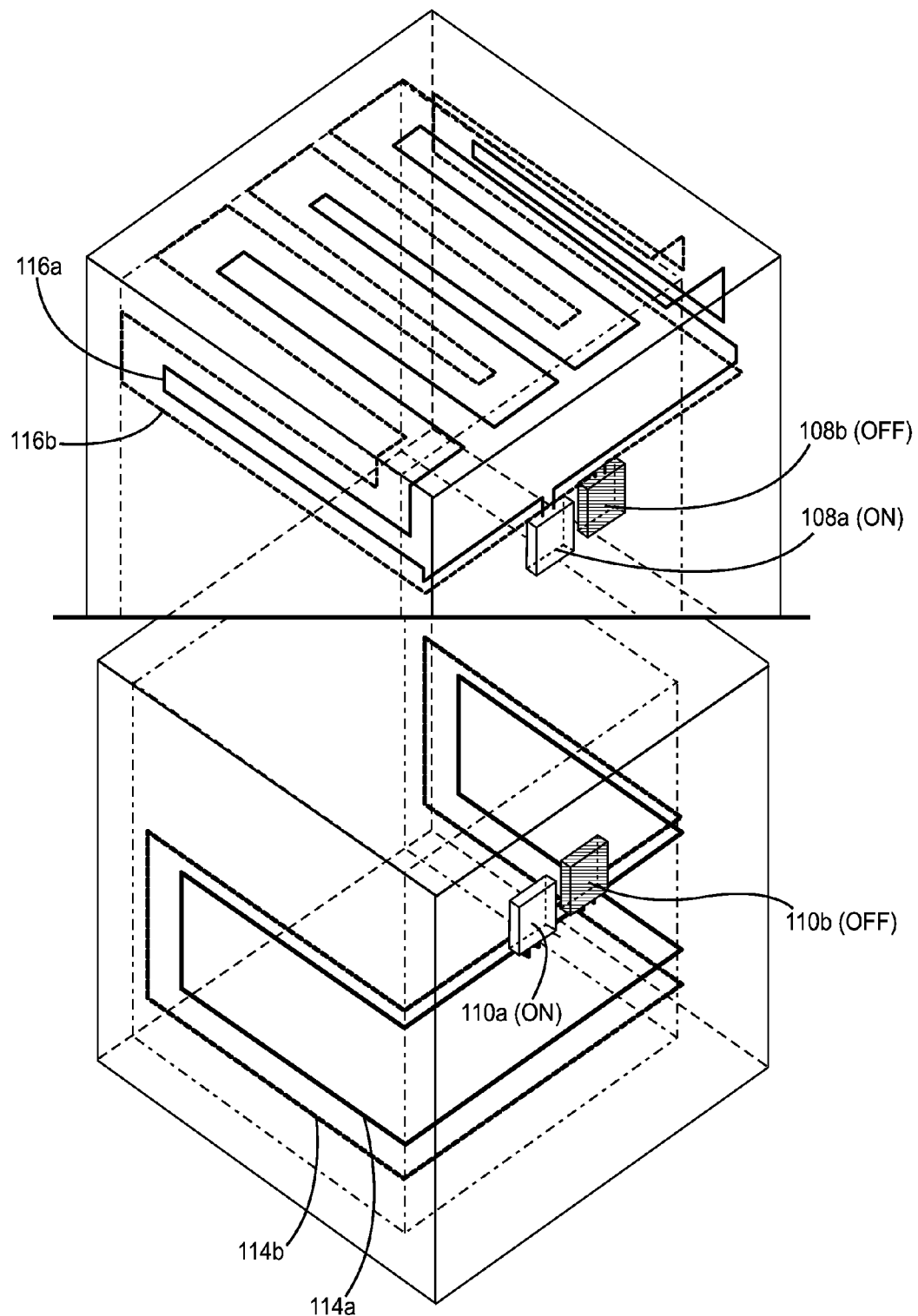
Figure 20C:
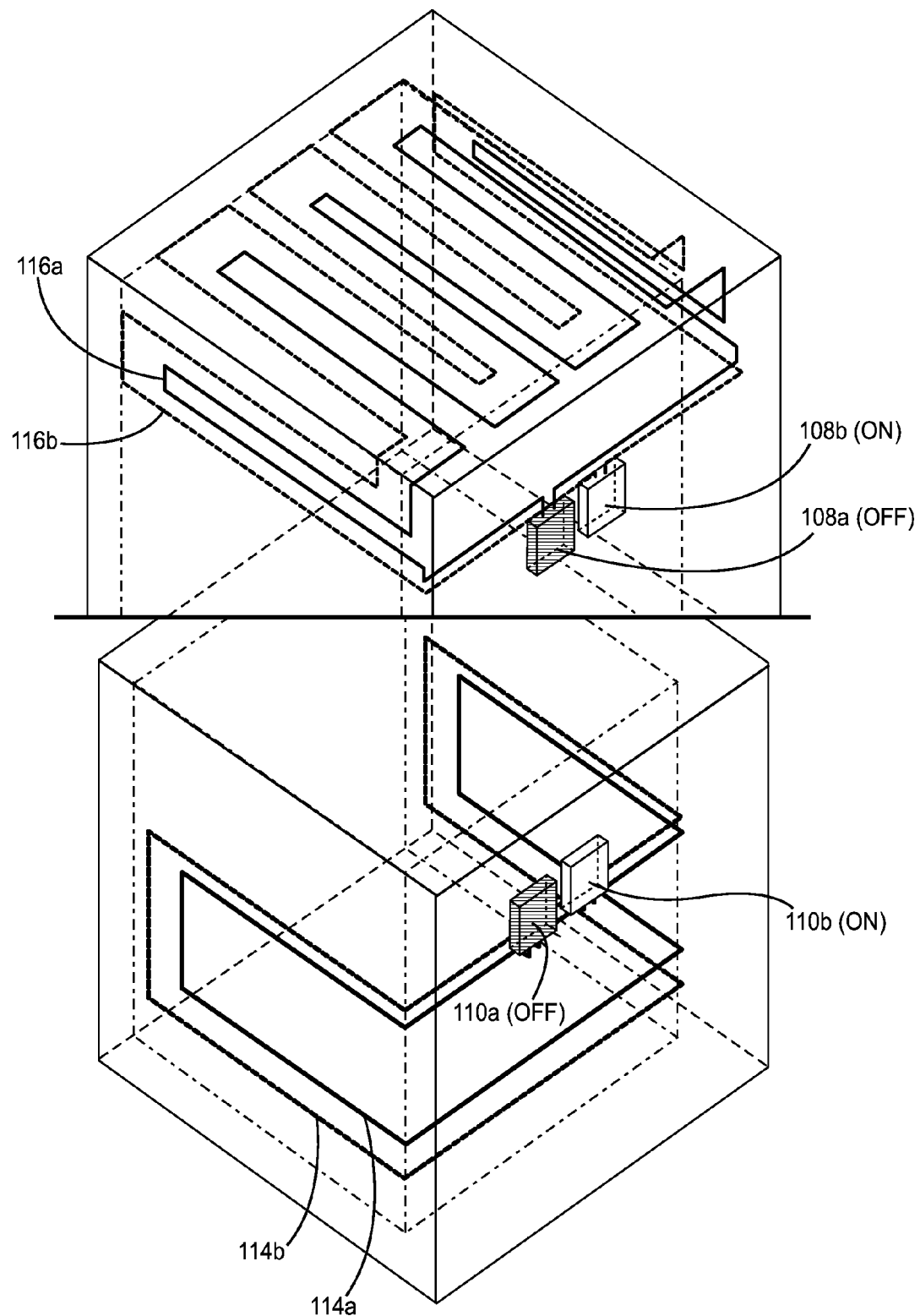

In the embodiments described above, the thermoelectric refrigeration system 100 includes a single heat exchange system (i.e., a single heat exchanger 104, a single accept loop 114, and a single reject loop 116). FIGS. 20A through 20C illustrate another embodiment of the thermoelectric refrigeration system 100 that includes two parallel heat exchange systems. Note that while two parallel heat exchange systems are illustrated in the embodiment of FIGS. 20A through 20C, any number of two or more parallel heat exchange systems may be used. As illustrated in FIG. 20A, the two parallel heat exchange systems are the same as the heat exchange system of FIG. 1. In particular, the first heat exchange system includes a heat exchanger 104a that includes a hot side heat sink 108a, a cold side heat sink 110a, a cartridge 112a disposed between the hot side and cold side heat sinks 108a and 110a, an accept loop 114a coupled to the cold side heat sink 110a, and a reject loop 116a coupled to the hot side heat sink 108a. The cartridge 112a includes one or more TECs and preferably multiple TECs that are selectively controlled by the controller 106. In some preferred embodiments, the TECs are disposed on an interconnect board that enables selective and independent control of one or more, and preferably two or more, subsets of the TECs in the manner described above with respect to the cartridge 112 of FIG. 1. Likewise, the second heat exchange system includes a heat exchanger 104b that includes a hot side heat sink 108b, a cold side heat sink 110b, a cartridge 112b disposed between the hot side and cold side heat sinks 108b and 110b, an accept loop 114b coupled to the cold side heat sink 110b, and a reject loop 116b coupled to the hot side heat sink 108b. The cartridge 112b includes one or more TECs and preferably multiple TECs that are selectively controlled by the controller 106. In some preferred embodiments, the TECs are disposed on an interconnect board that enables selective and independent control of one or more, and preferably two or more, subsets of the TECs in the manner described above with respect to the cartridge 112 of FIG. 1. The operation of the two parallel heat exchange systems of FIG. 20A and the control of the TECs in the cartridges 112a and 112b is the same as that described above with respect to the corresponding heat exchange system and the cartridge 112 of FIG. 1. As such, the details are not repeated.

The parallel heat exchange systems provide an additional degree of freedom for the controller 106 when controlling the TECs in the cartridges 112a and 112b. More specifically, in addition to selectively and independently controlling one or more, and preferably two or more, subsets of TECs in the cartridge 112a, the controller 106 is also enabled to selectively and independently control one or more, and preferably two or more, subsets of TECs in the cartridge 112b independently from the subset(s) of TECs in the cartridge 112a. As one example, during steady state operation, the controller 106 may activate some or potentially all of the TECs in the cartridge 112a preferably at or near (e.g., slightly above or potentially below) $Q_{COPmax}$ and deactivate all of the TECs in the cartridge 112b, as illustrated in FIG. 20B. Conversely, during pull down or recovery, the controller 106 may activate any previously deactivated TECs in the cartridge 112a and activate some or potentially all of the TECs in the cartridge 112b, as illustrated in FIG. 20C. During pull down or recovery, the activated TECs are preferably operated at $Q_{COPmax}$, $Q_{max}$, or some value between $Q_{COPmax}$ and $Q_{max}$.

One non-limiting advantage of the parallel heat exchangers 104a and 104b is the ability to completely isolate large numbers of TEC subsets while at the same time providing for large recovery capacity without suffering from parasitic losses associated with deactivated TECs located in the same heat exchanger 104a, 104b as the active TECs. Another non-limiting advantage of the parallel heat exchangers 104a and 104b is related to maximizing efficiency by better balancing of the different control regimes to the relevant heat exchanger volume/dissipation area.

Cascaded Heat Sinks

In a further embodiment of the present disclosure, arrays of TECs may be cascaded in order to maintain different cooling chambers at different set point temperatures. In one embodiment, a single thermoelectric refrigeration system may have a first cooling chamber and a second cooling chamber each having different set point temperatures. In one embodiment, a first set of TECs (e.g., TECs in a first cartridge) provide cooling for the first cooling chamber. In addition, a second set of TECs (e.g., TECs in a second cartridge) provide cooling for the second cooling chamber, where the set point temperature of the second cooling chamber is lower than that of the first cooling chamber. In this embodiment, the first and second sets of the TECs are thermally coupled to one another via cascaded heat sinks. In this embodiment, during cooling of the first cooling chamber, the first set of TECs extract heat from the first cooling chamber and operate to reject the extracted heat to an environment external to the first cooling chamber. In this embodiment, during cooling of the second cooling chamber, the second set of TECs extract heat from the second cooling chamber and then operate to reject the extracted heat to the first set of TECs. Here, the first set of TECs operates to reject the heat extracted from the second cooling chamber to an environment external to the first and second cooling chambers. In this embodiment, the first set of TECs may operate independently of the second set of TECs. In particular, the first set point temperature may be different from the second set point temperature. Further, there may be different modes of operation for each of the cooling chambers (e.g., the first cooling chamber may be in pull down while the second cooling chamber is in steady state due to opening of a door of the first cooling chamber).

In this regard, FIG. 21 illustrates a thermoelectric refrigeration system 184 having cooling chambers 186 and 188 in accordance with an embodiment of the present disclosure. In this embodiment, the cooling chambers 186 and 188 have different set point temperatures. For example, if the thermoelectric refrigeration system 184 is a household refrigerator, the cooling chamber 186 may correspond to a freezer and the cooling chamber 188 may correspond to a refrigerator. The thermoelectric refrigeration system 184 also includes a heat exchanger 190 in accordance with another embodiment of the present disclosure. Here, the heat exchanger 190 includes a hot side heat sink 192 and two cold side heat sinks, namely, a cold side heat sink 194 and a cold side heat sink 196. The hot side heat sink 192 thermally couples with a reject loop 198 and operates to reject heat from the cooling chambers 186 and 188 in a manner similar to that described above with respect to the cooling chamber 102, the hot side heat sink 108, and the reject loop 116 of FIG. 1. In this example, the heat exchanger 190 is between an interior wall 200 that defines the cooling chamber 188 and an outer wall 202 of the thermoelectric refrigeration system 184.

The heat exchanger 190 also includes cartridges 204 and 206. The cartridge 204 thermally couples with both the cold side heat sink 194 and the cold side heat sink 196. The cartridge 204 includes TECs as described above with reference to the cartridge 112 of FIG. 1 where a cold side of the TECs is thermally coupled to the cold side heat sink 194 and a hot side of the TECs is thermally coupled to the cold side heat sink 196. Moreover, the TECs disposed within the cartridge 204 may have any number of TECs, as described above with reference to FIGS. 3 through 8. The TECs within the cartridge 204 facilitate the transfer of heat between the cold side heat sink 194 and the cold side heat sink 196. The heat that is transferred between the cold side heat sink 194 and the cold side heat sink 196 is heat extracted from the cooling chamber 186 via an accept loop 208.

The cartridge 206 is disposed between the hot side heat sink 192 and the cold side heat sink 196. The cartridge 206 includes TECs as described above with reference to the cartridge 112 of FIG. 1 where a cold side of the TECs is thermally coupled to the cold side heat sink 196 and a hot side of the TECs is thermally coupled to the hot side heat sink 192. The TECs in the cartridge 206 facilitate heat transfer between the cold side heat sink 196 and the hot side heat sink 192. Moreover, the TECs disposed within the cartridge 206 may have any number of TECs, as described above with reference to FIGS. 3 through 8. In this embodiment, the heat transferred between the cold side heat sink 196 and hot side heat sink 192 is heat extracted from the cooling chamber 188 via an accept loop 210 and, if TECs in the cartridge 204 are activated, heat extracted from the cooling chamber 186 via the accept loop 208.

Each of the accept loops 208 and 210 operate in a manner similar to that described above with reference to the accept loop 114 of FIG. 1. In particular, as described above with reference to the accept loop 114, each of the accept loops 208 and 210 facilitate the extraction of heat from a cooled chamber (i.e., the cooling chambers 186 or 188, respectively). The TECs in the cartridges 204 and 206 are separately controllable. Thus, in other words, subsets of the TECs in each of the cartridges 204 and 206 are separately controllable to maintain the set point temperatures in the cooling chambers 186 and 188.

As noted above, each of the cartridges 204 and 206 includes TECs having the functionality described above. In one embodiment of the present disclosure, the cartridge 206 has a greater number of TECs than the cartridge 204 such that the cartridge 206 may facilitate transferring heat from both of the accept loops 208 and 210. For example, if one or more subsets of the TECs in the cartridge 204 are activated, then the TECs in the cartridge 206 must be controlled to have sufficient capacity to transfer the heat extracted by the accept loop 208 as well as any heat extracted by the accept loop 210. For example, if four TECs in the cartridge 204 are operating at $Q_{COPmax}$, then more than four TECs in the cartridge 206 should also be operating at $Q_{COPmax}$ in order to provide sufficient capacity to transfer the heat transferred by the activated TECs in the cartridge 204. In addition, if heat is also to be extracted by the accept loop 210, the TECs in the cartridge 206 are further controlled to provide additional capacity to extract the desired amount of heat via the accept loop 210.

During operation of the thermoelectric refrigeration system 184, a controller 212 controls the TECs disposed within the cartridges 204 and 206 to maintain the desired set point temperatures in the cooling chambers 186 and 188. In particular, in order to maintain the desired set point temperature within the cooling chamber 186, the controller 212 controls the TECs disposed within the cartridges 204 and 206 based on the temperature within the cooling chamber 186 and, in some embodiments, the temperature at the reject side of the heat exchanger 190 as described above with respect to FIGS. 15 through 19. Therefore, in one embodiment, the controller 212 receives temperature data relating to both the cooling chamber 186 and the reject side of the heat exchanger 190 and selectively controls the TECs disposed within the cartridges 204 and 206 to maintain the desired set point temperature for the cooling chamber 186. In general, the controller 212 detects the mode of operation (i.e., steady state, recovery, pull down, etc.) and then activates/deactivates the TECs in the cartridges 204 and 206, increases or decreases duty cycles of the TECs in the cartridges 204 and 206, and/or increases or decreases currents provided to the TECs in the cartridges 204 and 206 according to the mode of operation.

For example, if the cooling chamber 186 is at the set point temperature, the controller 212 controls the TECs within the cartridge 204 such that a predetermined number of the TECs needed for steady state operation for the cooling chamber 186 operate at $Q_{COPmax}$. In this example, the cartridge 204 has four TECs and three of the four TECs are operating at $Q_{COPmax}$. In addition, during steady state operation for the cooling chamber 186, the controller 212 controls three or more of the TECs within the cartridge 206 such that the active TECs within the cartridge 206 operate at $Q_{COPmax}$ in conjunction with and in support of the three TECs in the cartridge 204 that operate at $Q_{COPmax}$. In this example, if the controller 212 subsequently detects that the cooling chamber 186 is in recovery, the controller 212 selectively controls the TECs within the cartridge 204 in order to pull the temperature of the cooling chamber 186 down to the set point temperature. For example, the controller 212 may activate all four TECs in the cartridge 204 such that all the TECs in the cartridge 204 operate at $Q_{max}$. Moreover, when the controller 212 activates all four TECs in the cartridge 204 at $Q_{max}$, the controller 212 also activates more TECs in the cartridge 206 to support the additional capacity provided by the newly activated TECs in the cartridge 204.

As noted above, the thermoelectric refrigeration system 184 also includes the cooling chamber 188 where the accept loop 210 facilitates the extraction of heat from the cooling chamber 188, as described above with reference to the accept loop 114 of FIG. 1. The accept loop 210 thermally couples with the cold side heat sink 196 such that the cold side heat sink 196 transfers heat extracted from the cooling chamber 188 to the reject loop 198 via the cartridge 206 and the TECs disposed therein. Thus, the reject loop 198 operates to reject heat extracted from the cooling chamber 186 and the cooling chamber 188. As noted above, the cartridge 206 includes TECs that work in conjunction with the TECs disposed within the cartridge 204. Here, the cartridge 206 includes additional TECs that facilitate the transfer of heat extracted from the cooling chamber 188 to the hot side heat sink 192.

In addition to controlling the TECs disposed within the cartridge 206 to support heat transfer by the activated TECs disposed within the cartridge 204, the controller 212 selectively controls the TECs disposed within the cartridge 206 to maintain the desired set point temperature within the cooling chamber 188 in accordance with the methods of FIGS. 15 through 19 described above. Thus, the controller 212 receives temperature data for the cooling chamber 188 and selectively controls the TECs disposed within the cartridge 206 accordingly. For example, during steady state operation, the controller 212 selects TECs within the cartridge 206 that are not facilitating heat transfer associated with the cooling chamber 186 such that the selected TECs operate at $Q_{COPmax}$. Continuing this example, when the controller 212 detects that the cooling chamber 188 is in recovery, in one embodiment, the controller 212 controls the selected TECs such that the selected TECs operate at $Q_{max}$. In addition, the controller 212 may select additional TECs that are not activated such that these additional TECs operate at $Q_{max}$ or at some point between $Q_{COPmax}$ and $Q_{max}$. In this scenario, if the cartridge 206 includes ten TECs and four of the TECs facilitate heat transfer associated with the cooling chamber 186, during steady state operation of the cooling chamber 188, of the six remaining TECs, the controller 212 may select three of the remaining TECs to operate at $Q_{COPmax}$. However, when the cooling chamber 188 is in recovery and the controller 212 needs to pull the temperature of the cooling chamber 188 down to the set point temperature, the controller 212 may control the three TECs operating at $Q_{COPmax}$ such that these TECs operate at $Q_{max}$ and then, of the three remaining TECs that are not activated, the controller 212 may activate one or more additional TECs to also operate at $Q_{max}$.

In the above scenario, of the activated TECs in the cartridge 206, four were operating at $Q_{COPmax}$ in order to facilitate the transfer of heat from the cooling chamber 186. It should be noted that in the scenario above when the cooling chamber 188 was in recovery, in accordance with embodiments of the present disclosure, the controller 212 may have controlled the four TECs that were assisting with the heat transfer of the heat extracted from the cooling chamber 186 such that these four TECs operated at $Q_{max}$. Here, the four TECs would still work to maintain the cooling chamber 186 at the set point temperature (since the TECs need only operate at $Q_{COPmax}$) while at the same time assisting with pulling down the temperature of the cooling chamber 188 to the set point temperature (the additional heat that may be extracted between the point associated with $Q_{COPmax}$ and $Q_{max}$ as shown with reference to FIG. 2). It should be noted that all the TECs in the cartridge 206 may be controlled to operate at $Q_{max}$ when the cooling chamber 186 and the cooling chamber 188 are in recovery.

Thermal Diode Effect and Thermal Isolation of Heat Exchange System

In some preferred embodiments of the present disclosure, the heat exchange system(s) disclosed herein also provide a thermal diode effect and thermal isolation of the heat exchanger from the cooling chamber(s) and the external environment. This is beneficial because the thermal diode effect and the thermal isolation of the heat exchanger(s) prevent, or at least minimize, heat leak back from the external environment, through the heat exchanger(s), to the cooling chamber(s). In this regard, FIG. 22 illustrates one embodiment of the heat exchanger 104 of FIG. 1 wherein the heat exchanger 104 is thermally isolated from the cooling chamber 102 and the outer wall 118 of the thermoelectric refrigeration system 100 such that heat leak back from the heat exchanger 104 to the cooling chamber 102 does not occur when the heat exchanger 104 is not actively facilitating the extraction of heat from the cooling chamber 102 (i.e., when all of the TECs are inactive).

As noted above with respect to FIG. 1, the heat exchanger 104 includes the cold side heat sink 110 and the hot side heat sink 108 where the cartridge 112 is disposed between the cold side heat sink 110 and the hot side heat sink 108. As illustrated in FIG. 22, in order to provide thermal isolation of the heat exchanger 104, the heat exchanger 104 is physically separated from, and physically attached to, the interior wall 115 via standoffs 220. In particular, the standoffs 220 couple with the cold side heat sink 110 and the interior wall 115 such that the standoffs 220 physically and thermally isolate the heat exchanger 104 from the interior wall 115 while at the same time mount the heat exchanger 104 within the thermoelectric refrigeration system 100. In accordance with one embodiment of the present disclosure, the standoffs 220 may be formed from any type of material that minimizes thermal conductance, such as any low thermal conductivity material, including ceramic, plastic, or the like. Moreover, as may be seen with respect to FIG. 22, the heat exchanger 104 is disposed between the interior wall 115 and the outer wall 118 (and thus the cooling chamber 102), where the heat exchanger 104 is also thermally isolated from the interior wall 115 and the outer wall 118 by insulation 222.

When the thermal isolation of the heat exchanger 104 is combined with a thermal diode effect provided by the accept and reject loops 114 and 116, heat leak back from the external environment and the heat exchanger 104 into the cooling chamber 102 when the TECs disposed within the cartridge 112 are all deactivated or are in an "off" state during duty cycle control. In one embodiment, the accept and reject loops 114 and 116 operate according to thermosiphon principles (i.e., are thermosiphons) and, as such, provide a thermal diode effect. This thermal diode effect is illustrated with respect to FIGS. 23 and 24. FIG. 23 illustrates heat transfer through the heat exchange system when one or more TECs in the heat exchanger 104 are activated or in the "on" state during duty cycle control. As illustrated, when one or more of the TECs are on, the cooling medium in the accept loop 114 is condensed by the cold side heat sink 110 of the heat exchanger 104 such that the condensed cooling medium flows through the accept loop 114 via gravity forces. When flowing through the accept loop 114, the cooling medium extracts heat from the cooling chamber 102. The extracted heat evaporates the cooling medium. The evaporated cooling medium then returns to the cold side heat sink 110 of the heat exchanger 104 via buoyancy forces. This process continues to facilitate heat extraction from the cooling chamber 102. Conversely, at the reject side, the heat exchange medium in the reject loop 116 is evaporated by the hot side heat sink 108 of the heat exchanger 104. The evaporated heat exchange medium flows through the reject loop 116 via buoyancy forces such that heat is rejected to the external environment. Due to the heat rejection, the heat exchange medium is condensed, and the condensed heat exchange medium returns to the hot side heat sink 108 via gravity. The process continues to provide heat rejection to the external environment.

Once the TECs in the heat exchanger 104 are all deactivated or in the "off" state during duty cycle control, the accept and reject loops 114 and 116 prevent the transfer of heat through the accept and reject loops 114 and 116 toward the cooling chamber 102 as illustrated in FIG. 24. More specifically, when all of the TECs are deactivated or in the "off" state during duty cycle control, the cold side heat sink 110 of the heat exchanger 104 is no longer sufficiently cold to condense the cooling medium in the accept loop 114. As such, the cooling medium in the accept loop 114 evaporates and collects at the cold side heat sink 110, thereby preventing further heat transfer through the accept loop 114. Therefore, it can be seen that the accept loop 114 provides heat transfer away from the cooling chamber 102 (i.e., heat extraction) but prevents heat transfer toward the cooling chamber 102 (i.e., heat leak back into the cooling chamber 102). In this manner, the accept loop 114 provides a thermal diode effect. In a similar manner, the hot side heat sink 108 is no longer sufficiently hot to evaporate the heat exchange medium in the reject loop 116. As such, the heat exchange medium in the reject loop 116 condenses and collects at the hot side heat sink 108, thereby preventing further heat transfer through the reject loop 116. Therefore, it can be seen that the reject loop 116 provides heat transfer away from the heat exchanger 104 (i.e., heat rejection) but prevents heat transfer toward the heat exchanger 104 (i.e., heat leak back from the external environment to the heat exchanger 104). In this manner, the reject loop 116 provides a thermal diode effect. Importantly, the thermal insulation of the heat exchanger 104 and the thermal diode effect of the accept and reject loops 114 and 116 enable: (1) deactivation of all of the TECs in the heat exchanger 104 with no or minimal heat leak back into the cooling chamber 102 and (2) duty cycle control of the TECs in the heat exchanger 104 with no or minimal heat leak back into the cooling chamber 102.

Notably, while the heat exchange system of FIG. 1 includes both the accept and reject loops 114 and 116, the present disclosure is not limited thereto. The heat exchange system may alternatively be a hybrid system that includes the accept loop 114 on the accept side of the heat exchanger 104 and an alternative heat exchange mechanism (e.g., fins and a fan) on the reject side of the heat exchanger 104. In this alternative embodiment, the accept loop 114 still provides a thermal diode effect that prevents heat leak back into the cooling chamber 102 when all of the TECs in the heat exchanger 104 are deactivated or in the "off" state during duty cycle control, as illustrated in FIG. 25. As another alternative, the heat exchange system may be a hybrid system that includes the reject loop 116 on the reject side of the heat exchanger 104 and an alternative heat exchange mechanism (e.g., fins and a fan) on the accept side of the heat exchanger 104. In this alternative embodiment, the reject loop 116 provides a thermal diode effect that prevents heat leak back from the external environment to the heat exchanger 104.

Figure 26:
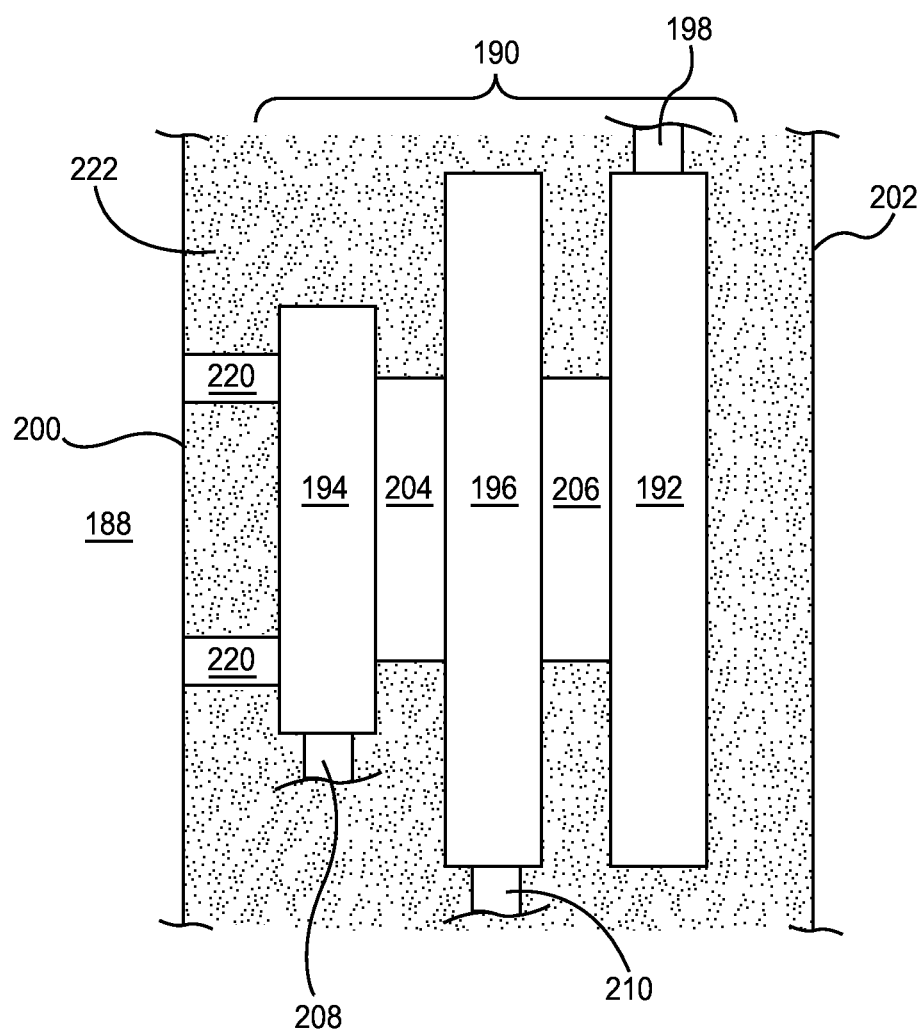

FIG. 26 illustrates thermal isolation of the heat exchanger 190 of FIG. 21 in accordance with one embodiment of the present disclosure. Here, the heat exchanger 190 interfaces with the interior wall 200 that defines the cooling chamber 188 via the standoffs 220. In particular, the standoffs 220 couple with the cold side heat sink 194 and the interior wall 200 such that the standoffs 220 physically and thermally isolate the heat exchanger 190 from the cooling chamber 188 while at the same time mount the heat exchanger 190 within the thermoelectric refrigeration system 184. The insulation 222 around the heat exchanger 190 thermally isolates the heat exchanger 190 from the cooling chamber 188 and the outer wall 202. Further, in a manner similar to that described above, the reject loop 198 and the accept loops 208 and 210 each provide a thermal diode effect. Notably, in this embodiment, there are two accept loops, namely the accept loops 208 and 210, that each provide a thermal diode effect that prevents heat leak back into the corresponding cooling chambers 186 and 188. Accordingly, when the heat exchanger 190 is not actively extracting heat from the cooling chamber 186 or 188, heat leak back into the cooling chambers 186 and 188 does not occur via the heat exchanger 190.

Heat Sink Configuration

Figure 27:
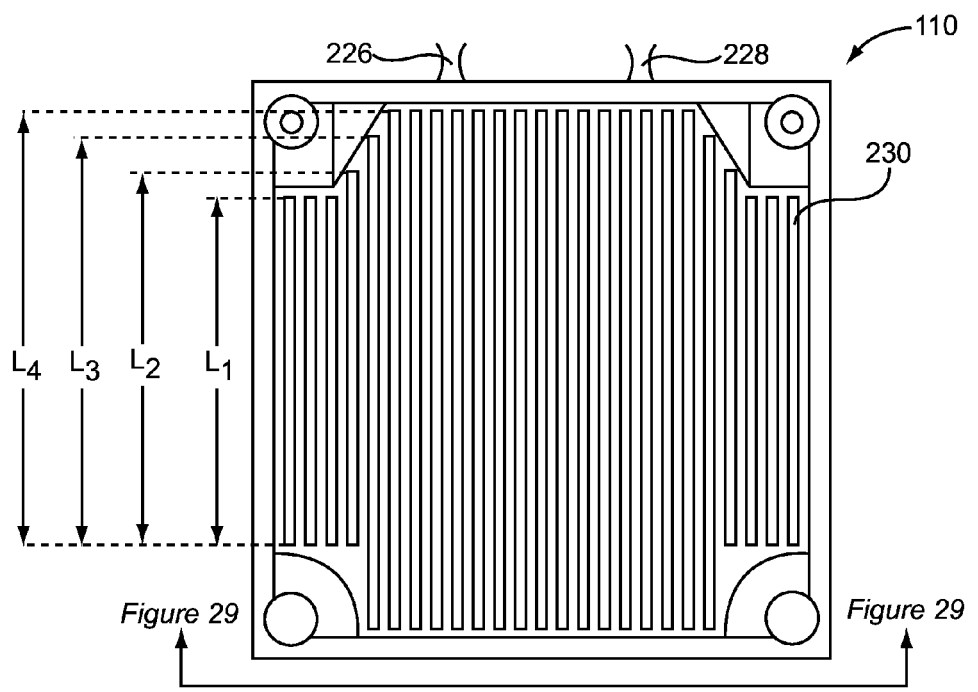
Figure 28:
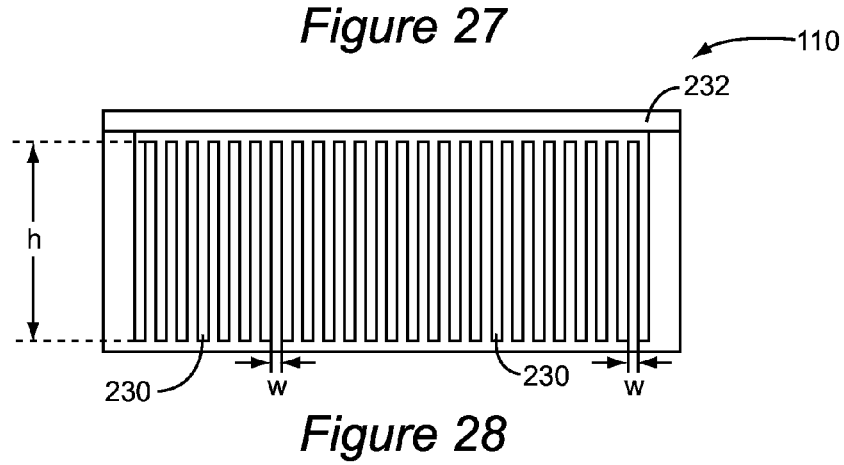

As noted above with respect to FIG. 1, the accept loop 114 transfers heat extracted from the cooling chamber 102 to the cold side heat sink 110 and the hot side heat sink 108 transfers the extracted heat to the reject loop 116. FIG. 27 is a schematic illustrating a configuration of the cold side heat sink 110 in accordance with one embodiment of the present disclosure. It should be noted that while this discussion focuses on the cold side heat sink 110, this discussion is equally applicable to the cold side heat sinks 194 and 196 and the hot side heat sinks 108 and 192. The cold side heat sink 110 includes two inlet/outlet ports 226/228 through which the cooling medium enters and exits the cold side heat sink 110 after heat transfer with the cooling chamber 102 and/or one of the activated TECs of the array of TECs 120 in the cartridge 112. Specifically, when the cooling medium enters the inlet/outlet ports 226/228, the cooling medium includes heat extracted from the cooling chamber 102. Heat extracted from the cooling chamber 102 is transferred to the cooling medium via thermal convection, conduction, and radiation and then to the cold side heat sink 110 via thermal convection, conduction, and radiation between the cooling medium and the cold side heat sink 110. The extracted heat is then transferred to the array of TECs 120 via fins 230 disposed on the cold side heat sink 110 to a plate 232 as shown with respect to FIG. 28, which is thermally coupled to the array of TECs 120.

As shown with reference to FIG. 27, each of the fins 230 has an elongated shape and respectively spans a length $L_1$ through $L_4$. Moreover, as may be seen with respect to FIG. 28, the fins 230 extend a height h and are spaced apart from each other a width w. Thus, each of the fins 230 has an effective surface area for transferring heat that is a function of the length $L_1$ through $L_4$ and the height h. It should be noted that while the cold side heat sink 110 is described as having the fins 230 having the configuration and dimensions noted above, the cold side heat sink 110 may have fins of any configuration and may have any dimensions dependent on heat loads and space constraints. In some embodiments, the configuration and dimensions of the fins 230 may be a function of the type of cooling medium used in the accept loop 114 and a temperature differential between the cooling chamber 102, the heat exchanger 104, and an ambient temperature. Moreover, the dimensions and configuration of the fins 230 may also be a function of the fluid pressures within the accept loop 114 and the reject loop 116 and any heat leak within the thermoelectric refrigeration system 100.

Figure 29:
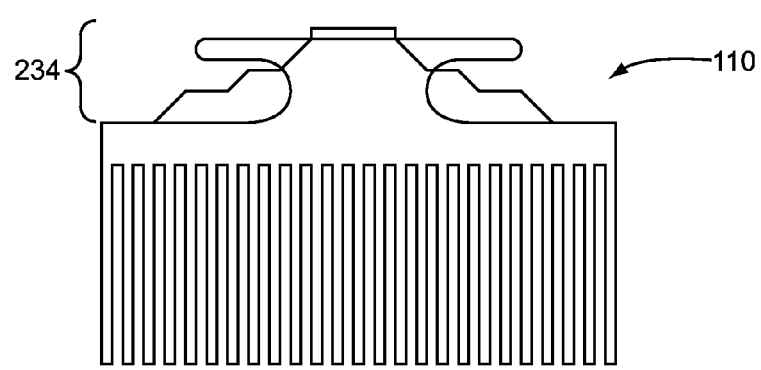

FIG. 29 illustrates another embodiment of the cold side heat sink 110 that includes a heat sink 234. In one embodiment, the thermoelectric refrigeration system 100 does not include the reject loop 116 but instead the heat sink 234 where the thermoelectric refrigeration system 100 includes a fan (not shown) that evacuates the heat absorbed by the heat sink 234 to an environment external to the thermoelectric refrigeration system 100. Moreover, in a further embodiment of the present disclosure, the thermoelectric refrigeration system 100 may include both the heat sink 234 and the reject loop 116, thereby forming a hybrid configuration where both the heat sink 234 and the reject loop 116 operate to reject heat extracted from the cooling chamber 102 to an environment external to the thermoelectric refrigeration system 100.

Divorced Heat Exchanger

Some embodiments of the present disclosure maximize, or at least increase, the heat extraction capabilities of a thermoelectric refrigeration system by increasing the available surface area of an interior wall of the cooling chamber and/or the available surface area of an outer wall that is usable for heat transfer via the accept and reject loops, respectively. In general, these embodiments provide a heat exchanger having physically separated, or divorced, hot side and cold side heat sinks that are thermally coupled by a heat conduit. In one embodiment, the cartridge containing the TECs is physically attached to the cold side heat sink, where the heat conduit thermally couples a hot side of the TECs to the hot side heat sink. In another embodiment, the cartridge containing the TECs is physically attached to the hot side heat sink, where the heat conduit thermally couples the cold side of the TECs to the cold side heat sink.

In this regard, FIG. 30 illustrates one embodiment of a heat exchanger that includes a heat conduit 236 that enables physical separation of the cold side heat sink 110 from the hot side heat sink 108. In accordance with embodiments of the present disclosure, the heat conduit 236 may be any device suitable for conducting heat between the cold side heat sink 110 and the hot side heat sink 108. Examples of devices that may be used for the heat conduit 236 include a traditional heat pipe, where the heat pipe allows for the passive movement of heat in a downward direction from the cold side heat sink 110 to the hot side heat sink 108.

In an alternative embodiment, the heat conduit 236 may comprise a convective coupling that works in conjunction with a plenum to facilitate heat transfer between the cold side heat sink 110 and the hot side heat sink 108. Moreover, in another embodiment, the heat conduit 236 may include a fluid loop having a heat transfer fluid where a pump pumps the heat transfer fluid between the cold side heat sink 110 and the hot side heat sink 108. In an embodiment where the heat conduit 236 includes a fluid loop, the heat transfer fluid carries heat from the cold side heat sink 110 to the hot side heat sink 108. Additionally, the heat conduit 236 may transfer heat via direct conduction, where the heat conduit 236 conductively transfers heat from the cold side heat sink 110 to the hot side heat sink 108.

The heat conduit 236 is physically and thermally coupled to the cartridge 112 using any well-known technique, such as a spreader plate, where the spreader plate interfaces with the TECs 120 disposed within the cartridge 112. As noted above, during cooling of the cooling chamber 102, heat from the cooling chamber 102 thermally transfers to the accept loop 114. The heat from the accept loop 114 is then thermally transferred to the TECs 120 disposed within the cartridge 112, also as described above. The heat is transferred from the TECs 120 to the heat conduit 236, and the heat conduit 236 transfers the heat to the hot side heat sink 108. Moreover, the heat conduit 236 physically and thermally couples with the hot side heat sink 108 using any well-known technique, such as a mechanical assembly 237 where the heat conduit 236 couples directly to the hot side heat sink 108. Note that, in an alternative embodiment, the heat conduit 236 is directly connected to the hot side heat sink 108 such that the mechanical assembly 237 is not needed. It should be noted that while the cartridge 112 is shown being thermally coupled to the cold side heat sink 110 such that the heat conduit 236 thermally couples with the cartridge 112 and the hot side sink 108, the cartridge 112 may be thermally coupled with the hot side heat sink 108 such that the heat conduit 236 may directly thermally couple with the cold side heat sink 110 and the cartridge 112 when the cartridge 112 is coupled with the hot side heat sink 108. It should be noted that any methodology may be used to divorce the cold side heat sink 110 from the hot side heat sink 108 where the cold side heat sink 110 and the hot side heat sink 108 are thermally coupled with each other. For example, the cold side heat sink 110 and the hot side heat sink 108 may be conductively and convectively coupled with each other. Moreover, the cold side heat sink 110 and the hot side heat sink 108 may be thermally coupled using a pumped loop or may be radiatively coupled with each other.

FIG. 31 is a schematic illustrating heat flow for the heat exchanger 104 of FIG. 30 in accordance with one embodiment of the present disclosure. In particular, heat is extracted from the cooling chamber 102 as denoted by $Q_{ACCEPTIN}$ and then transferred to the heat conduit 236 as indicated by $Q_{ACCEPTOUT}$. The heat conduit 236 then transfers the heat to the reject loop 116 as denoted by $Q_{REJECTIN}$, where the heat is ultimately expelled to an environment external to the cooling chamber 102, as shown by $Q_{REJECTOUT}$.

In embodiments where the heat conduit 236 separates the cold side heat sink 110 from the hot side heat sink 108, the cold side heat sink 110 is spaced away from the hot side heat sink 108 such that, in one embodiment, the cold side heat sink 110 is at an upper portion of the thermoelectric refrigeration system 100 and the hot side heat sink 108 is at a lower portion of the thermoelectric refrigeration system 100, as shown with reference to FIGS. 32 and 33. In embodiments where the cold side heat sink 110 is disposed at an upper portion of the thermoelectric refrigeration system 100, an accept loop 238 may envelope a greater surface area of the cooling chamber 102 such that a greater amount of heat transfer occurs between the cooling chamber 102 and the cooling medium within the accept loop 238 by virtue of the greater surface area between the cooling chamber 102 and the accept loop 238. More specifically, as the accept loop 238 thermally communicates with a greater portion of the cooling chamber 102, the accept loop 238 may facilitate the extraction of a greater amount of heat, thereby increasing the overall heating efficiency of a device implementing the accept loop 238.

In addition, in embodiments where the hot side heat sink 108 is disposed at a bottom portion of the thermoelectric refrigeration system 100, a reject loop 240 may extend from the bottom portion of the thermoelectric refrigeration system 100 to the top portion of the thermoelectric refrigeration system 100 as shown with respect to FIGS. 32 and 33 such that the reject loop 240 has a greater amount of surface area exposed to the environment external to the cooling chamber 102. Here, a greater amount of heat transfer may occur between the reject loop 240 and the environment external to the cooling chamber 102 again, by virtue of the greater amount of surface area between the reject loop 240 and the environment that is external to the cooling chamber 102. It should be noted that while FIGS. 32 and 33 illustrate the cold side heat sink 110 disposed at the upper portion on the thermoelectric refrigeration system 100 and the hot side heat sink 108 disposed at the bottom portion on the thermoelectric refrigeration system 100, in embodiments including the heat conduit 236, the cold side heat sink 110 may be disposed at any location on the thermoelectric refrigeration system 100 and the hot side heat sink 108 may disposed at any location on the thermoelectric refrigeration system 100, where the distance between the cold side heat sink 110 and the hot side heat sink 108 is maximized relative to the physical dimensions of a device implementing embodiments of the present disclosure. With regards to the heat conduit 236, while the heat conduit 236 has been shown and described with reference to the thermoelectric refrigeration system 100, the heat conduit 236 may also be used with the thermoelectric refrigeration system 184, where the heat conduit 236 thermally couples between the cold side heat sink 196 and the hot side heat sink 192 such that the cold side heat sinks 194 and 196 are disposed on a first side of the thermoelectric refrigeration system 184 (i.e., near a top portion of the thermoelectric refrigeration system 184) and the hot side heat sink 192 is disposed on a second side of the thermoelectric refrigeration system 184 (i.e., near the bottom of the thermoelectric refrigeration system 184), opposite the first side.

FIG. 34 is a block diagram of the controller 106 in accordance with one embodiment of the present disclosure. The discussion is equally applicable to the controller 212. In this embodiment, the controller 106 includes a hardware processor 242 and memory 244 associated with the hardware processor 242. In one embodiment, the memory 244 stores instructions that allow the hardware processor 242 to perform the operations noted above in accordance with the various embodiments of the present disclosure.

It should be noted that while the thermoelectric refrigeration systems 100 and 184 have been described with reference to cooling the cooling chambers 102 and 196, the thermoelectric refrigeration systems 100 and 184 may also be used for heat recovery/power generation where the operation of the TECs 120 is reversed such that instead of taking heat from a cooling medium within the accept loops 114, 202, and 204, the TECs 120 are provided with heat in order to generate current through the TECs 120. More specifically, the TEC systems disclosed with reference to the thermoelectric refrigeration systems 100 and 184 are completely reversible thermodynamic processes as defined by the Peltier and Seebeck processes, such that the thermoelectric refrigeration systems 100 and 184 described above may be used for heat recovery/power generation applications. Moreover, it should be noted that while the processes discussed above have been described with reference to the thermoelectric refrigeration system 100, they may also be used with the thermoelectric refrigeration system 184. Thus, the methods detailed above with respect to FIGS. 17 through 19 may be used with the thermoelectric refrigeration system 184.

Those skilled in the art will recognize improvements and modifications to the preferred embodiments of the present disclosure. All such improvements and modifications are considered within the scope of the concepts disclosed herein and the claims that follow.

What is claimed is:

1. A thermoelectric refrigeration system, comprising:
a cooling chamber;
a heat exchanger within a wall of the cooling chamber comprising:
a cold side heat sink;
a hot side heat sink; and
a cartridge comprising:
an interconnect board with a plurality of conductive traces, including a first conductive trace and one or more additional conductive traces where the first conductive trace and the one or more additional conductive traces are such that current through the first conductive trace and the one or more additional conductive traces can be separately controlled; a plurality of openings from a first surface of the interconnect board to a second surface of the interconnect board, including at least one opening from the first surface of the interconnect board to the second surface of the interconnect board through each of the plurality of conductive traces; and
a plurality of thermoelectric coolers disposed between the cold side heat sink and the hot side heat sink being mounted on the interconnect board over a corresponding one of the plurality of openings through the plurality of conductive traces;

a heat accept loop that operates to provide one-way transport of heat from the cooling chamber to the cold side heat sink according to thermosyphon principles;

a heat reject loop that operates to provide one-way transport of heat from the hot side heat sink to an environment that is external to the thermoelectric system according to thermosyphon principles; and thermal insulation that thermally insulates the heat exchanger from at least one of the group consisting of the cooling chamber of the thermoelectric refrigeration system and the environment that is external to the thermoelectric refrigeration system.

2. The thermoelectric refrigeration system of claim 1 wherein the heat accept loop and the heat reject loop operate as a thermal diode when the heat exchanger is deactivated such that the thermal diode combined with the thermal insulation prevents heat leak back into the cooling chamber when the heat exchanger is deactivated.

3. The thermoelectric refrigeration system of claim 2 wherein the heat accept loop and the heat reject loop operate as a thermal diode when one or more thermoelectric coolers of the plurality of thermoelectric coolers are deactivated such that the thermal diode combined with the thermal insulation prevents heat leak back into the cooling chamber when the one or more thermoelectric coolers are deactivated.

4. The thermoelectric refrigeration system of claim 1 further comprising:

a controller configured to provide duty cycle control of the plurality of thermoelectric coolers;

wherein the heat accept loop and the heat reject loop operate operates as a thermal diode when one or more thermoelectric coolers of the plurality of thermoelectric coolers are deactivated during an off cycle of the duty cycle control such that the thermal diode combined with the thermal insulation prevents heat leak back into the cooling chamber when the one or more thermoelectric coolers are deactivated during the off cycle of the duty cycle control.

5. The thermoelectric refrigeration system of claim 1 wherein the thermal insulation thermally isolates the heat exchanger from both the cooling chamber and the environment that is external to the thermoelectric refrigeration system.

6. The thermoelectric refrigeration system of claim 5 wherein the cold side heat sink of the heat exchanger is mounted to an outside of a wall of the cooling chamber, and the thermal insulation comprises thermal insulation between the cold side heat sink of the heat exchanger and the wall of the cooling chamber.

7. The thermoelectric refrigeration system of claim 6 further comprising:

a controller configured to provide duty cycle control of the plurality of thermoelectric coolers;

wherein the heat accept loop and the heat reject loop operate as thermal diodes when one or more thermoelectric coolers of the plurality of thermoelectric coolers are deactivated during an off cycle of the duty cycle control such that the thermal diodes combined with the thermal insulation prevents heat leak back into the cooling chamber when the one or more thermoelectric coolers are deactivated during the off cycle of the duty cycle control.

8. The thermoelectric refrigeration system of claim 1 wherein the heat exchanger includes at least one additional cold side heat sink.

9. The thermoelectric refrigeration system of claim 8 wherein the heat accept subsystem loop is an accept loop.

10. The thermoelectric refrigeration system of claim 9 further comprising a second accept loop coupled to one of the at least one additional cold side heat sink.

11. The thermoelectric refrigeration system of claim 10 wherein the accept loop and the second accept loop operate as thermal diodes when the heat exchanger is deactivated such that the thermal diodes combined with the thermal insulation prevents heat leak back into the cooling chamber when the heat exchanger is deactivated.

12. The thermoelectric refrigeration system of claim 10 further comprising at least one additional cooling chamber, wherein the second accept loop operates to extract heat from one of the at least one additional cooling chamber.

13. The thermoelectric refrigeration system of claim 12 wherein the heat exchanger is mounted to an outside of a wall of one of the group consisting of the cooling chamber and the at least one additional cooling chamber.

14. The thermoelectric refrigeration system of claim 1 further comprising a controller configured to provide separate control of one or more of the plurality of thermoelectric coolers.

15. The thermoelectric refrigeration system of claim 1 further comprising a controller configured to:

receive temperature data indicative of a temperature of the cooling chamber; and operate each thermoelectric cooler in a first subset of thermoelectric coolers from the plurality of thermoelectric coolers at or near the point where the coefficient of performance is maximized by providing a current or voltage with amplitude corresponding to the point where the coefficient of performance is maximized when the temperature of the cooling chamber is within a predefined steady state range including a set point temperature.

* * * * *